US011048408B2

(12) United States Patent
Kitazawa

(10) Patent No.: US 11,048,408 B2

(45) Date of Patent: Jun. 29, 2021

(54) DISPLAY APPARATUS, RECORDING MEDIUM, AND DISPLAY METHOD

(71) Applicant: Kazuki Kitazawa, Kanagawa (JP)

(72) Inventor: Kazuki Kitazawa, Kanagawa (JP)

(73) Assignee: Ricoh Company, Ltd., Tokyo (JP)

(*) Notice: Subject to any disclaimer, the term of this patent is extended or adjusted under 35 U.S.C. 154(b) by 0 days.

(21) Appl. No.: 16/883,067

(22) Filed: May 26, 2020

(65) Prior Publication Data

US 2020/0379639 A1 Dec. 3, 2020

(30) Foreign Application Priority Data

May 27, 2019 (JP) ............................ JP2019-098746
May 26, 2020 (JP) ............................ JP2020-091521

(51) Int. Cl.
*G06F 3/0488* (2013.01)
*G06F 3/01* (2006.01)

(52) U.S. Cl.
CPC .......... *G06F 3/04883* (2013.01); *G06F 3/017* (2013.01)

(58) Field of Classification Search
CPC ............................. G06F 3/017; G06F 3/04883
See application file for complete search history.

(56) References Cited

U.S. PATENT DOCUMENTS 4,972,496 A * 11/1990 Sklarew .................. G06F 3/033 345/178
5,297,216 A * 3/1994 Sklarew .................. G06F 3/033 382/189
5,365,598 A * 11/1994 Sklarew .................. G06F 3/033 178/18.05
9,860,486 B2 1/2018 Takahashi et al.
9,894,320 B2 2/2018 Uchiyama et al.
2010/0066691 A1* 3/2010 Li ........................ G06F 40/171 345/173
2014/0344662 A1* 11/2014 Isabel ................ G06F 3/04883 715/230
2020/0356254 A1* 11/2020 Missig ............... G06F 3/04886

FOREIGN PATENT DOCUMENTS

JP 2014-149612 8/2014

* cited by examiner

*Primary Examiner* — Michael Pervan
(74) *Attorney, Agent, or Firm* — IPUSA, PLLC

(57) ABSTRACT

A display apparatus for displaying handwriting data, the display includes a handwriting recognition controller configured to control recognition of the handwriting data that is handwriting based on a position of an inputter in contact with a display; a display controller configured to display, on the display, validated data obtained by converting the handwriting data; and a character string insertion controller configured to insert a character string candidate among characters forming the validated data upon determining that the handwriting data that is handwritten around the validated data satisfies a predetermined condition with respect to the validated data, the character string candidate being obtained by converting the handwriting data, which is handwritten around the validated data. The display controller displays an insertion character string candidate in which the character string candidate, which is obtained by the converting, is inserted among the characters forming the validated data.

9 Claims, 59 Drawing Sheets

FIG.7

| | DEFINED CONTROL ITEM EXAMPLES | DEFINED CONTROL DATA EXAMPLES |
|---|---|---|
| 401 | SELECTABLE CANDIDATE DISPLAY TIMER | TimerValue="500ms" |
| 402 | SELECTABLE CANDIDATE ERASE TIMER | TimerValue="5000ms" |
| 403 | HANDWRITING DATA NEIGHBORHOOD RECTANGULAR AREA | Horizontal="50%" Vertical="80%" |
| 404 | ESTIMATED WRITING DIRECTION/ CHARACTER SIZE DETERMINATION CONDITION | MinDiff="10mm" MinTime="1000ms" DefDir="Horizontal" |
| 405 405a | SMALL CHARACTER | FontStyle="MING-STYLE FONT" FontSize="25mm" |
| 405 405b | MEDIUM CHARACTER | FontStyle="MING-STYLE FONT" FontSize="50mm" |
| 405 405c | LARGE CHARACTER | FontStyle="GOTHIC-STYLE FONT" FontSize="100mm" |
| 406 | CROSSING LINE DETERMINATION CONDITION | MinLenLongSide="100mm" MaxLenShortSide="50mm" MinOverlapRate="80%" |
| 407 | SURROUNDING LINE DETERMINATION CONDITION | MinOverLapRate="100%" |
| 408 | INSERTION DETERMINATION CONDITION | MinDis="2mm" |

FIG.8

HANDWRITING RECOGNITION DICTIONARY DATA EXAMPLE

| | BEFORE CONVERSION (JAPANESE SYLLABARY CHARACTERS) | AFTER CONVERSION (CHINESE CHARACTERS) | PROBABILITY |
|---|---|---|---|
| 604 | ぎ JAPANESE SYLLABARY CHARACTERS (1) PRONOUNCED AS "GI" | 議 CHINESE CHARACTERS (1) | 0.55 |
| 604 | ぎ | 技 CHINESE CHARACTERS (2) | 0.45 |
| 605 | ぎし JAPANESE SYLLABARY CHARACTERS (2) PRONOUNCED AS "GISHI" | 技士 CHINESE CHARACTERS (3) | 0.55 |
| 605 | ぎし | 技師 CHINESE CHARACTERS (4) | 0.45 |
| 606 | ぎじ | 疑似 | 0.30 |
| 606 | ぎじ | 議事 | 0.25 |
| 606 | ぎじ | 擬似 | 0.20 |
| 606 | ぎじ | ギジ | 0.15 |

FIG.9

CHARACTER STRING CONVERSION DICTIONARY DATA EXAMPLE

| | BEFORE CONVERSION (CHINESE CHARACTERS) | AFTER CONVERSION (CHINESE CHARACTERS) | PROBABILITY |
|---|---|---|---|
| 607 | 議<br>CHINESE CHARACTERS (1) | 議事録<br>CHINESE CHARACTERS (2) | 0.95 |
| 607 | 技<br>CHINESE CHARACTERS (3) | 技量試<br>CHINESE CHARACTERS (4) | 0.85 |
| 608 | 技士 | 技士会 | 0.65 |
| 608 | 技師 | 技師長 | 0.75 |
| 609 | ぎじ | 議事録 | 0.95 |
| 609 | ぎじ | 技術士 | 0.85 |
| 609 | ぎじ | 技術 | 0.75 |
| 610 | 擬似 | 擬似相関 | 0.55 |
| 610 | 擬似 | 擬似的 | 0.50 |
| 610 | 擬似 | 擬似乱数 | 0.40 |

FIG.10

PREDICTION CONVERSION DICTIONARY DATA EXAMPLE

| | BEFORE CONVERSION (CHINESE CHARACTERS) | AFTER CONVERSION (CHINESE CHARACTERS) | PROBABILITY |
|---|---|---|---|
| 611 | 議事録 CHINESE CHARACTERS (1) | 議事録の送付先 CHINESE CHARACTERS (2) | 0.65 |
| 611 | 技量試 CHINESE CHARACTERS (3) | 技量試を決裁 CHINESE CHARACTERS (4) | 0.75 |
| 612 | 技士 | 技士会連合会 | 0.95 |
| 612 | 技術 | 技師エンジニア | 0.85 |
| 613 | 技術 | 技術雑誌社 | 0.65 |
| 614 | 擬似 | 擬似体験 | 0.45 |
| 614 | 擬似 | 擬似逆行列 | 0.35 |

FIG.11A

| | |
|---|---|
| | OPERATION COMMAND DEFINITION DATA EXAMPLE (WHEN THERE IS NO SELECTION DATA) |
| 701 | Name="READ MINUTES TEMPLATE" String="MINUTES" String="TEMPLATE"<br>Command="ReadFile https://%username%:%password%@server.com/template/minutes.pdf" |
| 702 | Name="STORE IN MINUTES FOLDER" String="MINUTES" String="STORE"<br>Command="WriteFile https://%username%:%password%@server.com/minutes/%machinename%_%yyyy-mm-dd%.pdf" |
| 703 | Name="PRINT OUT" String="PRINT" String="PRINT"<br>Command="PrintFile https://%username%:%password%@server.com/print/%machinename%-"%yyyy-mm-dd%.pdf" |

FIG.11B

| | SYSTEM DEFINITION DATA EXAMPLE |
|---|---|
| 704 | username="taro.tokkyo" |
| 705 | password="x2PDHTyS" |
| 706 | machinename="My-Machine" |

FIG.11C

| INSERTION SYMBOL DEFINITION DATA EXAMPLE |
|---|
| String="へ" "Λ" |
| String="レ" "V" |
| String="く" "<" |
| String="コ" ">" |
| String="↑" |
| String="↓" |
| String="→" |
| String="←" |

FIG.12

| OPERATION COMMAND DEFINITION DATA EXAMPLE (WHEN THERE IS SELECTION DATA) |
|---|
| Name="ERASE" Group="Edit" Command="Delete" |
| Name="MOVE" Group="Edit" Command="Move" |
| Name="ROTATE" Group="Edit" Command="Rotate" |
| Name="SELECT" Group="Edit" Command="Select" |
| Name="THICK" Group="Decorate" Command="Thick" |
| Name="THIN" Group="Decorate" Command="Thin" |
| Name="LARGE" Group="Decorate" Command="Large" |
| Name="SMALL" Group="Decorate" Command="Small" |
| Name="UNDERLINE" Group="Decorate" Command="Underline" |

707 (ERASE, MOVE, ROTATE, SELECT)

708 (THICK, THIN, LARGE, SMALL, UNDERLINE)

100

DISPLAY APPARATUS, RECORDING MEDIUM, AND DISPLAY METHOD

CROSS-REFERENCE TO RELATED APPLICATION

The present application is based on and claims priority under 35 U.S.C. § 119 to Japanese Patent Application No. 2019-098746, filed on May 27, 2019 and Japanese Patent Application No. 2020-091521, filed on May 26, 2020, the contents of which are incorporated herein by reference in their entirety.

BACKGROUND OF THE INVENTION

1. Field of the Invention

The present invention relates to a display apparatus, a recording medium, and a display method.

2. Description of the Related Art

There are computer-controlled whiteboard devices or applications that allow handwriting input, in which the user can input handwriting characters (handwritten characters), and moreover, the handwriting characters can be recognized and converted into text data and the text data can be displayed. For example, the user can select a menu and switch from a handwriting mode to a handwriting character recognition mode and convert the handwriting characters and the like to text data.

While such a display apparatus is in use, a technique has been devised to insert a character or the like into a character string that has already been converted into text data (see, for example, Patent Document 1). Patent Document 1 describes a voice recognition error correction device in which a character string input frame is displayed at a predetermined position on a display terminal when a user touches a position in a displayed character string where the user desires to insert a character string by voice recognition, and the character string input to the character string input frame is inserted at the position touched by the user.

Patent Document 1: Japanese Unexamined Patent Application Publication No. 2014-149612

SUMMARY OF THE INVENTION

According to one aspect of the present invention, there is provided a display apparatus for displaying handwriting data, the display apparatus including a handwriting recognition controller configured to control recognition of the handwriting data that is handwriting based on a position of an inputter in contact with a display; a display controller configured to display, on the display, validated data obtained by converting the handwriting data by the handwriting recognition controller; and a character string insertion controller configured to insert a character string candidate among characters forming the validated data upon determining that the handwriting data that is handwritten around the validated data satisfies a predetermined condition with respect to the validated data, the character string candidate being obtained by converting the handwriting data, which is handwritten around the validated data, by the handwriting recognition controller, wherein the display controller displays an insertion character string candidate in which the character string candidate, which is obtained by the converting by the handwriting recognition controller, is inserted among the characters forming the validated data.

BRIEF DESCRIPTION OF THE DRAWINGS

FIG. 7 is a diagram illustrating an example of defined control data according to the first embodiment of the present invention;

FIG. 8 is a diagram illustrating an example of dictionary data of a handwriting recognition dictionary unit according to the first embodiment of the present invention;

FIG. 9 is a diagram illustrating an example of dictionary data of a character string conversion dictionary unit according to the first embodiment of the present invention;

FIG. 10 is a diagram illustrating an example of dictionary data of a prediction conversion dictionary unit according to the first embodiment of the present invention;

FIGS. 11A to 11C are diagram illustrating an example of operation command definition data and system definition data held by an operation command defining unit according to the first embodiment of the present invention;

FIG. 12 is a diagram illustrating an example of operation command definition data when selection data selected by handwriting data exists according to the first embodiment of the present invention;

DETAILED DESCRIPTION OF THE PREFERRED EMBODIMENTS

In the related art, there is a problem in that a character string input frame needs to be displayed in order to insert characters or the like.

A problem to be addressed by an embodiment of the present invention is to provide a display apparatus that allows insertion of characters or the like without displaying a character string input frame.

Hereinafter, as examples of embodiments of the present invention, the display apparatus and a display method performed by the display apparatus will be described with reference to the drawings.

Although the embodiments describes examples with respect to the Japanese language, the present invention is not limited to the Japanese language and can be applied to, for example, English, Chinese, Taiwanese, Korean, etc. Therefore, the embodiments of the present invention are not limited to the Japanese language.

First Embodiment

<Operation Overview of Display Apparatus>

Figure 1:
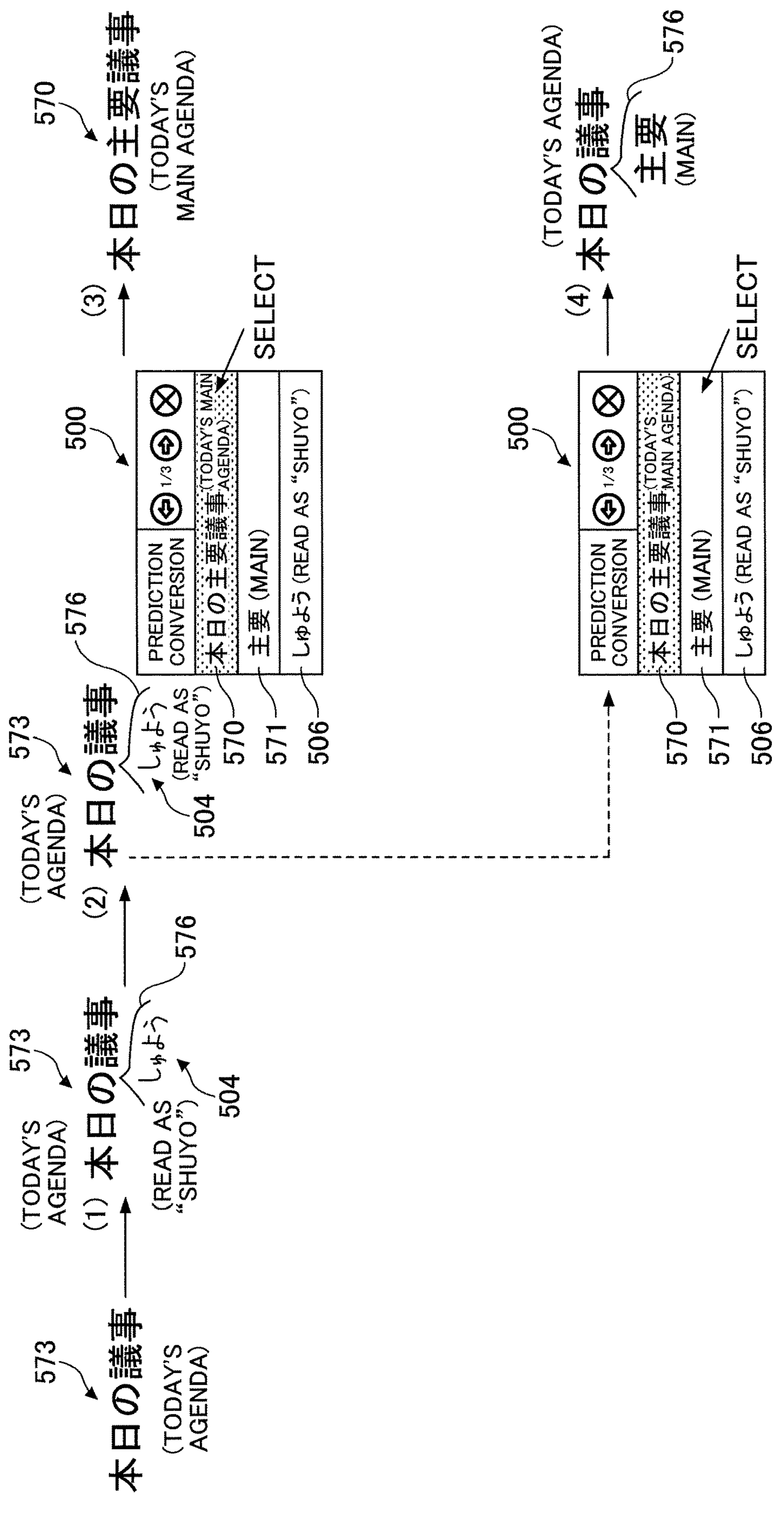
FIG. 1 is a diagram illustrating a method for inserting a character string used by the display apparatus according to a first embodiment of the present invention.

FIG. 1 is a diagram illustrating a method for inserting a character string by the display apparatus according to the present embodiment. The figure illustrates a case where the word “main” (the representation of “main” written in Chinese characters in the figure) is inserted into validated data 573 “today’s agenda” (the representation of “today’s agenda” written in Chinese characters in the figure), so that “today’s main agenda” (the representation of “today’s main agenda” written in Chinese characters in the figure) is displayed.

(1) The validated data 573 “today’s agenda” is already displayed. The user adds an insertion symbol (in the case of FIG. 1, the symbol protruding upward) 576 and handwriting data 504 “shuyo” (the pronunciation of “main” written in Japanese syllabary characters in the figure) to the location where “main” is to be inserted under the validated data 573 (only needs to be somewhere around the validated data 573). The handwriting data 504 includes the insertion symbol 576.

(2) The display apparatus determines whether the handwriting data 504 satisfies a predetermined condition with respect to the validated data 573. The predetermined condition is the presence or absence of the insertion symbol and whether the distance between the handwriting data 504 and the validated data is less than or equal to a threshold value (or less than a threshold value). When the predetermined condition is satisfied, it is determined to display an operation guide 500 with an insertion character string candidate 570 included. The insertion character string candidate is a character string in which the character string candidate based on the handwriting data is inserted into the validated data 573. Further, the display apparatus displays character string candidates obtained by the recognition of the “main” in the same manner as in regular handwriting inputs. Accordingly, the display apparatus displays, as selectable candidates, the insertion character string candidate 570, which is “today’s main agenda” (the representation of “today’s main agenda” written in Chinse characters); a handwriting recognition character string candidate 506, which is “shuyo” (the pronunciation of “main” written in Japanese syllabary characters) that is the recognition result of the handwriting data 504 excluding the insertion symbol; and a language character string candidate 571, which is “main” (the representation of “main” written in Chinse characters).

(3) When the user selects “today’s main agenda”, the validated data 573 is replaced by the insertion character string candidate 570 of “today’s main agenda”. Further, the insertion symbol 576 is deleted.

(4) When the user does not select “today’s main agenda” and selects, for example, “main”, the character string “main” is displayed under “today’s agenda”. The insertion symbol 576 is considered to be the decoration of the character and remains intact.

Thus, the display apparatus according to the present embodiment determines whether the handwriting data 504 satisfies the predetermined condition with respect to the validated data 573, so that insertion of the character string can be performed without any special operation. Further, the handwriting recognition character string candidate 506 and the language character string candidate 571 are displayed in a selectable manner together with the insertion character string candidate 570, and, therefore, when the user wishes to handwrite a character without inserting the character, the user may select the handwriting recognition character string candidate 506 and the language character string candidate 571, and when the user wishes to insert the character, the user may select the insertion character string candidate 570. Further, it is possible to input a handwriting (handwritten) character string with the insertion symbol included.

Terminology

The input means may be any means with which handwriting can be input to the display. Examples include pens, human fingers and hands, rod-like members, and the like. Further, line-of-sight input may be possible.

Validated data is a character string that has been converted to text data by character recognition. This is regardless of whether the conversion is correct. Note that characters include numbers, symbols, alphabetical letters, etc.

Handwriting data is data that indicates, as a trajectory, a sequence of coordinate points obtained as a result of the user continuously moving the input means on the display. A series of operations in which a user presses the input means on a display, moves the input means continuously, and then moves the input means away from the display, is referred to as a stroke, and the data representing the handwritten stroke is referred to as stroke data. Handwriting data includes one or more pieces of stroke data.

Insertion means to insert an object between objects; however, insertion may mean inserting a character between characters and may mean adding a character to the beginning or the end of the text.

Insertion character string candidate is a character string in which a character string, which is generated based on handwriting data, is inserted into the validated data. Candidates for selection by the user may be displayed.

The insertion symbol is one kind of correction mark used by the user for instructing the display apparatus to insert a character. A correction mark is a symbol (mark) that can be used for simply and accurately describing an instruction to correct an error. Correction marks are specified in JISZ 8208 (in Japanese Industrial Standards). In the present embodiment, Japanese insertion symbols are described, but it is preferable to use insertion symbols according to the user's country. The user may be able to select which country's insertion symbol is to be used. Also, an insertion symbol different from the standardized insertion symbol may be used.

<Overall Configuration of Apparatus>

Figure 2A:
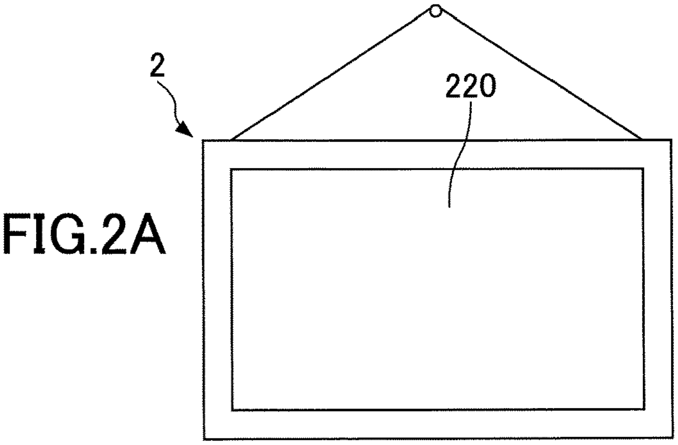
FIGS. 2A to 2C are overall configuration diagrams of an example of the display apparatus according to the first embodiment of the present invention.
Figure 2D:
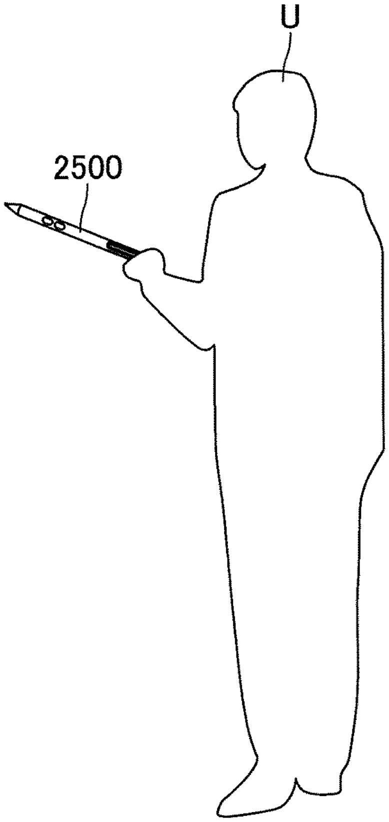
FIG. 2D is a diagram of a user holding a pen according to the first embodiment of the present invention.
Figure 2B:
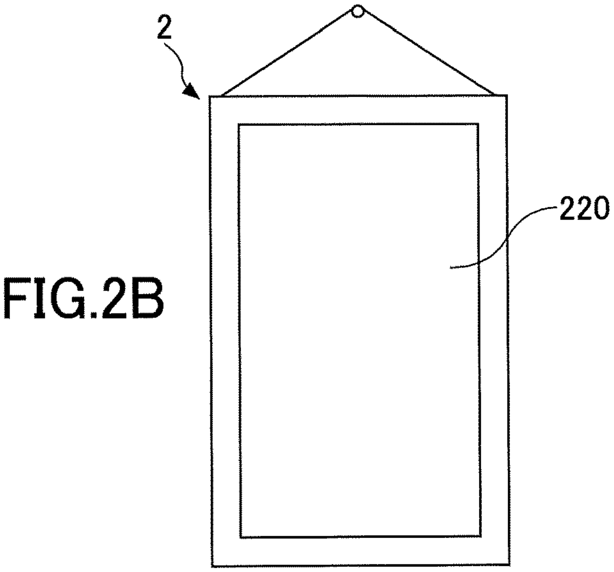
Figure 2C:
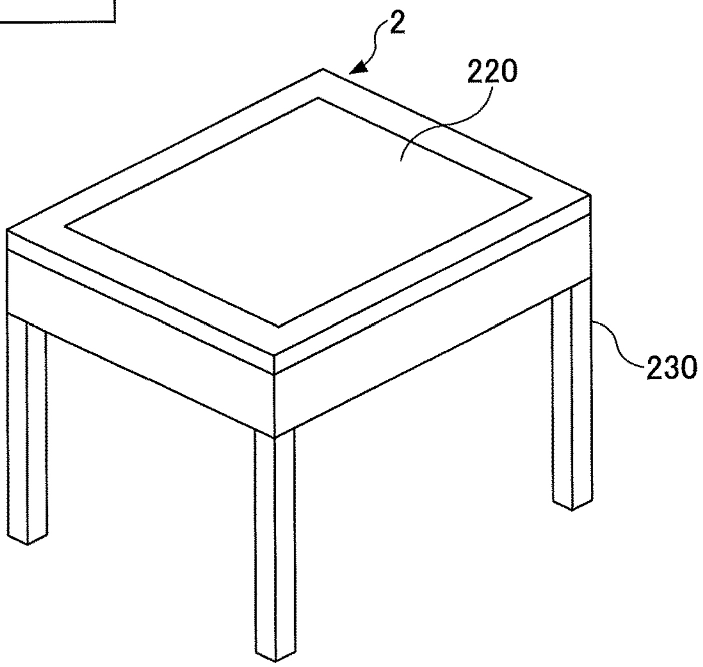

An overall configuration of a display apparatus 2 according to the present embodiment will be described with reference to FIGS. 2A to 2C. FIGS. 2A to 2C are diagrams illustrating an overall configuration of the display apparatus 2. In FIG. 2A, as an example of the display apparatus 2, the display apparatus 2 is used as an electronic blackboard that is horizontally lengthwise, suspended on a wall.

The display apparatus 2 is a device that displays handwriting data based on the position of the input means in contact with a display that is integrated with a touch panel. The display apparatus 2 is also referred to as a handwriting input device, because the display apparatus 2 allows the user to enter data written by hand.

As illustrated in FIG. 2A, a display 220 is installed on the display apparatus 2. As illustrated in FIG. 2D, a user U can handwrite (also referred to as input or rendering) characters or the like to the display 220 using a pen 2500.

FIG. 2B illustrates the display apparatus 2 used as a vertically lengthwise electronic blackboard suspended on a wall.

FIG. 2C illustrates the display apparatus 2 placed flat on a desk 230. The thickness of the display apparatus 2 is approximately 1 cm, and, therefore, it is not necessary to adjust the height of the desk even when the display apparatus 2 is placed flat on a typical desk. The display apparatus 2 can also be easily moved.

<Example of a Pen's Appearance>

Figure 3:
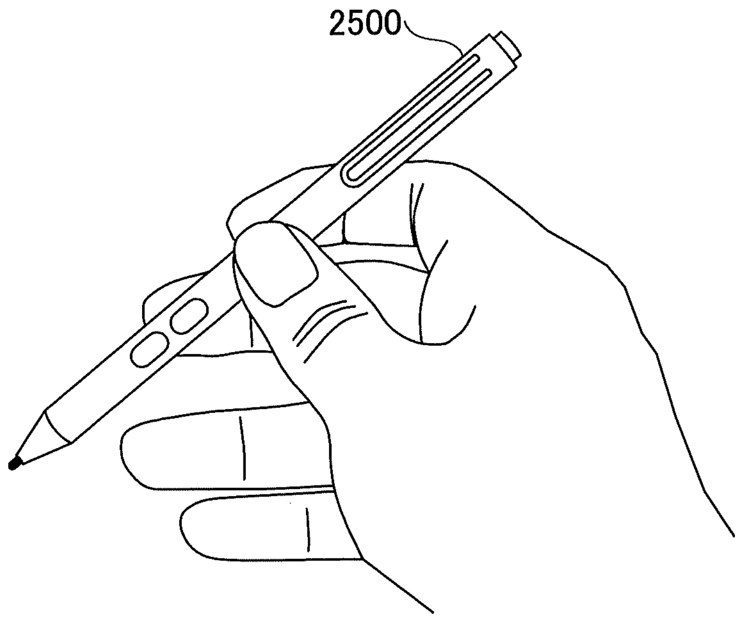
FIG. 3 illustrates example of a perspective view of a pen according to the first embodiment of the present invention.

FIG. 3 illustrates an example of a perspective view of the pen 2500. FIG. 3 illustrates an example of the multifunctional pen 2500. The pen 2500, which has a built-in power supply and can send instructions to the display apparatus 2, is referred to as an active pen (a pen without a built-in power supply is referred to as passive pen). The pen 2500 of FIG. 3 has one physical switch on the tip of the pen, one physical switch on the butt of the pen, and two physical switches on the side of the pen. The switch at the tip of the pen is for writing, the switch at the butt of the pen is for erasing, and the switches at the side of the pen is for assigning user functions. The pen 2500 of the present embodiment has a non-volatile memory and stores a pen ID that is not overlapping with those of other pens.

The user's operation procedure for the display apparatus 2 can be reduced by using the pen with switches. A pen with switches mainly refers to an active pen. However, in the electromagnetic induction method, a passive pen with no built-in power supply can generate power only by a LC circuit. Thus, a pen with switches includes not only an active pen but also a passive pen of the electromagnetic induction method. A pen with switches other than that of the electromagnetic induction method, such as that of an optical method, an infrared method, and a capacitance method, is also an active pen.

The hardware configuration of the pen 2500 is the same as that of a general control method including a communication function and a microcomputer. The coordinate input method of the pen 2500 includes an electromagnetic induction method and an active electrostatic coupling method. The pen 2500 may have functions such as pressure detection, tilt detection, and a hover function (indicating the cursor before the pen touches).

<Apparatus Hardware Configuration>

Figure 4:
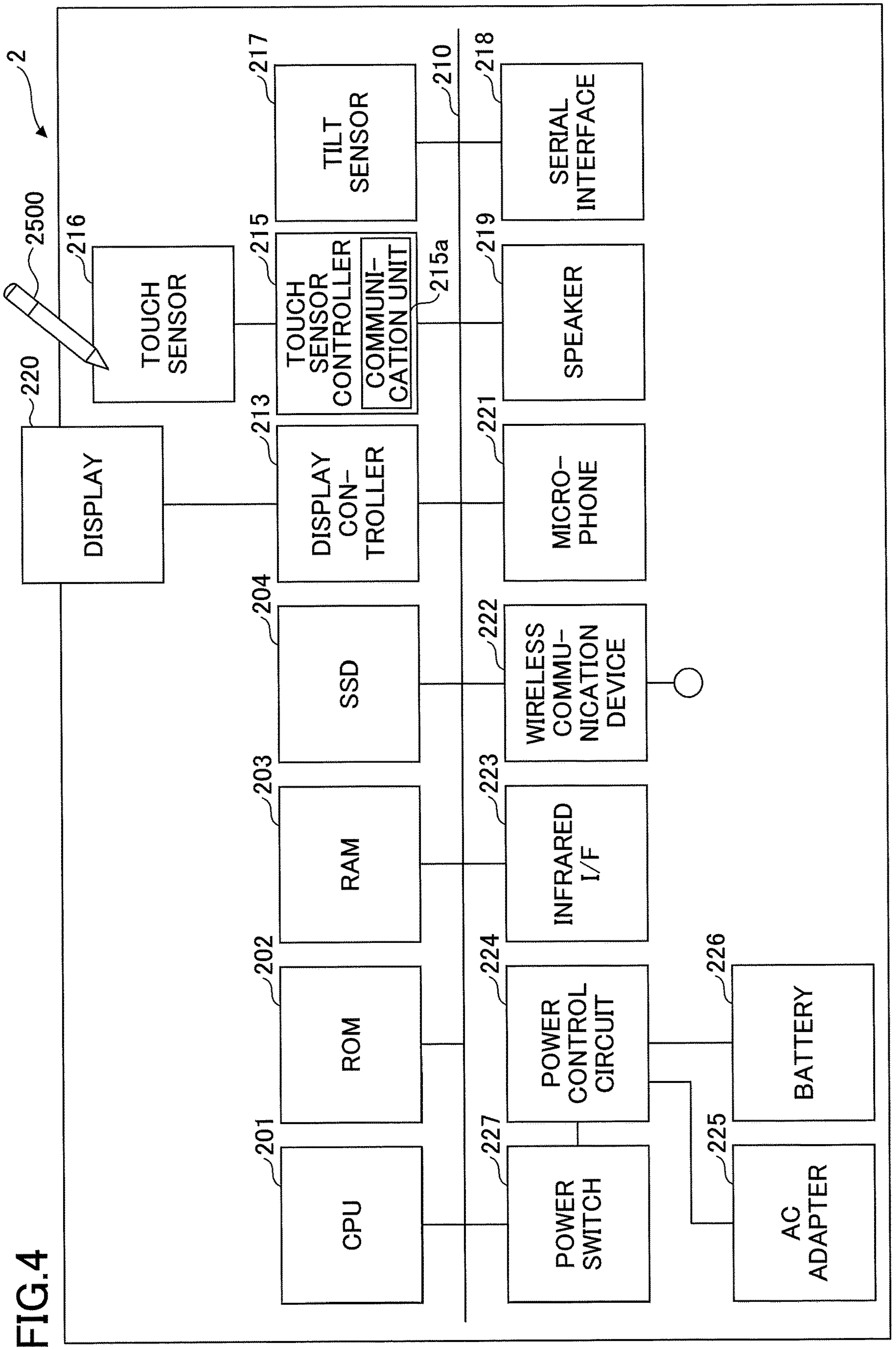
FIG. 4 is an example of a hardware configuration diagram of the display apparatus according to the first embodiment of the present invention.

Subsequently, the hardware configuration of the display apparatus 2 will be described with reference to FIG. 4. The display apparatus 2 has the configuration of an information processing apparatus or a computer as illustrated. FIG. 4 is an example of a hardware configuration diagram of the display apparatus 2. As illustrated in FIG. 4, the display apparatus 2 includes a Central Processing Unit (CPU) 201, a Read-Only Memory (ROM) 202, a Random Access Memory (RAM) 203, and a Solid State Drive (SSD) 204.

Among these, the CPU 201 controls the operation of the entire display apparatus 2. The ROM 202 stores the CPU 201 and programs used to drive the CPU 201, such as the Initial Program Loader (IPL). The RAM 203 is used as a work area of the CPU 201. The SSD 204 stores various data such as a program for the display apparatus 2.

The display apparatus 2 includes a display controller 213, a touch sensor controller 215, a touch sensor 216, the display 220, a power switch 227, a tilt sensor 217, a serial interface 218, a speaker 219, a microphone 221, a wireless communication device 222, an infrared interface (I/F) 223, a power control circuit 224, an alternate current (AC) adapter 225, and a battery 226.

The display controller 213 controls and manages the screen display to output an output image to the display 220 or the like. The touch sensor 216 detects that the pen 2500 or user's hand or the like (the pen or user's hand are input means) is in contact with the display 220. The touch sensor 216 also receives a pen ID.

The touch sensor controller 215 controls the processes of the touch sensor 216. The touch sensor 216 performs input of coordinates and detection of coordinates. The method for inputting coordinates and detecting coordinates is, for example, a method in which two light emitting and receiving devices, which are located at the both upper ends of the display 220, emit a plurality of infrared rays parallel to the display 220, the infrared rays are reflected by a reflecting member provided around the display 220, and a light receiving element receives light returning on the same optical path as the emitted light. The touch sensor 216 outputs, to the touch sensor controller 215, the position information where the infrared rays, emitted by the two light emitting and receiving devices, are blocked by an object, and the touch sensor controller 215 identifies the coordinate position that is the contact position of the object. The touch sensor controller 215 also includes a communication unit 215*a* that can communicate wirelessly with the pen 2500. For example, a commercially available pen may be used when communicating in a standard such as Bluetooth. When one or more pens 2500 are registered in the communication unit 215*a* in advance, the user can communicate without performing the connection setting for causing the pen 2500 to communicate with the display apparatus 2.

The power switch 227 is a switch for switching the power of the display apparatus 2 ON/OFF. The tilt sensor 217 is a sensor that detects the tilt angle of the display apparatus 2. The tilt sensor 217 is mainly used to detect the installation state in which the display apparatus 2 is used among the states illustrated in FIG. 2A, FIG. 2B, and FIG. 2C. According to the installation state, the thickness of the characters, etc., can be automatically changed.

The serial interface 218 is a communication interface with respect to an external device such as a Universal Serial Bus (USB). The serial interface 218 is used for input of information from external sources. The speaker 219 is used for audio output and the microphone 221 is used for audio input. The wireless communication device 222 communicates with a terminal carried by a user and relays, for example, a connection to the Internet. The wireless communication device 222 communicates via Wi-Fi, Bluetooth, or the like, but the communication standard is not limited. The wireless communication device 222 forms an access point, when the user sets an obtained Service Set Identifier (SSID) and password to a terminal that the user carries, the terminal can connect to the access point.

The wireless communication device 222 may have two access points.

a. Access point→Internet b. Access point→Internal network→Internet

The access point of a is for external users, and users cannot access the internal network, but can use the Internet. The access point of b is for internal users, and users can use the internal network and the Internet.

The infrared I/F 223 detects the adjacent display apparatus 2. Only the adjacent display apparatus 2 can be detected using straight infrared rays. Preferably, one infrared I/F 223 is provided on each side, to detect the direction in which the other display apparatus 2 is disposed with respect to the display apparatus 2. Accordingly, the screen can be widened, and handwriting information (handwriting information on another page, assuming the size of one display 220 as one page) or the like that has been handwriting in the past can be displayed on the adjacent display apparatus 2.

The power control circuit 224 controls the AC adapter 225 and the battery 226 that are power sources for the display apparatus 2. The AC adapter 225 converts the alternating current shared by the commercial power supply to a direct current (DC).

In the case of so-called electronic paper, the display 220 consumes little or no power to maintain the display of the image, so that the display 220 can also be driven by the battery 226. As a result, it is possible to use the display apparatus 2 for an application such as digital signage even in a location where it is difficult to connect a power source, such as an outdoor location.

The display apparatus 2 further includes a bus line 210. The bus line 210 is an address bus, a data bus, or the like for electrically connecting components such as the CPU 201 illustrated in FIG. 4.

The touch sensor 216 is not limited to an optical type. Various detection means may be used, such as a touch panel of an electrostatic capacitance type in which a contact position is identified by detecting a change in capacitance, a touch panel of a resistive film type in which a contact position is identified by a voltage change of two opposing resistive films, and a touch panel of an electromagnetic induction type in which an electromagnetic induction, generated when a contact object contacts the display unit, is detected and a contact position is identified. The touch sensor 216 may be of a method that does not require an electronic pen to detect the presence or absence of a touch at the tip end. In this case, a fingertip and a pen-shaped bar can be used for touch operations. Note that the pen 2500 need not be of the elongated pen type.

<Function of Apparatus>

Figure 5:
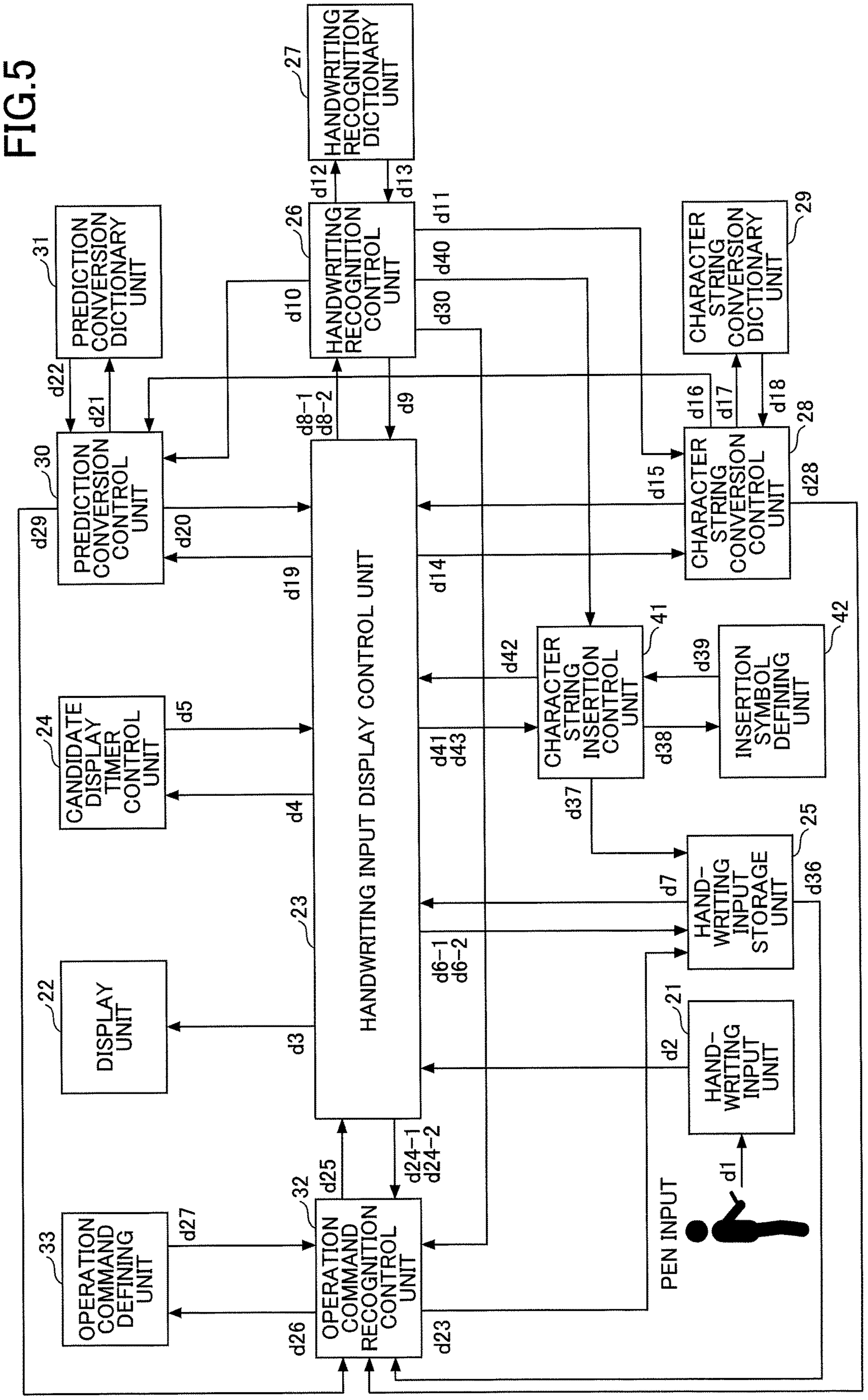
FIG. 5 is a functional block diagram illustrating an example of functions of the display apparatus (first embodiment) according to the first embodiment of the present invention.

Next, functions of the display apparatus 2 will be described with reference to FIG. 5. FIG. 5 is an example of a functional block diagram illustrating functions of the display apparatus 2. The display apparatus 2 includes a handwriting input unit 21, a display unit 22, a handwriting input display control unit 23, a candidate display timer control unit 24, a handwriting input storage unit 25, a handwriting recognition control unit 26, a handwriting recognition dictionary unit 27, a character string conversion control unit 28, a character string conversion dictionary unit 29, a prediction conversion control unit 30, a prediction conversion dictionary unit 31, an operation command recognition control unit 32, an operation command defining unit 33, a character string insertion control unit 41, and an insertion symbol defining unit 42. Each function of the display apparatus 2 is a function or means implemented as one of the components illustrated in FIG. 4 is operated by instructions from the CPU 201 according to a program loaded from the SSD 204 to the RAM 203.

The handwriting input unit 21 is implemented by the touch sensor 216 or the like and accepts handwriting input by a user. The handwriting input unit 21 converts a user's pen input d1 into pen operation data d2 (pen up, pen down, or pen coordinate data) and transmits the converted data to the handwriting input display control unit 23. The pen coordinate data is transmitted periodically as discrete values, and the coordinates between discrete values are complemented and computed.

The display unit 22 is implemented by the display 220 or the like to display handwriting data and an operation menu. The display unit 22 converts render data d3 written into a video memory by the handwriting input display control unit 23 into data corresponding to the characteristics of the display 220, and transmits the converted data to the display 220.

The handwriting input display control unit 23 performs overall control of handwriting input and display. The handwriting input display control unit 23 processes pen operation data d2 from the handwriting input unit 21 and transmits the pen operation data d2 to the display unit 22 to be displayed.

The candidate display timer control unit 24 is a display control timer of a selectable candidate. The candidate display timer control unit 24 generates a timing for starting the display of the selectable candidate and a timing for erasing the display of the selectable candidate by starting or stopping the timer. The candidate display timer control unit 24 receives a timer start request d4 (or may be a timer stop request) from the handwriting input display control unit 23 and transmits a timeout event d5 to the handwriting input display control unit 23.

The handwriting input storage unit 25 has a storage function for storing user data (handwriting data/character string data). The handwriting input storage unit 25 receives user data d6-1 from the handwriting input display control unit 23, stores the data in the handwriting input storage unit 25, receives an acquisition request d6-2 from the handwriting input display control unit 23, and transmits user data d7 stored in the handwriting input storage unit 25. The handwriting input storage unit 25 transmits position information d36 of the validated data to the operation command recognition control unit 32.

The handwriting recognition control unit 26 is a recognition engine for performing control with respect to on-line handwriting recognition. Unlike the general Optical Character Reader (OCR), the handwriting recognition control unit 26 recognizes, in parallel with the user's pen operations, characters (not only in Japanese but also in English and multiple other languages), numbers, symbols (%, $, &, etc.), and graphics (lines, circles, triangles, etc.). Control with respect to recognition is to perform processes up to converting handwriting data into a character code. Various algorithms have been devised for recognition methods, but in the present embodiment, details are omitted because known techniques of the related art can be used. The recognition may be performed by OCR, instead of in parallel with the user's pen operations.

The handwriting recognition control unit 26 receives pen operation data d8-1 from the handwriting input display control unit 23, executes handwriting recognition, and retains the handwriting recognition character string candidate. The handwriting recognition control unit 26 converts a handwriting recognition character string candidate d12 into a language character string candidate by using the handwriting recognition dictionary unit 27, and retains the language character string candidate. When an acquisition request d8-2 is separately received from the handwriting input display control unit 23, the handwriting recognition control unit 26 transmits the retained handwriting recognition character string candidate and a language character string candidate d9, to the handwriting input display control unit 23.

The handwriting recognition dictionary unit 27 is dictionary data for the language conversion of the handwriting recognition. The handwriting recognition dictionary unit 27 receives the handwriting recognition character string candidate d12 from the handwriting recognition control unit 26, converts the handwriting recognition character string candidate d12 into a language character string candidate d13 that seems linguistically credible, and transmits the language character string candidate d13 to the handwriting recognition control unit 26. For example, in the case of Japanese, the Japanese syllabary characters are converted into Chinese characters or katakana (the square form of Japanese syllabary characters).

The character string conversion control unit 28 controls the conversion to the character string of the conversion character string candidate. A conversion character string is a character string that is likely to be generated, including a handwriting recognition character string or a language character string. The character string conversion control unit 28 receives the handwriting recognition character string and a language character string candidate d11 from the handwriting recognition control unit 26, converts the received handwriting recognition character string and the language character string candidate d11 into a conversion character string candidate by using the character string conversion dictionary unit 29, and retains the conversion character string candidate. When an acquisition request d14 is separately received from the handwriting input display control unit 23, a conversion character string candidate d15 that is retained is transmitted to the handwriting input display control unit 23.

The character string conversion dictionary unit 29 is dictionary data for character string conversion. The character string conversion dictionary unit 29 receives a handwriting recognition character string and a language character string candidate d17 from the character string conversion control unit 28 and transmits a conversion character string candidate d18 to the character string conversion control unit 28.

The prediction conversion control unit 30 receives the handwriting recognition character string and a language character string candidate d10 from the handwriting recognition control unit 26, receives a conversion character string candidate d16 from the character string conversion control unit 28, and converts each of the received candidates into a prediction character string candidate using the prediction conversion dictionary unit 31. A prediction conversion character string is a character string that is likely to be generated, including a handwriting recognition character string, a language character string, or a conversion character string. When an acquisition request d19 is separately received from the handwriting input display control unit 23, a prediction character string candidate d20 is transmitted to the handwriting input display control unit 23.

The prediction conversion dictionary unit 31 is dictionary data for the prediction conversion. The prediction conversion dictionary unit 31 receives the handwriting recognition character string, the language character string candidate, and a conversion character string candidate d21 from the prediction conversion control unit 30, and transmits a prediction character string candidate d22 to the prediction conversion control unit 30.

The operation command recognition control unit 32 receives the handwriting recognition character string and a language character string candidate d30 from the handwriting recognition control unit 26, receives a conversion character string candidate d28 from the character string conversion control unit 28, and receives a prediction character string candidate d29 from the prediction conversion control unit 30. With respect to each of the aforementioned candidates, an operation command conversion request d26 is transmitted to the operation command defining unit 33, and an operation command candidate d27 is received from the operation command defining unit 33. The operation command recognition control unit 32 retains the operation command candidate d27.

When the operation command conversion request d26 partially matches the operation command definition, the operation command defining unit 33 transmits the operation command candidate d27 to the operation command recognition control unit 32.

The operation command recognition control unit 32 receives pen operation data d24-1 from the handwriting input display control unit 23, transmits a position information acquisition request d23 with respect to the validated data that has been previously input and validated, to the handwriting input storage unit 25, and retains the validated data specified by the pen operation data as the selection data (including the position information). The operation command recognition control unit 32 identifies selection data satisfying the position of the pen operation data d24-1 and a predetermined criteria. When an acquisition request d24-2 is separately received from the handwriting input display control unit 23, the retained operation command candidate and the identified selection data d25 are transmitted to the handwriting input display control unit 23.

The character string insertion control unit 41 receives a handwriting recognition character string and a language character string candidate d40 from the handwriting recognition control unit 26, transmits an insertion symbol determination request d38 with respect to the received information to the insertion symbol defining unit 42, and receives an insertion symbol determination result d39 from the insertion symbol defining unit 42. The character string insertion control unit 41 retains the insertion symbol determination result d39.

When the insertion symbol determination request d38 includes an insertion symbol definition, the insertion symbol defining unit 42 transmits the insertion symbol determination result d39 with insertion to the character string insertion control unit 41.

The character string insertion control unit 41 receives pen operation data d43 from the handwriting input display control unit 23, transmits an acquisition request d37 for the validated data that has been previously input and validated to the handwriting input storage unit 25, and retains the pen operation data and the validated data (including the position information). The character string insertion control unit 41 determines whether the position of the handwriting data (the pen operation data) is near the position of the validated data. When an insertion determination result acquisition request d41 is separately received from the handwriting input display control unit 23, a retained insertion determination result d42 is transmitted to the handwriting input display control unit 23.

<User Authentication>

In the present embodiment, control is performed using the result of user authentication, so it is preferable that the display apparatus 2 has a function to authenticate the user. Therefore, the functions related to user authentication will be described with reference to FIG. 6.

Figure 6:
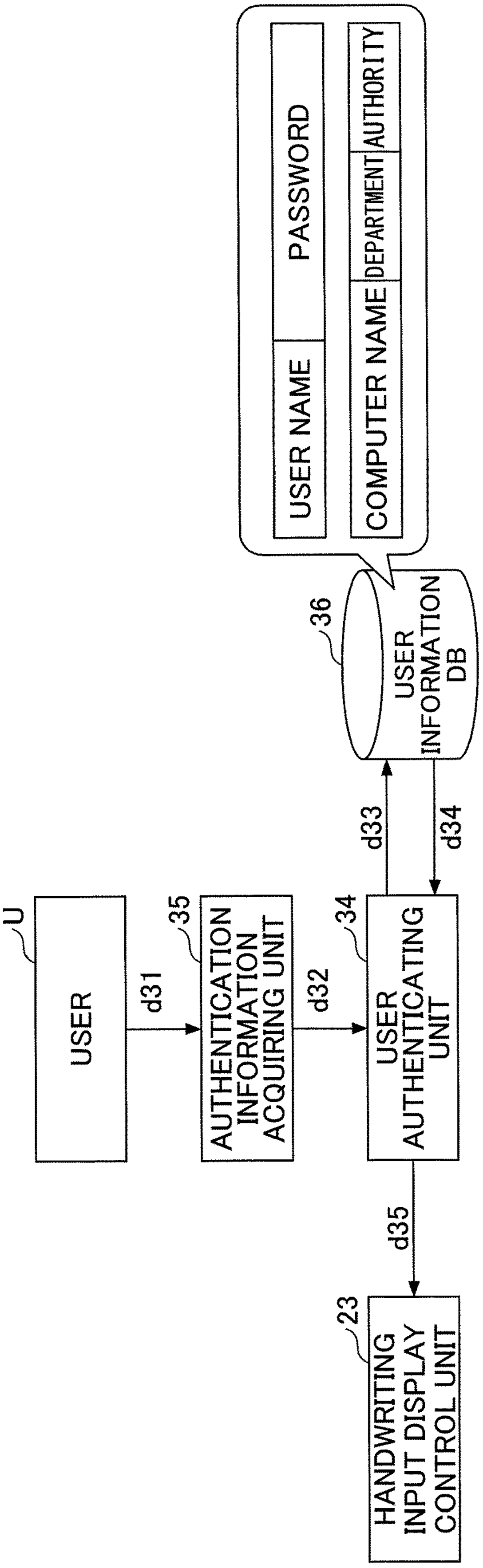
FIG. 6 is a functional block diagram illustrating an example of functions of the display apparatus related to user authentication according to the first embodiment of the present invention.

FIG. 6 is a block diagram illustrating functions related to user authentication by the display apparatus 2. In FIG. 6, only the handwriting input display control unit 23 is illustrated as the function associated with a user authenticating unit (the user authentication means). However, each function illustrated in FIG. 5 may use the user authentication result.

An authentication information acquiring unit 35 acquires authentication information d31 from the user U. The authentication information d31 may be a card number of the IC card, a user ID and password, or biometric information such as a fingerprint. The user authenticating unit 34 acquires authentication information d32 from the authentication information acquiring unit 35 and searches for authentication information d33 in a user information DB 36. When a user matching the search exists, user information d34 is acquired from the user information DB 36. User information can be information representing user attributes, for example, a user name, a password, a user computer name, a department, the authority level, etc.

The user authenticating unit 34 transmits user information d35 to the handwriting input display control unit 23, so that the handwriting input display control unit 23 can execute an operation command using the user information. An operation command using user information is described in FIGS. 11A to 11C.

The authentication function may be included in an external authentication server, in addition to being included in the display apparatus 2. In this case, the display apparatus 2 transmits the authentication information to the authentication server and acquires the authentication result and user information.

<Defined Control Data>

Next, the defined control data used for various processing by the display apparatus 2 will be described with reference to FIG. 7. FIG. 7 illustrates an example of defined control data. The example of FIG. 7 illustrates the control data for each control item.

Figure 20:
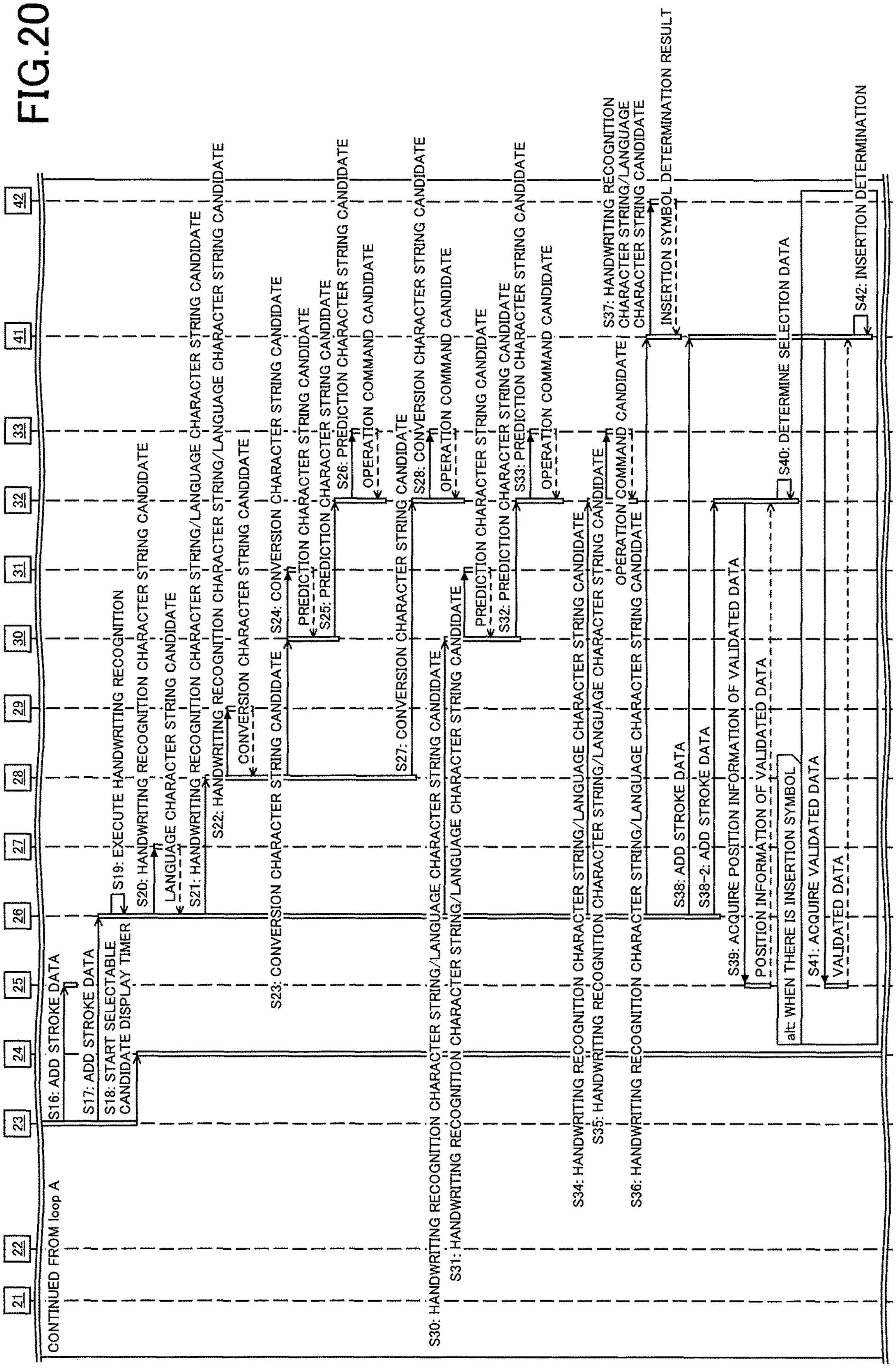
FIG. 20 is a sequence diagram illustrating a process of displaying a character string candidate and an operation command candidate by the display apparatus (part 3) according to the first embodiment of the present invention.

A selectable candidate display timer 401 defines the time until the selectable candidate is displayed (one example of a first time). This is because selectable candidates are not displayed while handwriting is being input. In FIG. 7, it is meant that the selectable candidate is displayed unless pen down occurs (a pen down operation is detected) less than or equal to (or less than) a timerValue of 500 ms from the pen up (from when the pen up operation is detected). The selectable candidate display timer 401 is retained by the candidate display timer control unit 24. The selectable candidate display timer 401 is used at the start selectable candidate display timer in step S18 of FIG. 20, which will be described below.

Figure 21:
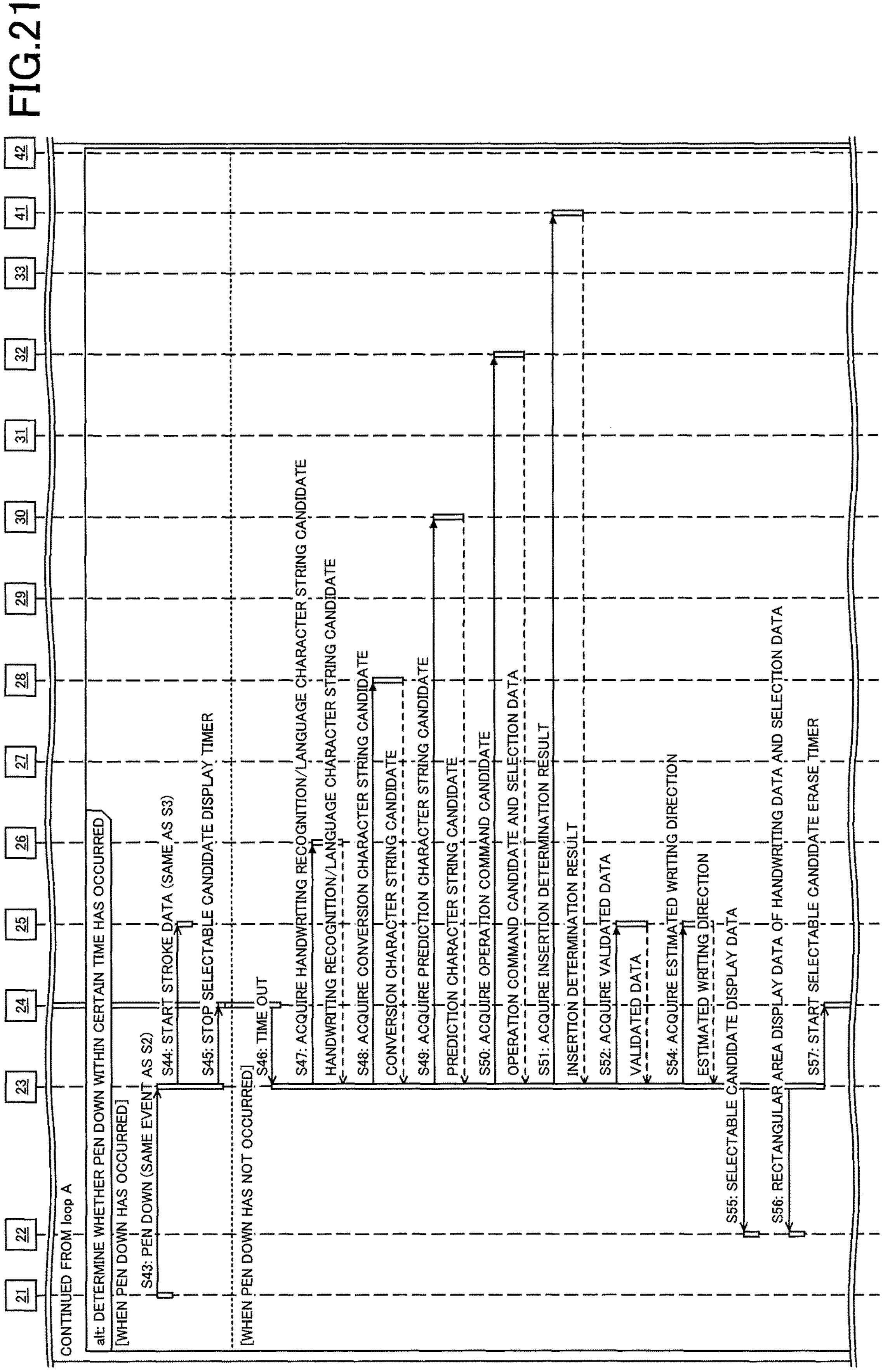
FIG. 21 is a sequence diagram illustrating a process of displaying a character string candidate and an operation command candidate by the display apparatus (part 4) according to the first embodiment of the present invention.
Figure 22:
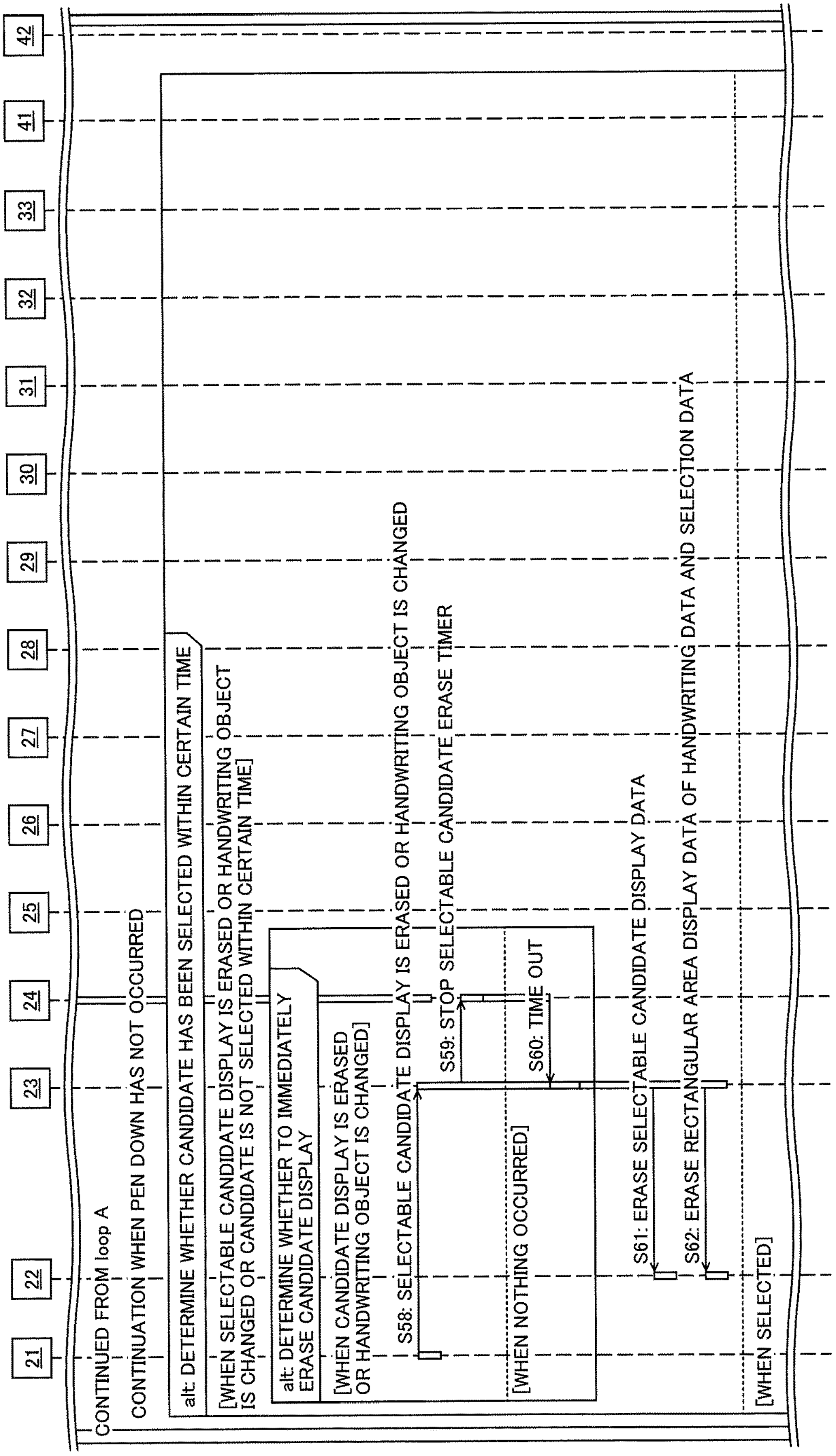
FIG. 22 is a sequence diagram illustrating a process of displaying a character string candidate and an operation command candidate by the display apparatus (part 5) according to the first embodiment of the present invention.

A selectable candidate erase timer 402 defines the time until the displayed selectable candidate is erased (one example of a second time). This is to erase the selectable candidate when the user does not select the selectable candidate. In FIG. 7, it is meant that the selectable candidate display is erased unless the selectable candidate is selected less than or equal to (or less than) TimerValue=5000 ms from the display of the selectable candidate. The selectable candidate erase timer 402 is retained by the candidate display timer control unit 24. The selectable candidate erase timer 402 is used at the start selectable candidate erase timer in step S57 of FIG. 21.

Figure 19:
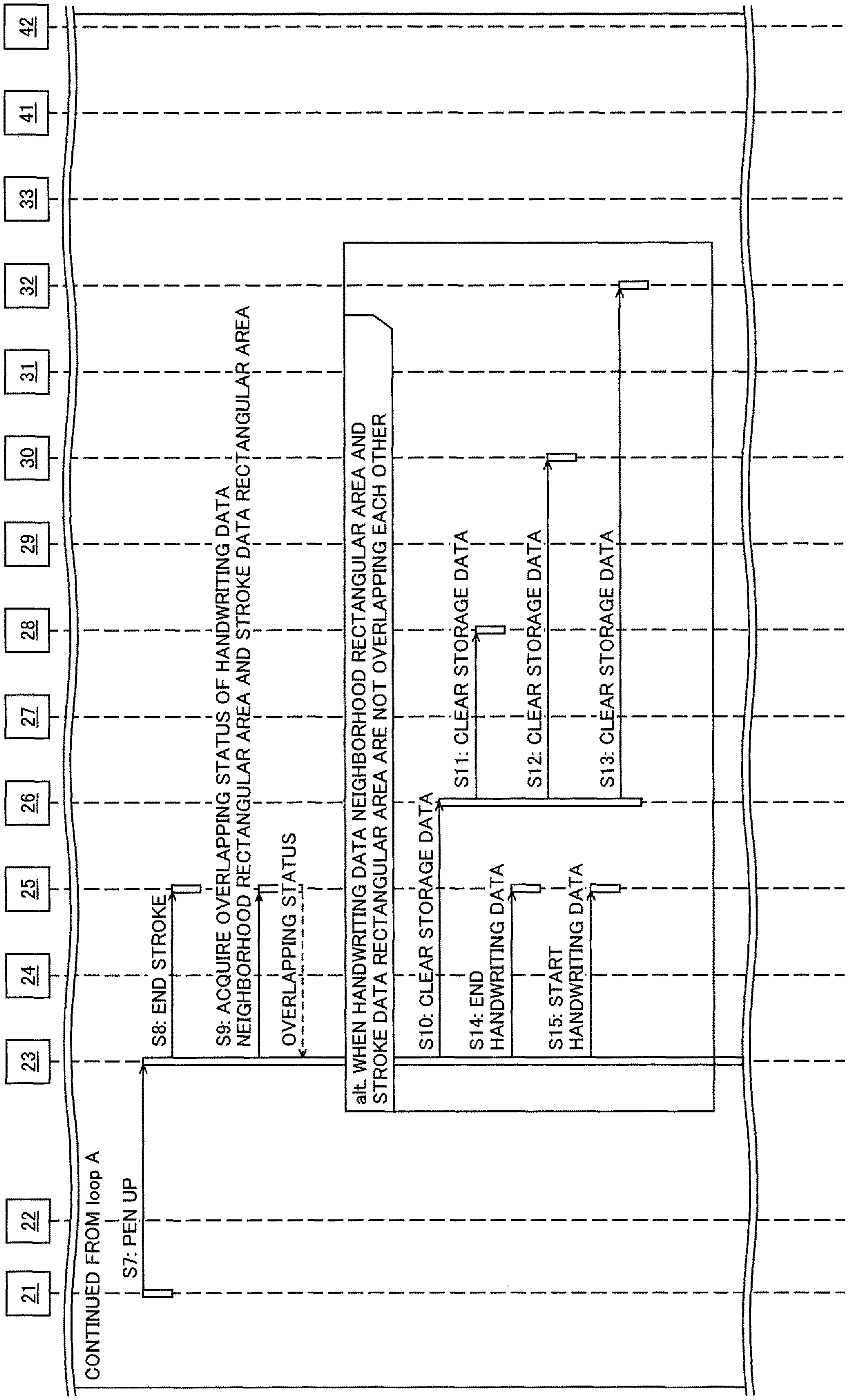
FIG. 19 is a sequence diagram illustrating a process of displaying a character string candidate and an operation command candidate by the display apparatus (part 2) according to the first embodiment of the present invention.

A handwriting data neighborhood rectangular area 403 defines a rectangular area considered to be near the handwriting data. In the example of FIG. 7, the handwriting data neighborhood rectangular area 403 is obtained by enlarging the rectangular area of the handwriting data horizontally by 50% of the estimated character size and vertically by 80% of the estimated character size. In the example illustrated in FIG. 7, the estimated character size is a percentage (specified %). However, when the unit is "mm" or the like, the length can be fixed. The handwriting input storage unit 25 retains the handwriting data neighborhood rectangular area 403. An estimated character size 405 is used in step S9 of FIG. 19 to determine the overlapping status of the handwriting data neighborhood rectangular area and the stroke data rectangular area.

Figure 23:
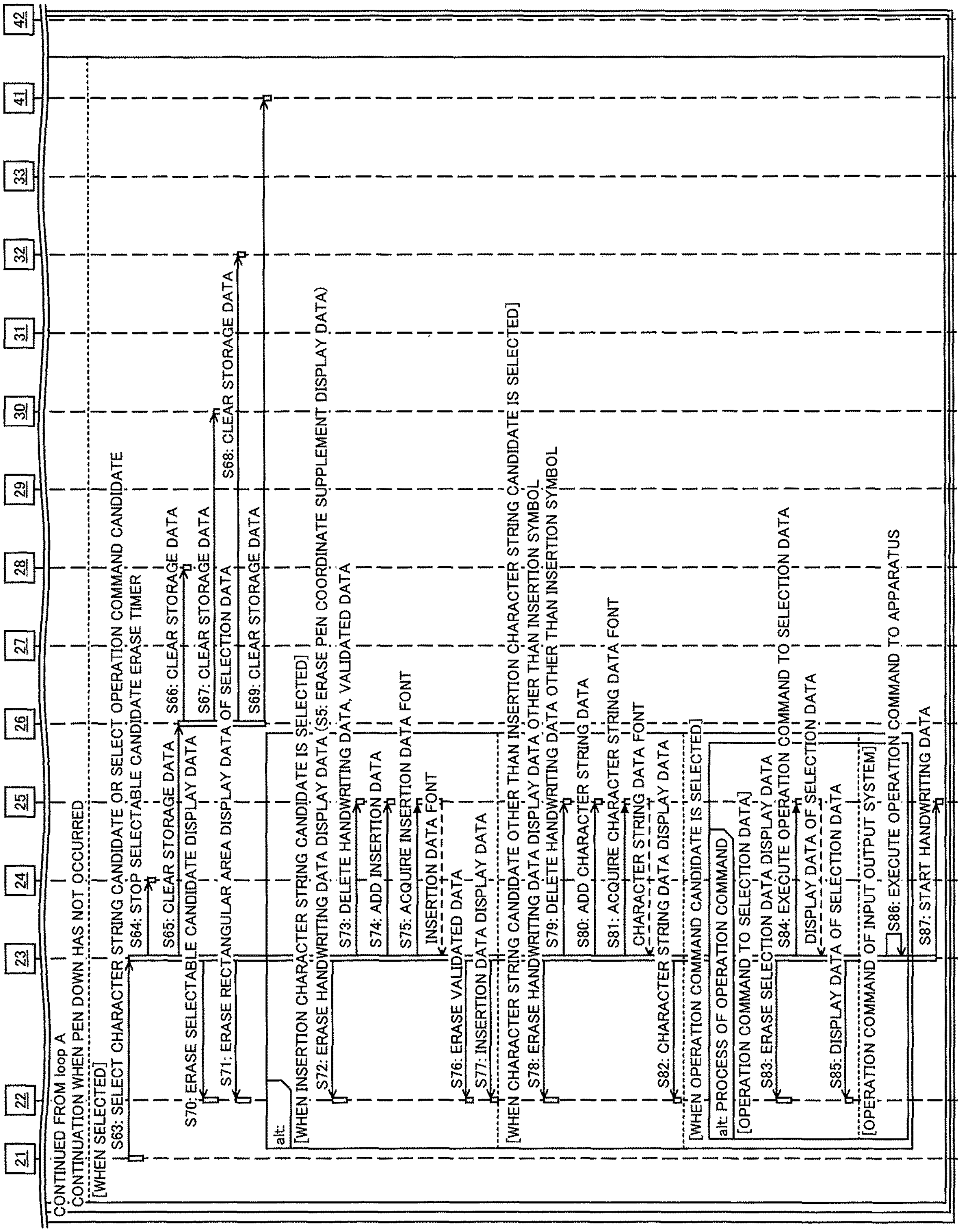
FIG. 23 is a sequence diagram illustrating a process of displaying a character string candidate and an operation command candidate by the display apparatus (part 6) according to the first embodiment of the present invention.

An estimated writing direction/character size determination condition 404 defines a constant for determining the writing direction and character size measurement direction. In the example of FIG. 7, it is meant that when the difference between the time when stroke data was added first in the handwriting data rectangular area and the time when stroke data was last added is greater than or equal to or greater than MinTime=1000 ms, and the difference between the horizontal length (width) and the vertical length (height) of the handwriting data rectangular area is greater than or equal to or greater than MinDiff=10 mm, and when the horizontal length is greater than or equal to or longer than the vertical length, it is determined that the estimated writing direction is "horizontal" and the estimated character size is a vertical length. When the horizontal length is less than or equal to or shorter than the vertical length, it means that the estimated writing direction is determined to be "vertical" and the estimated character size is determined to be the horizontal length. When the above conditions are not met, the estimated character direction is "horizontal" (DefaultDir="Horizontal") and the estimated character size is the longer length among the horizontal length and the vertical length. The estimated writing direction/character size determination condition 404 is retained by the handwriting input storage unit 25. The estimated writing direction/character size determination condition 404 is used in the acquire estimated writing direction in step S54 of FIG. 21 and the acquire insertion data font and the acquire character string data font in steps S75 and S81 of FIG. 23.

The estimated character size 405 defines data for estimating the size of a character or the like. In the example of FIG. 7, it is meant that the estimated character size determined by the estimated writing direction/character size determination condition 404 is compared to a small character 405*a* (hereinafter referred to as the minimum font size) of the estimated character size 405 and a large character 405*c* (hereinafter referred to as the maximum font size). When the estimated character size is less than or equal to or smaller than the minimum font size, the estimated character size is determined to be the minimum font size. When the estimated character size is greater than or equal to or larger than the maximum font size, the estimated character size is determined to be the maximum font size. Otherwise, the character size is determined to be a character size of a medium character 405*b*. The estimated character size 405 is retained by the handwriting input storage unit 25. The estimated character size 405 is used in the acquire insertion data font and the acquire character string data font in steps S75 and S81 of FIG. 23.

Specifically, the handwriting input storage unit 25 uses the font of the closest size when comparing the estimated character size determined by the estimated writing direction/character size determination condition 404 with the Font Size of the estimated character size 405. For example, when the estimated character size is less than or equal to or smaller than 25 mm (FontSize of small character), "small character" is used. When the estimated character size is greater than or equal to or larger than 25 mm but less than or equal to or smaller than 50 mm (FontSize of medium character), "medium character" is used. When the estimated character size is greater than or equal to or larger than 100 mm (FontSize of large character), the "large character" is used. The "small character" 405*a* uses the Ming-style font of 25 mm (FontStyle="Ming-style font" Font Size="25 mm"), the "medium character" 405*b* uses the Ming-style font of 50 mm (FontStyle="Ming-style font" Font="50 mm"), and the "large character" 405*c* uses the Gothic-style font of 100 mm (FontStyle="Gothic-style font" Font="100 mm"). When the font size or the style type is desired to be increased, the type of the estimated character size 405 can be increased.

A crossing line determination condition 406 defines the data used to determine whether a plurality of pieces of validated data have been selected. The handwriting data is a single stroke data. In the example illustrated in FIG. 7, the validated data, in which the long side length of the handwriting data is greater than or equal to or greater than 100 mm (MinLenLongSide="100 mm") and the short side length is less than or equal to or less than 50 mm (MaxLenShortSide="50 mm"), and the overlap rate of the long side direction and the short side direction with the handwriting data is greater than or equal to or greater than 80% (MinOverlap rate="80%"), is determined as the selection data. The operation command recognition control unit 32 retains the crossing line determination condition 406. The crossing line determination condition 406 is used for the crossing line determination to determine selection data in step S40 of FIG. 20.

A surrounding line determination condition 407 defines the data used to determine whether the handwriting data is a surrounding line. In the example of FIG. 7, the operation command recognition control unit 32 determines that the validated data in which the overlap rate in the long side direction and the short side direction of the handwriting data is greater than or equal to or greater than 100% (MinOverlap rate="100%"), as the selection data. The surrounding line determination condition 407 is retained by the operation command recognition control unit 32. The surrounding line determination condition 407 is used in the surrounding line determination of selection data in step S40 of FIG. 20.

Either one of the crossing line determination condition 406 or the surrounding line determination condition 407 may be determined with priority. For example, when the crossing line determination condition 406 is eased (when it is made easier to select the crossing line) and the surrounding line determination condition 407 is made strict (when a value for which only the surrounding line can be selected), the operation command recognition control unit 32 may give priority to the surrounding line determination condition 407.

An insertion determination condition 408 defines a threshold value to be used to determine whether handwriting data is to be inserted into validated data. In the example of FIG. 7, the character string insertion control unit 41 determines that when the shortest distance between the handwriting data and the validated data is less than or equal to or less than "2 mm", the handwriting data is inserted into the validated data. This threshold value is an example.

<Example of Dictionary Data>

The dictionary data will be described with reference to FIGS. 8 to 10. FIG. 8 is an example of the dictionary data of the handwriting recognition dictionary unit 27, FIG. 9 is an example of the dictionary data of the character string conversion dictionary unit 29, and FIG. 10 is an example of the dictionary data of the prediction conversion dictionary unit 31. Note that each of these pieces of dictionary data is used in steps S20 to S30 of FIG. 20.

In the present embodiment, the conversion result by the dictionary data of the handwriting recognition dictionary unit 27 of FIG. 8 is referred to as a language character string candidate, the conversion result by the dictionary data of the character string conversion dictionary unit 29 of FIG. 9 is referred to as a conversion character string candidate, and the conversion result by the dictionary data of the prediction conversion dictionary unit 31 of FIG. 10 is referred to as a prediction character string candidate. For each piece of dictionary data, "before conversion" indicates the character string by which dictionary data is to be searched, "after conversion" indicates the character string after conversion corresponding to the character string used for the search, and "probability" indicates the probability selected by the user. The probability is calculated from the result of the user selecting each character string in the past. Therefore, probabilities may be calculated for each user. Various algorithms have been devised to calculate probabilities, but probabilities can be calculated in an appropriate way, and the details will be omitted. According to the present embodiment, character string candidates from the estimated writing direction are displayed in a descending order of selection probability.

In the dictionary data of the handwriting recognition dictionary unit 27 of FIG. 8, the handwriting "gi" (Japanese syllabary characters (1) pronounced as "gi") is converted into Chinse characters (1) by a probability of 0.55 and into Chinse characters (2) by a probability of 0.45; and handwriting "gishi" (Japanese syllabary characters (2) pronounced as "gishi") is converted into Chinse characters (3) by a probability of 0.55 and into Chinse characters (4) by a probability of 0.45. The same applies to the other character strings of "before conversion". In FIG. 8, the character string of "before conversion" is a handwritten Japanese syllabary characters, however, characters other than Japanese syllabary characters may be registered as "before conversion".

In the dictionary data of the character string conversion dictionary unit 29 of FIG. 9, the character string of Chinse characters (1) is converted into Chinse characters (2) by a probability of 0.95, and the character string of Chinse characters (3) is converted into Chinse characters (4) by a probability of 0.85. The same applies to the other character strings of "before conversion".

In the dictionary data of the prediction conversion dictionary unit 31 of FIG. 10, the character string of Chinse characters (1) is converted into Chinse characters (2) by a probability of 0.65, and the character string of Chinse characters (3) is converted into Chinse characters (4) by a probability of 0.75. In FIG. 10, the character strings of "before conversion" are all Chinse characters, however, characters other than Chinse characters may be registered as "before conversion".

The dictionary data is not dependent on a particular language, and any character string may be registered as before conversion and after conversion.

<Operation Command Definition Data Retained by the Operation Command Defining Unit>

Next, the operation command definition data used by the operation command recognition control unit 32 will be described with reference to FIGS. 11A to 12. FIGS. 11A to 11C illustrate examples of operation command definition data, system definition data, and insertion symbol definition data held by the operation command defining unit 33.

FIG. 11A illustrates an example of operation command definition data. The operation command definition data illustrated in FIG. 11A is an example of the operation command definition data when there is no selection data selected according to handwriting data, and all the operation commands that operate the display apparatus 2 are targets. The operation command of FIG. 11A includes an operation command name (Name), a character string that partially matches the character string candidate (String), and an operation command character string (Command) to be executed. In the operation command character string, "%~%" is a variable and is associated with the system definition data as illustrated in FIG. 11B. In other words, "%-%" is replaced by the system definition data illustrated in FIG. 11B.

First, operation command definition data 701 indicates that the name of the operation command is "read minutes template", the character string that partially matches the character string candidate is "minutes" or "template", and the operation command character string to be executed is "ReadFile https://%username%:%password%@server.com/template/minutes.pdf". In this example, system definition data of "%~%" is included in the operation command character string to be executed, and "%username%" and "%password%" are replaced by system definition data items 704 and 705, respectively. Therefore, the final operation command character string is "ReadFile https://taro.tokkyo:x2PDHTyS@server.com/template/minutes.pdf", indicating that the file "https://taro.tokkyo:x2PDHTyS@server.com/template/minutes.pdf" is read (ReadFile).

Operation command definition data 702 indicates that the name of the operation command is "store in minutes folder", the character string that partially matches the character string candidate is "minutes" or "store", and that the operation command character string to be executed is "WriteFile https://%username%:%password%@server.com/minutes/%machinename%_%yyyy-mm-dd%.pdf". Similar to the operation command definition data 701, "%username%", %password%", and "%machinename%" in the operation command character string are replaced by system definition data 704 to 706, respectively. Note that "% yyyy-mm-dd %" is to be replaced by the current date. For example, when the current date is Sep. 26, 2018, "% yyyy-mm-dd %" will be replaced by "2018-09-26". The final operation command to be executed is "WriteFile https://taro.tokkyo:x2PDHTyS@server com/minutes/%My-Machine_2018-09-26.pdf", and it is indicated to store the minutes in a file named "https://taro.tokkyo:x2PDHTyS@server.com/minutes/%My-Machine_2018-09-26.pdf" (WriteFile).

Operation command definition data 703 indicates that the name of the operation command is "print out", the character string that partially matches the character string candidates is "print", and the operation command character string to be executed is "PrintFile https://%username%:%password%@server.com/print/%machinename%-"%yyyy-mm-dd%.pdf". When the operation command character strings are replaced as in operation command definition data 702, the final operation command to be executed is "PrintFile https://taro.tokkyo:x2PDHTyS@server com/print/%My-Machine_201809-26.pdf", and it is indicated that the file named "https://taro.tokkyo:x2PDHTyS@server.com/print/%My-Machine_2018-09-26.pdf" is to be printed (PrintFile). That is, the file is transmitted to the server. The user allows the printer to communicate with the server, and when the file is specified, the printer prints the contents of the file on paper.

As described above, the operation command definition data 701 to 703 can be identified from the character string candidate, the operation command can be displayed by a user inputting handwriting. When user authentication is successful, "%username%", %password%" or the like of the operation command definition data will be replaced in the user information, and thus the input and output of the file can be performed in association with the user.

When user authentication is not performed (when authentication is unsuccessful but the user can use the display apparatus 2, authentication unsuccessful is also included), "%username%", %password%", and the like are replaced with those of the display apparatus 2 set in advance. Therefore, even without user authentication, the input/output of a file can be performed in association with the display apparatus 2.

FIG. 11C illustrates an example of insertion symbol definition data. The insertion symbol definition data defines an insertion symbol for determining whether a handwriting recognition candidate or a language character string candidate recognized by the handwriting recognition control unit 26 is an insertion symbol. Insertion symbol definition data 721 indicates that the character string matching the handwriting recognition candidate or the language character string candidate is "^" and the like. Insertion symbol definition data 722 indicates that the character string matching the handwriting recognition candidate or the language character string candidate is "v" and the like. Insertion symbol definition data 723 indicates that the character string matching the handwriting recognition candidate or the language character string candidate is "<" and the like. Insertion symbol definition data 724 indicates that the character string matching the handwriting recognition candidate or the language character string candidate is ">" and the like. The pieces of insertion symbol definition data 725 to 728 indicate that the character string matching the handwriting recognition candidate or the language character string candidate may include "←", "↑", "↓,", and "→".

Next, the operation command definition data when handwriting data is present, that is, the operation command definition data of the edit group and the decorate group will be described. FIG. 12 illustrates an example of the operation command definition data when there is selection data selected according to handwriting data. The operation command definition data of FIG. 12 includes an operation command name (Name), a group name (Group) of the operation command candidates, and an operation command character string (Command) to be executed.

Operation command definition data 707 defines the operation command of the edit group (Group="Edit"), and is an example of the definition data of the operation command names "erase", "move", "rotate", and "select" of the edit group. That is, these operation commands are displayed for the selection data so that the user can select the desired operation command.

Operation command definition data 708 defines the operation commands of the decorate group (Group="Decorate"), and is an example of definition data of the operation command names "thick", "thin", "large", "small", and "underline" of the decorate group. These operation commands are displayed for the selection data so that the user can select the desired operations command. Further, color operation commands may be displayed.

Accordingly, as the user selects the selection data according to handwriting data, the operation command definition data 707, 708 is identified, so that the user can display the operation command by handwriting input.

<Example of Selectable Candidate>

Figure 13:
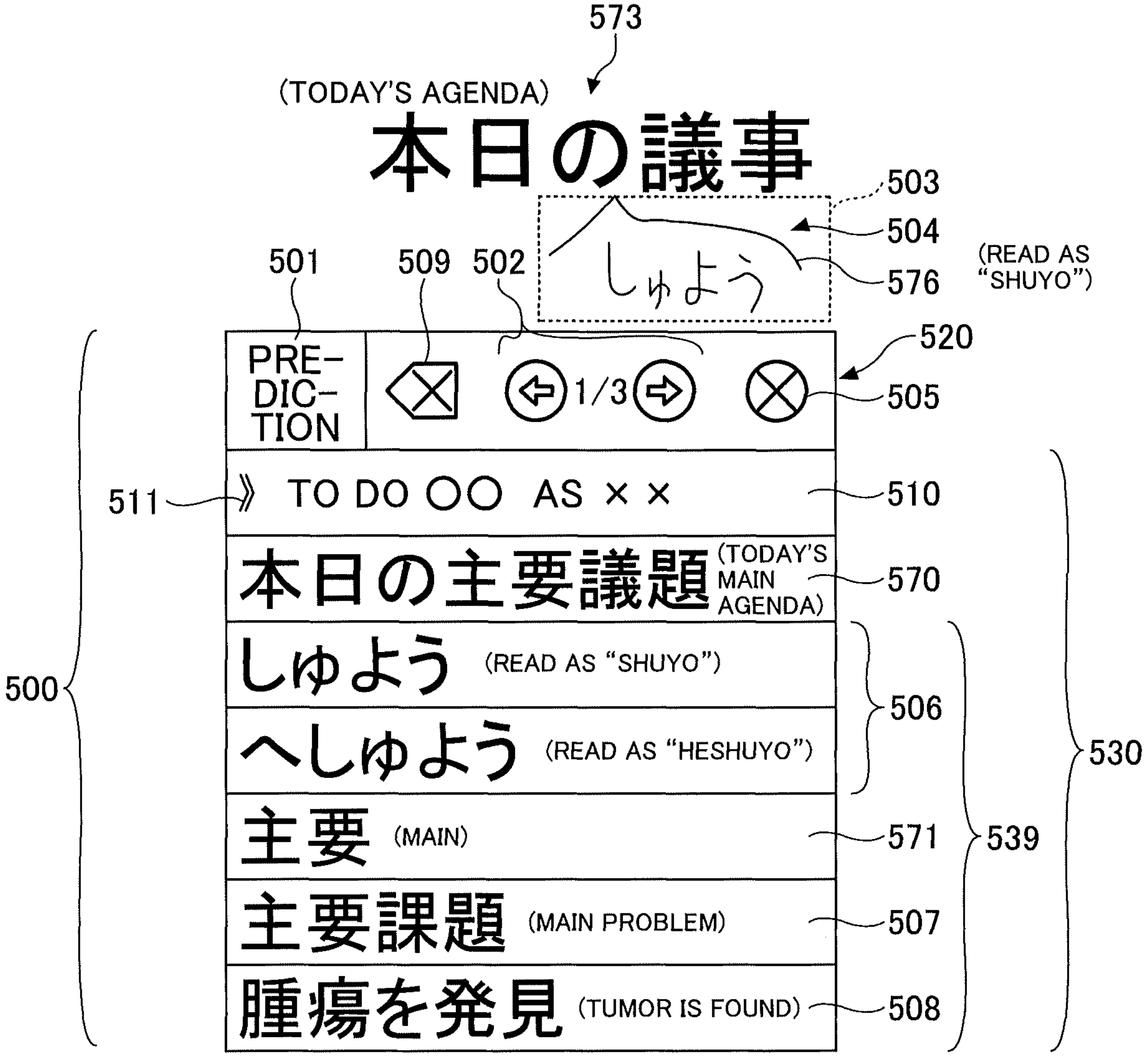
FIG. 13 is a diagram illustrating an example of an operation guide and a selectable candidate displayed by the operation guide when there is no selection data according to the first embodiment of the present invention.

FIG. 13 illustrates the operation guide 500 and examples of selectable candidates 530 displayed by the operation guide 500. As the user handwrites the handwriting data 504 (due to the timeout of the selectable candidate display timer), the operation guide 500 is displayed. The operation guide 500 includes an operation header 520, an operation command candidate 510, the insertion character string candidate 570, a handwriting recognition character string candidate 506, the language character string candidate 571, a conversion character string candidate 507, a character string/prediction conversion candidate 508, and a handwriting data rectangular area display 503. The selectable candidates 530 are the operation command candidate 510, the insertion character string candidate 570, the handwriting recognition character string candidate 506, the language character string candidate 571, the conversion character string candidate 507, and the character string/prediction conversion candidate 508. Candidates in the selectable candidates 530 excluding the operation command candidate 510 are referred to as character string candidates 539.

The operation header 520 has buttons 501, 509, 502, and 505. The button 501 accepts a switching operation of switching between prediction conversion and syllabic conversion. In the example of FIG. 13, when a user presses the button 501 representing "prediction", the handwriting input unit 21 accepts this instruction and reports the instruction to the handwriting input display control unit 23, and the display unit 22 changes the display to the button 501 representing "syllabic". After the change, the character string candidates 539 are arranged in descending order of probability of "syllabic conversion".

The button 502 is for performing the page operation of the candidate display. In the example of FIG. 13, the candidate display page includes 3 pages, and currently the first page is displayed. The button 505 accepts an instruction to erase the operation guide 500. When the user presses the button 505, the handwriting input unit 21 accepts this instruction and reports the instruction to the handwriting input display control unit 23, and the display unit 22 erases the display other than the handwriting data. The button 509 accepts an instruction to collectively erase the display. When the user presses the button 509, the handwriting input unit 21 accepts this instruction and reports the instruction to the handwriting input display control unit 23, and the display unit 22 erases all of the displayed information illustrated in FIG. 13, including handwriting data, to allow the user to rewrite handwriting from the beginning.

In FIG. 13, the handwriting data 504 is the insertion symbol 576 and the characters "shuyo" (the pronunciation of "main" written in Japanese syllabary characters). The handwriting data rectangular area display 503 surrounding the handwriting data 504 is displayed as a dotted frame. These display procedures will be described with reference to the sequence diagrams of FIGS. 18 to 23.

The insertion character string candidate 570 is a character string candidate in which the handwriting recognition character string candidate 506, the language character string candidate 571, the conversion character string candidate 507, or the character string/prediction conversion candidate 508 is inserted into the validated data 573. Multiple insertion character string candidates 570 may be displayed. The handwriting recognition character string candidate 506, the language character string candidate 571, the conversion character string candidate 507, or the character string/prediction conversion candidate 508 may be referred to as a "character string based on the handwriting data 504".

As the handwriting recognition character string candidate 506, the language character string candidate 571, the conversion character string candidate 507, and the character string/prediction conversion candidate 508, the respective character string candidates are arranged in a probability descending order. The character strings read as "shuyo" (the pronunciation of "main" written in Japanese syllabary characters) and "heshuyo" of the handwriting recognition character string candidates 506, are candidates of handwriting recognition results. This example correctly recognizes "shuyo". In "heshuyo", "he" (the pronunciation of the Japanese syllabary character that looks like part of the insertion symbol) is the handwriting recognition result of the insertion symbol 576. It is detected that "he" is the insertion symbol 576 by the insertion symbol definition data 721, and, therefore, the character string insertion control unit 41 can separate the insertion symbol from the handwriting recognition result. Also, the insertion symbol need not be the first letter of the handwriting data, but can be recognized as the insertion symbol 576 when the user handwrites the insertion symbol 576 after handwriting, for example, "shuyo".

The language character string candidate 571 is a character string candidate obtained by performing syllabic conversion on the handwriting recognition candidate. In this example, "shuyo" of the handwriting recognition character string candidate 506 (the pronunciation of "main" written in Japanese syllabary characters) has been converted to "main" in the language character string candidate 571 (the representation of "main" written in Chinse characters). The conversion character string candidate 507 is a conversion character string candidate converted from the handwriting recognition character string candidate 506 and the language character string candidate 571. In this example, "main problem" (the representation of "main problem" written in Chinse characters) including the language character string candidate "main" is displayed. The character string/prediction conversion candidate 508 is a prediction character string candidate converted from the handwriting recognition character string candidate 506, the language character string candidate 571, or the conversion character string candidate 507. In this example, "tumor is found" is displayed (the representation of "tumor is found" written in Chinse characters is displayed because the pronunciation of "shuyo" is similar to the meaning "tumor" in Japanese).

The operation command candidate 510 is a candidate of the operation command (operation command candidate) selected based on the operation command definition data 701 to 703 of FIG. 11A. In the example illustrated in FIG. 13, the initial character ">>" 511 is an operation command candidate. When there is operation command definition data partially matching operation command candidate 510 "shuyo", "heshuyo", "main", and "main problem", this is displayed as the operation command candidate 510. As described above, the operation command candidate is displayed when operation command definition data including the converted character string is found. Therefore, operation command candidate is not always displayed.

As illustrated in FIG. 13, the character string candidates 539 and the operation command candidate 510 are displayed at the same time (together), so that the user can select both the character string candidate to be input and the operation command.

<Example of Specifying Selection Data>

The display apparatus 2 according to the present embodiment can specify the selection data, as the user selects validated data by handwriting. The selection data is subject to editing or decorating.

FIGS. 14A to 14D are examples of diagrams for explaining examples of specifying selection data. In FIGS. 14A to 14D, handwriting data 11 is represented by a black solid line, a handwriting data rectangular area 12 is grayed out, validated data 13 is represented by a black line, and a selection data rectangular area 14 is represented by a dotted line. A lowercase alphabetical letter is appended to the reference numeral to distinguish between these pieces of information of different examples. Further, the crossing line determination condition 406 or the surrounding line determination condition 407 of the defined control data illustrated in FIG. 7 is used as the determination condition (whether a predetermined relationship is present) for determining the validated data as the selection data.

Figure 14A:
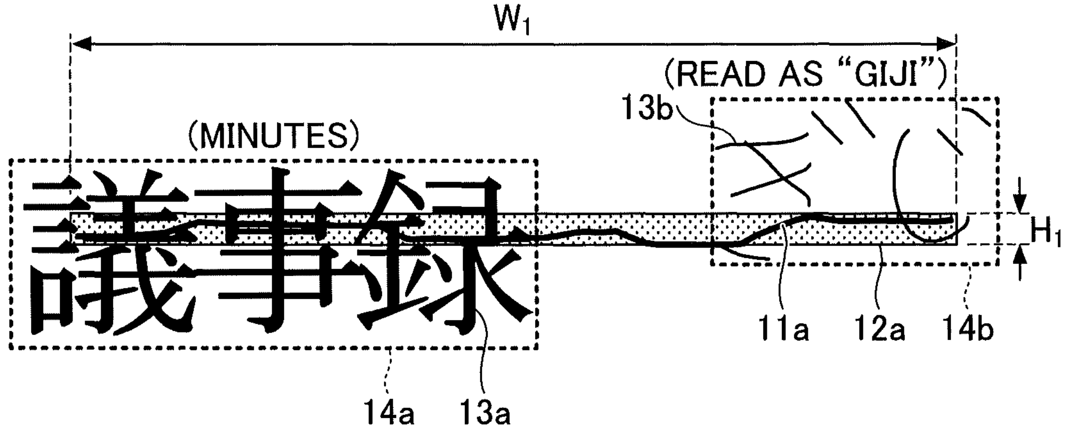
FIGS. 14A to 14D are examples of diagrams illustrating specifying selection data according to the first embodiment of the present invention.

FIG. 14A illustrates an example in which the user specifies the two pieces of validated data 13*a* and 13*b* in horizontal writing, by a crossing line (handwriting data 11*a*). In this example, the length H1 of the short side and the length W1 of the long side of the handwriting data rectangular area 12*a* satisfy the conditions of the crossing line determination condition 406, and the overlap rate with the validated data 13*a* and 13*b* satisfies the conditions of the crossing line determination condition 406. Therefore, the validated data 13*a* of "minutes" (the representation of "minutes" written in Chinse characters) and the validated data 13*b* of "giji" (the pronunciation of "minutes" written in Japanese syllabary characters) are specified as the selection data.

Figure 14B:
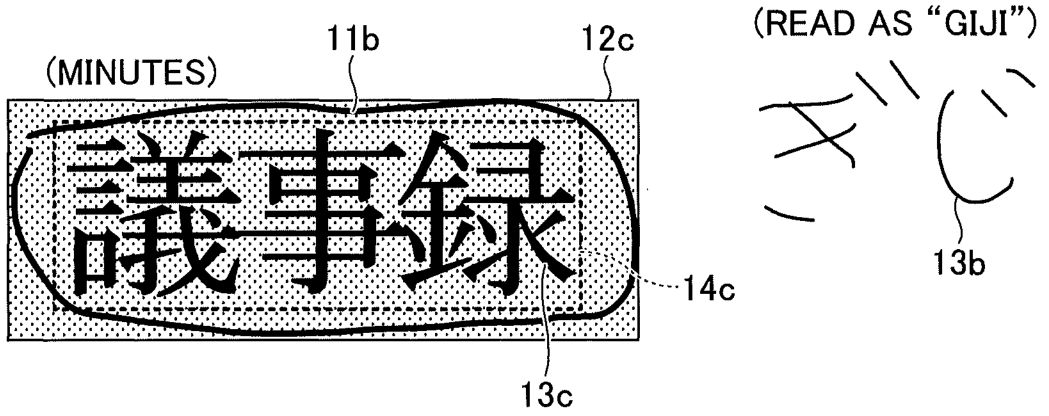

FIG. 14B illustrates an example in which the horizontally written validated data 13*c* is specified by a surrounding line (handwriting data 11*b*). In this example, only the validated data 13*c* of "minutes", in which the overlap rate of the validated data 13*c* and the handwriting data rectangular area 12*c* satisfies the conditions of the surrounding line determination condition 407, is specified as the selection data.

Figure 14C:
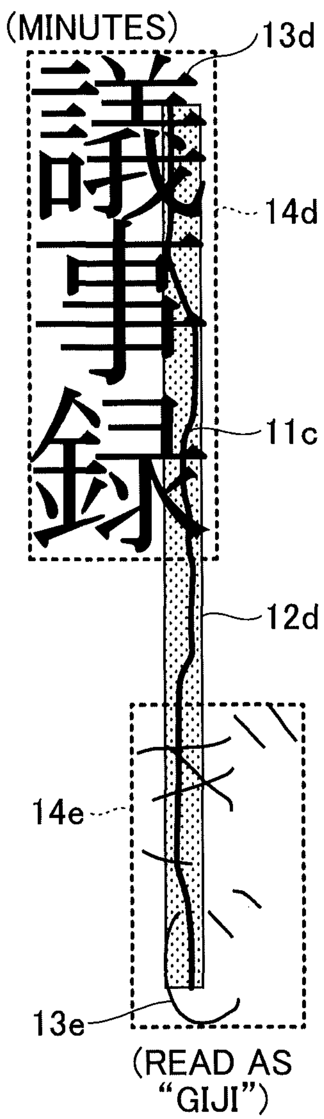

FIG. 14C illustrates an example in which the vertically written plurality of pieces of validated data 13*d* and 13*e* are specified by a crossing line (handwriting data 11*c*). In this example, as in FIG. 14A, the length H1 of the short side and the length W1 of the long side of the handwriting data rectangular area 12*d* satisfy the conditions of the crossing line determination condition 406, and the overlap rate of the validated data 13*d* of "minutes" and the validated data 13*e* of "giji" satisfies the conditions of the crossing line determination condition 406. Accordingly, the validated data 13*d* of "minutes" and the validated data 13*e* of "giji" are specified as the selection data.

Figure 14D:

FIG. 14D illustrates an example in which the vertically written validated data 13*f* is specified by a surrounding line (handwriting data 11*d*). In this example, as in FIG. 14B, only the validated data 13*f* of "minutes" is specified as the selection data.

<Example of Displaying Operation Command Candidate>

Figure 15A:
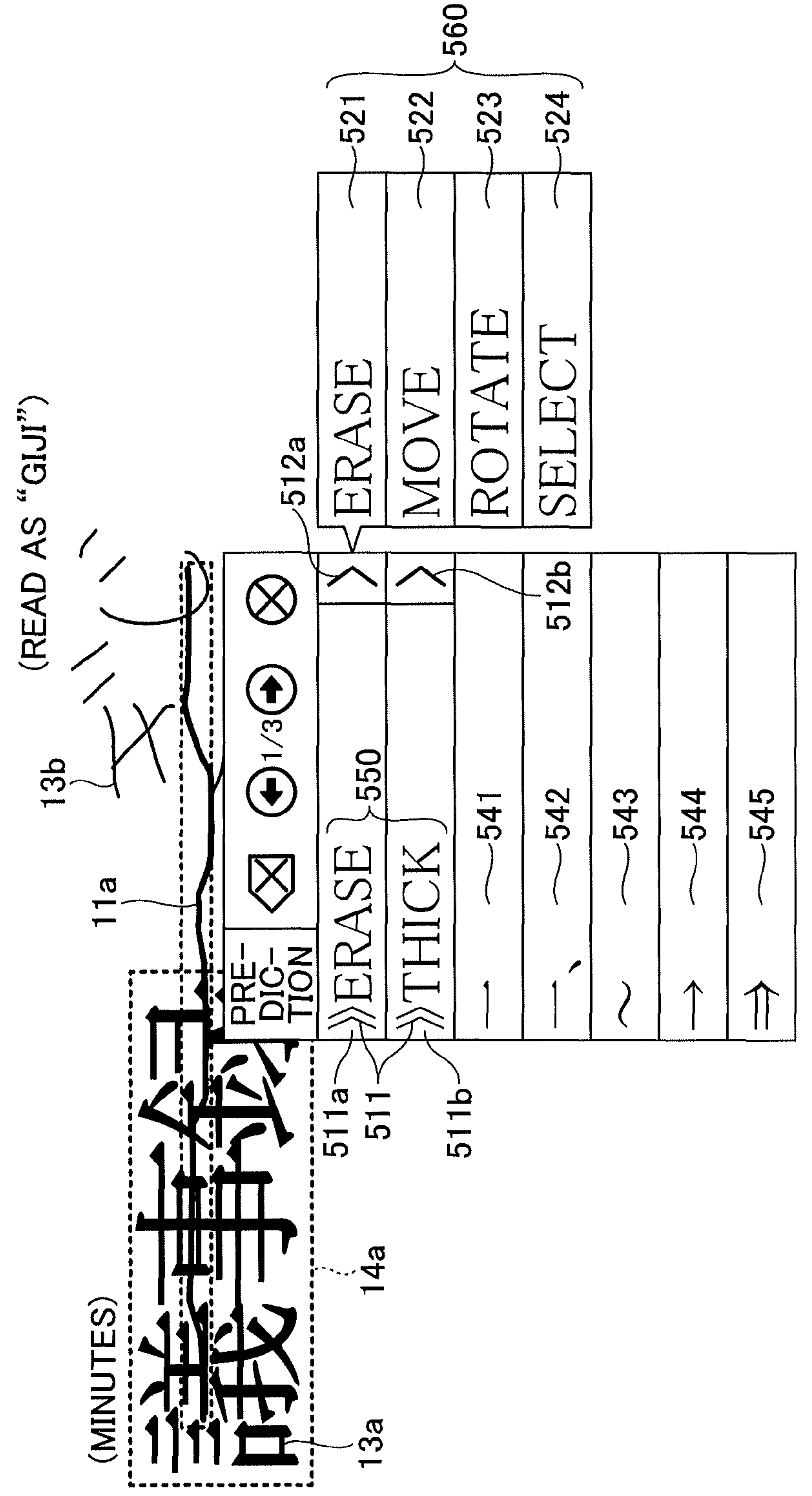
FIGS. 15A and 15B are display examples of an operation command candidate based on the operation command definition data when handwriting data is present according to the first embodiment of the present invention.
Figure 15B:
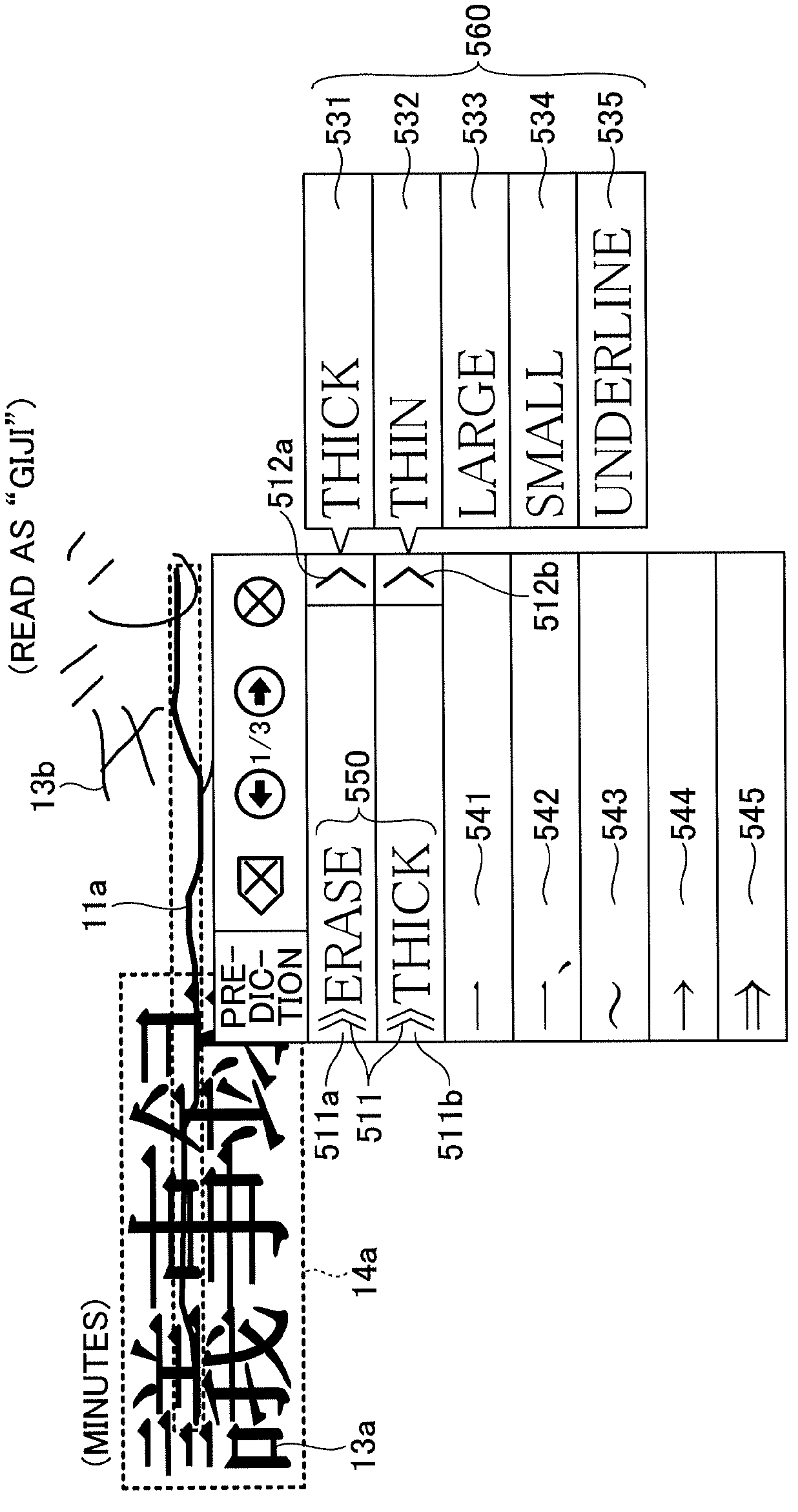

FIGS. 15A and 15B illustrate a display example of an operation command candidate based on the operation command definition data when there is handwriting data as illustrated in FIGS. 14A to 14D. FIG. 15A illustrates an operation command candidate of the edit group, and FIG. 15B illustrates an operation command candidate of the decorate group.

FIG. 15A illustrates an example in which the selection data is specified by the handwriting data 11*a* of FIG. 14A.

As illustrated in FIGS. 15A and 15B, the operation command candidate displayed after the initial character ">>" 511 is a main menu 550. The main menu 550 displays the last executed operation command name or the first operation command name in the operation command definition data. An initial character ">>" 511*a* on the first line is an operation command candidate of the edit group, and an initial character ">>" 511*b* on the second line is an operation command candidate of the decorate group.

A character ">" 512 at the end of the line indicates that there is a sub menu (an example of a sub menu button). A character ">" 512*a* on the first line displays a sub menu (last selected) of the operation command candidate of the edit group, and a character ">" 512*b* on the second line displays the remaining sub menu of the operation command candidate of the decorate group. When the user presses the ">" 512, a sub menu 560 will be displayed on the right. The sub menu 560 displays all the operation commands defined in the operation command definition data. In the example illustrated in FIG. 15A, the sub menu 560 corresponding to the ">" 512*a* on the first line is also displayed from when the main menu is displayed. The sub menu 560 may be displayed by pressing ">" 512*a* on the first line.

When the user presses any of the operation command names with a pen, the handwriting input display control unit 23 executes the command of the operation command definition data associated with the operation command name, with respect to the selection data. That is, "Delete" is executed when "erase" 521 is selected, "Move" is executed when "move" 522 is selected, "Rotate" is executed when "rotate" 523 is selected, and "Select" is executed when "select" 524 is selected.

For example, when the user presses "erase" 521 with a pen, "minutes" and "giji" can be erased; when the user presses a "move" 522, "rotate" 523, and a "select" 524, a bounding box will be displayed (outer rectangle of the selection data); by "move" 522 and "rotate" 523, the selection data can be moved or rotated by the dragging motion of the pen; and by "select" 524, an operation of another bounding box can be executed.

Other symbols such as "-" 541, "-," "542, "~" 543, "→+" 544, and "⇒" 545, which are character string candidates that are not operation command candidates, are recognition results of the crossing line (handwriting data 11*a*), and when the user had intended to input a character string instead of an operation command, a character string candidate can be selected.

In FIG. 15B, by pressing ">" 512*b* on the second line, the sub menu in FIG. 15B is displayed. Also in the display example of FIG. 15B, similar to the case of FIG. 15A, the main menu 550 and the sub menu 560 are displayed. Based on the operation command definition data of FIG. 12, with respect to the selection data, when "thick" 531 (bold) is selected, the handwriting input display control unit 23 executes "thick"; when "thin" 532 is selected, the handwriting input display control unit 23 executes "Thin"; when "large" 533 is selected, the handwriting input display control unit 23 executes "Large"; when "small" 534 is selected, the handwriting input display control unit 23 executes "Small"; and when "underline" 535 is selected, the handwriting input display control unit 23 executes "Underline".

Note that fixed values are separately defined with respect to how thick the data is to be when "thick" 531 is selected; how thin the data is to be when "thin" 532 is selected; how large the data is to be when "large" 533 is selected; how small the data is to be when "small" 534 is selected; the line type when "underline 535" is selected, and the like. Alternatively, when the sub menu illustrated in FIG. 15B is selected, a selection menu may be separately opened to allow the user to make adjustments.

When the user presses "thick" 531 with a pen, the handwriting input display control unit 23 increases the thickness of the lines constituting the validated data 13*a* of "minutes" and the validated data 13*b* of "giji". When the user presses "thin" 532 with a pen, the handwriting input display control unit 23 can reduce the thickness of the lines constituting the validated data 13*a* of "minutes" and the validated data 13*b* of "giji". When the user presses "large" 533 with a pen, the handwriting input display control unit 23 can increase the size of the validated data 13*a* of "minutes" and the validated data 13*b* of "giji". When the user presses "small" 534 with a pen, the handwriting input display control unit 23 can reduce the size of the validated data 13*a* of "minutes" and the validated data 13*b* of "giji". When the user presses "underline" 535 with a pen, the handwriting input display control unit 23 can add an underline to the validated data 13*a* of "minutes" and the validated data 13*b* of "giji".

Figure 16A:
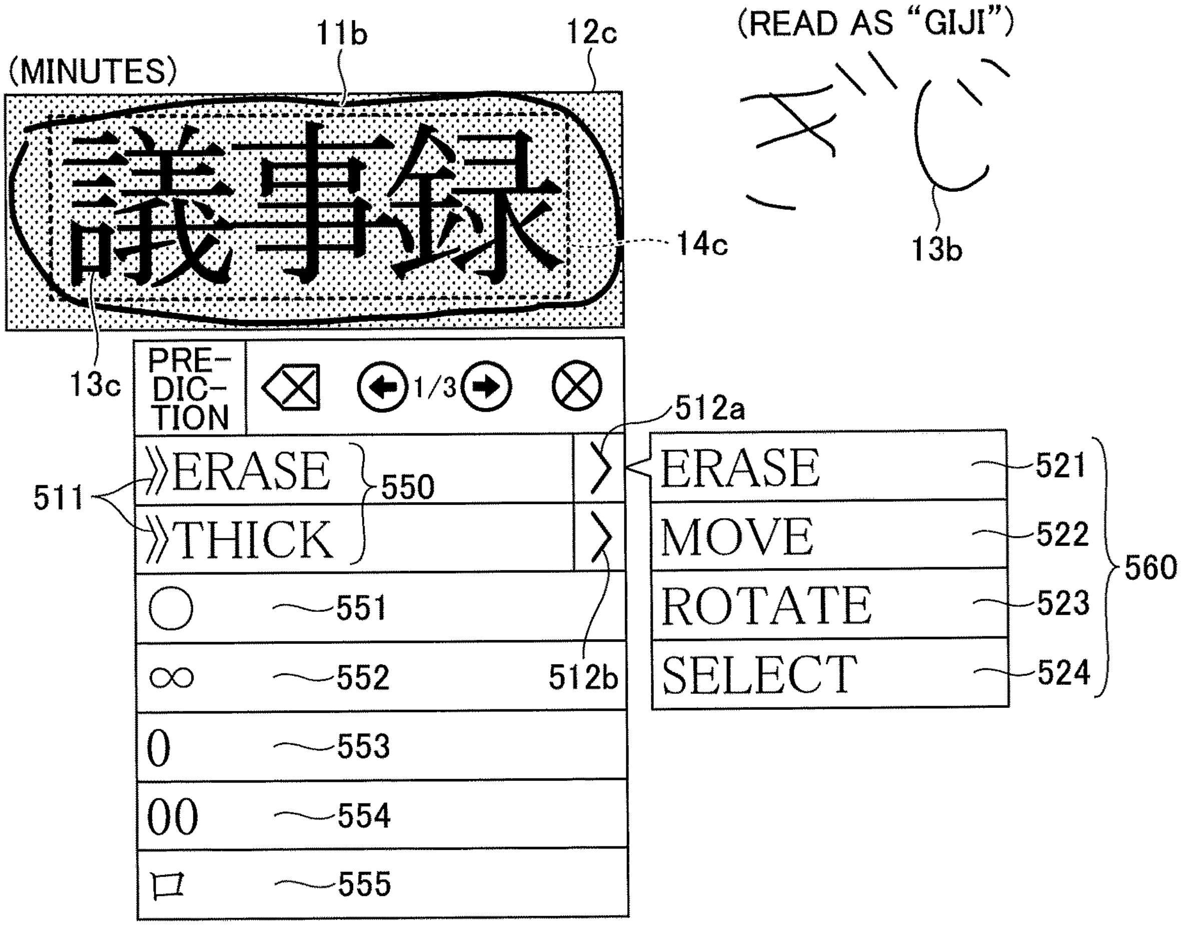
FIGS. 16A and 16B illustrate display examples of an operation command candidate based on the operation command definition data when handwriting data is present according to the first embodiment of the present invention.
Figure 16B:
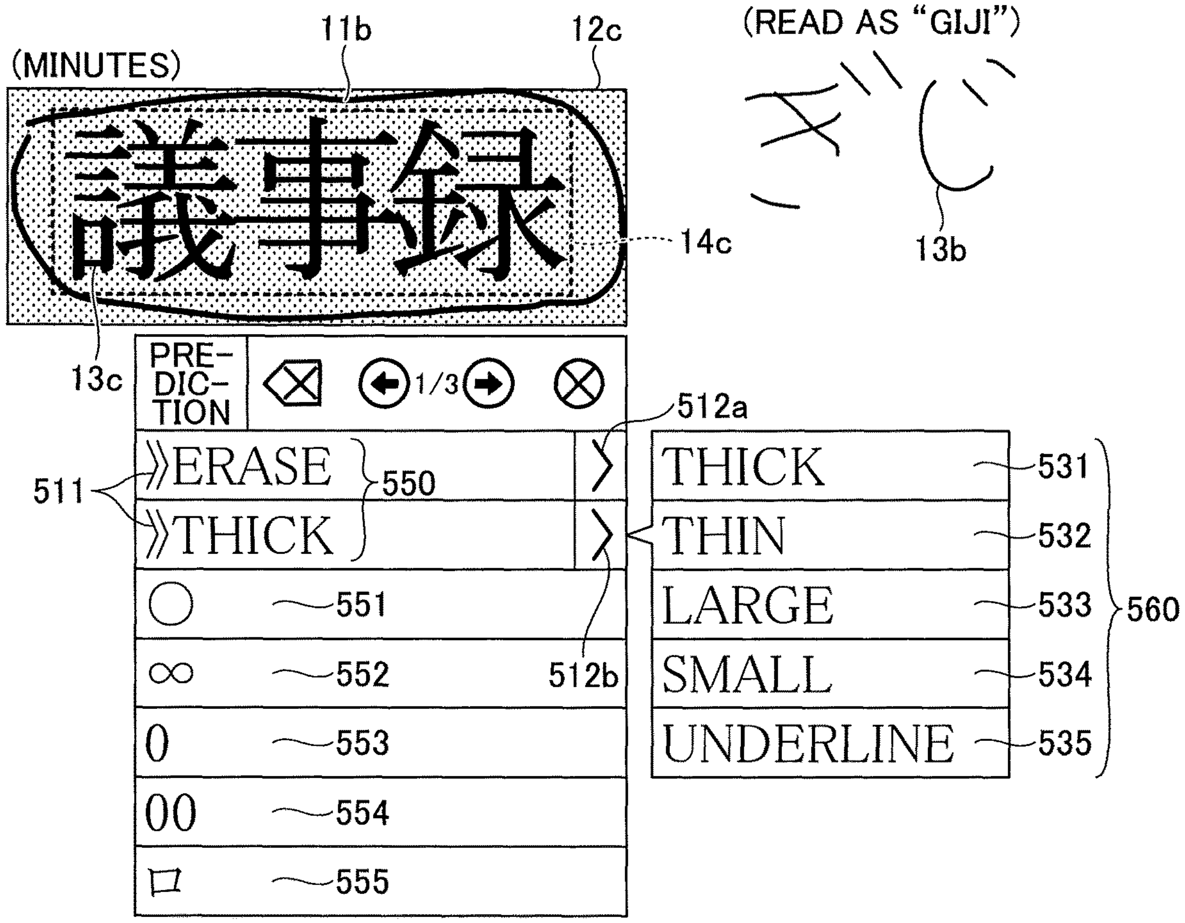

FIGS. 16A and 16B illustrate a display example of an operation command candidate based on the operation command definition data when there is the handwriting data illustrated in FIGS. 14A to 14D. The difference from FIGS. 15A and 15B is that FIGS. 16A and 16B illustrate an example in which the selection data is specified by the handwriting data 11*b* (surrounding line) of FIG. 14B. As can be seen from the comparison of FIGS. 15A and 15B and FIGS. 16A and 16B, there is no difference in the operation command candidates displayed, depending on whether the handwriting data is a line or a surrounding line. The handwriting input display control unit 23 displays the operation command candidate on the display unit 22 when the selection data is specified. However, it is also possible recognize the handwriting data, and change the operation command candidate to be displayed in accordance with the handwriting data. In this case, operation command definition data as in FIG. 12 is associated with the recognized handwriting data (such as - and ○, etc.).

In FIGS. 16A and 16B, "○" 551, "∞" 552, "0" 553, "00" 554, and "□" 555, which are character string candidates that are not operation command candidates, are the recognition results of the surrounding line (handwriting data 11*b*), and when the user had intended to input a character string instead of an operation command, a character string candidate can be selected.

<Insertion Determination>

Figure 17A:
FIGS. 17A and 17B are diagram illustrating the determination of whether to display an insertion character string candidate in which a character string based on handwriting data is inserted in validated data according to the first embodiment of the present invention.
Figure 17B:
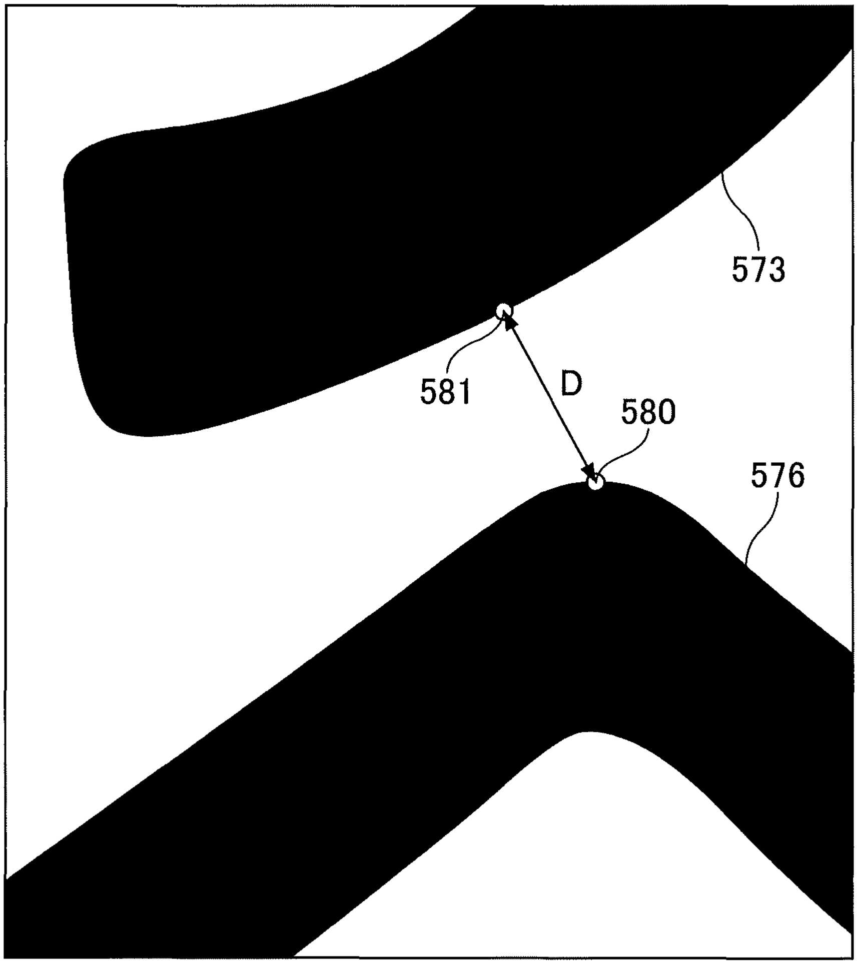
Figure 18:
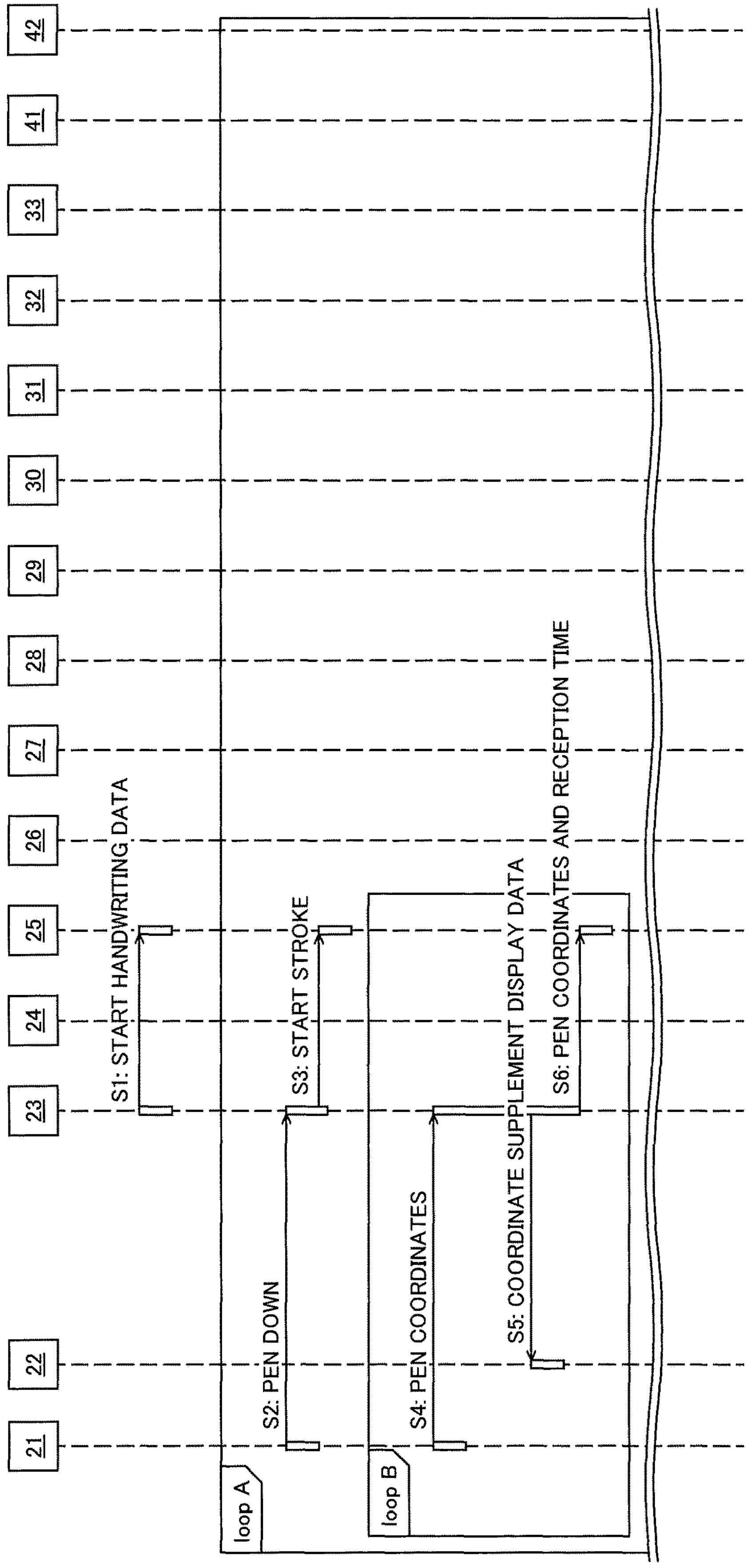
FIG. 18 is a sequence diagram illustrating a process of displaying a character string candidate and an operation command candidate by the display apparatus (part 1) according to the first embodiment of the present invention.

FIGS. 17A and 17B are diagrams illustrating the determination of whether to display the insertion character string candidate 570 in which a character string based on handwriting data is inserted in the validated data, on the operation guide 500. FIG. 17A illustrates an example of the validated data 573 and the handwriting data 504, and FIG. 17B illustrates an enlarged view of the portion where the validated data 573 and the handwriting data 504 are closest to each other (i.e., the portion indicated by a dotted-line frame in FIG. 17A).

The character string insertion control unit 41 determines whether the insertion symbol 576 is included in the handwriting recognition character string candidate 506 or the language character string candidate 571, and when the insertion symbol 576 is included, the character string insertion control unit 41 further determines the following.

As illustrated in FIG. 17B, when a distance D between a closest portion 580 of the handwriting data 504 and a closest portion 581 of the validated data 573 is less than or equal to or less than a threshold value defined by the insertion determination condition 408, the character string insertion control unit 41 determines that the character string based on the handwriting data 504 is to be inserted into the validated data 573.

The position in which the handwriting data 504 is to be inserted, is between the two characters that are closest to the portion 580 of the handwriting data 504 that is closest to the validated data 573. In FIG. 17A, the third character from the left and the fourth character from the left are the two characters that are closest to the portion 580 of the handwriting data 504, and, therefore, the character string insertion control unit 41 determines to insert a character string based on the handwriting data 504, between the third character from the left and the fourth character from the left in the validated data 573.

Note that in FIGS. 17A and 17B, the insertion position is determined on the basis of the distance. However, the character string insertion control unit 41 may determine the insertion position based on the relevance between the characters before and after the inserted character string, when the character string based on the handwriting data is inserted. In this case, the character string insertion control unit 41 transmits a character string based on the validated data and the handwriting data to the prediction conversion control unit 30. The prediction conversion control unit 30 determines whether there has been a used example of text data obtained by inserting the corresponding character string, while changing the insertion position, and when there is a used example, the prediction conversion control unit 30 calculates the probability of the used example, and transmits the insertion positions for which there have been used examples, in descending order according to the probability, to the character string insertion control unit 41.

<Operation Procedure>

The operation of the display apparatus 2 will be described with reference to the above-described configuration and FIGS. 18 to 23. FIG. 18 to FIG. 23 are sequence diagrams illustrating an example of a process in which the display apparatus 2 displays a character string candidate and an operation command candidate. The process of FIG. 18 starts when the display apparatus 2 is activated (when the application is activated). In FIGS. 18 to 23, the functions of FIG. 5 are indicated by reference numerals as a matter of space limitations.

S1: First, the handwriting input display control unit 23 transmits the start of the handwriting data to the handwriting input storage unit 25. The handwriting input storage unit 25 secures a handwriting data area (a memory area for storing handwriting data). The handwriting data area may be secured after the user brings a pen in contact with the handwriting input unit 21.

S2: Next, the user brings the pen in contact with the handwriting input unit 21. The handwriting input unit 21 detects the pen down (the pen down operation) and transmits the pen down to the handwriting input display control unit 23.

S3: The handwriting input display control unit 23 transmits stroke start to the handwriting input storage unit 25, and the handwriting input storage unit 25 secures a stroke data area.

S4: When the user moves the pen in contact with the handwriting input unit 21, the handwriting input unit 21 transmits the pen coordinates to the handwriting input display control unit 23.

S5: The handwriting input display control unit 23 transmits the pen coordinate supplement display data (data interpolating discrete pen coordinates) to the display unit 22. The display unit 22 displays a line by interpolating the pen coordinates using the pen coordinate supplement display data.

S6: The handwriting input display control unit 23 transmits the pen coordinates and the reception time thereof to the handwriting input storage unit 25. The handwriting input storage unit 25 adds the pen coordinates to the stroke data. While the user is moving the pen, the handwriting input unit 21 repeatedly transmits the pen coordinates to the handwriting input display control unit 23 on a regular basis, so that the processes of steps S3 to S6 are repeated until pen up occurs (a pen up operation is detected).

S7: When the user releases the pen from the handwriting input unit 21, the handwriting input unit 21 transmits the pen up to the handwriting input display control unit 23.

S8: The handwriting input display control unit 23 transmits stroke end to the handwriting input storage unit 25, and the handwriting input storage unit 25 validates the pen coordinates of the stroke data. After the pen coordinates of the stroke data are validated, pen coordinates cannot be added to the stroke data.

S9: Next, the handwriting input display control unit 23 transmits an instruction to acquire the overlapping status of the handwriting data neighborhood rectangular area and the stroke data rectangular area to the handwriting input storage unit 25 based on the handwriting data neighborhood rectangular area 403. The handwriting input storage unit 25 calculates the overlapping status and transmits the overlapping status to the handwriting input display control unit 23.

Subsequently, steps S10 through S15 are performed when the handwriting data neighborhood rectangular area and the stroke data rectangular area do not overlap each other.

S10: When the handwriting data neighborhood rectangular area and the stroke data rectangular area do not overlap each other, one piece of handwriting data is validated. Therefore, the handwriting input display control unit 23 transmits an instruction to clear storage data to the handwriting recognition control unit 26.

S11 to S13: The handwriting recognition control unit 26 transmits an instruction to clear storage data to the character string conversion control unit 28, the prediction conversion control unit 30, and the operation command recognition control unit 32. The handwriting recognition control unit 26, the character string conversion control unit 28, the prediction conversion control unit 30, and the operation command recognition control unit 32 clear the data pertaining to the character string candidates and the operation command candidates stored thus far. At the time point of this clearing, the last handwriting stroke data is not added to the handwriting data.

S14: The handwriting input display control unit 23 transmits the end of the handwriting data to the handwriting input storage unit 25. The handwriting input storage unit 25 validates the handwriting data. Validating the handwriting data means that one piece of handwriting data has been completed (no further stroke data is added).

S15: The handwriting input display control unit 23 transmits the start of the handwriting data to the handwriting input storage unit 25. In preparation for the start (pen down) of handwriting of the next handwriting data, the handwriting input storage unit 25 secures a new handwriting data area.

S16: Next, the handwriting input display control unit 23 transmits the addition of stroke data with respect to the stroke data ended in step S8, to the handwriting input storage unit 25. When steps S10 to S15 have been executed, the added stroke is the first stroke of the handwriting data, and the handwriting input storage unit 25 adds the stroke data to the handwriting data that is starting to be handwriting. When steps S10-S15 have not been executed, the added stroke data is added to the handwriting data that is already in the process of being handwritten.

S17: Subsequently, the handwriting input display control unit 23 transmits the addition of stroke data to the handwriting recognition control unit 26. The handwriting recognition control unit 26 adds stroke data to the stroke data storage area in which the character string candidate is to be stored.

S19: The handwriting recognition control unit 26 executes the handwriting recognition with respect to the stroke data storage area.

S20: The handwriting recognition control unit 26 transmits the handwriting recognition character string candidate, which is the execution result of the handwriting recognition, to the handwriting recognition dictionary unit 27. The handwriting recognition dictionary unit 27 transmits language character string candidates that seems linguistically credible to the handwriting recognition control unit 26.

S21: The handwriting recognition control unit 26 transmits the handwriting recognition character string candidate and the received language character string candidate to the character string conversion control unit 28.

S22: The character string conversion control unit 28 transmits the handwriting recognition character string candidate and the language character string candidate to the character string conversion dictionary unit 29. The character string conversion dictionary unit 29 transmits a conversion character string candidate to the character string conversion control unit 28.

S23: The character string conversion control unit 28 transmits the received conversion character string candidate to the prediction conversion control unit 30.

S24: The prediction conversion control unit 30 transmits the received conversion character string candidate to the prediction conversion dictionary unit 31. The prediction conversion dictionary unit 31 transmits the prediction character string candidate to the prediction conversion control unit 30.

S25: The prediction conversion control unit 30 transmits the received prediction character string candidate to the operation command recognition control unit 32.

S26: The operation command recognition control unit 32 transmits the received prediction character string candidate to the operation command defining unit 33. The operation command defining unit 33 transmits an operation command candidate to the operation command recognition control unit 32. Accordingly, the operation command recognition control unit 32 can acquire an operation command candidate corresponding to the operation command definition data having a character string (String) matching the prediction character string candidate.

Thereafter, similar processes are performed until the transmission of the operation command candidates in steps S27 to S35.

S27: The character string conversion control unit 28 transmits the received conversion character string candidate to the operation command recognition control unit 32.

S28: The operation command recognition control unit 32 transmits the received conversion character string candidate to the operation command defining unit 33. The operation command defining unit 33 transmits an operation command candidate to the operation command recognition control unit 32. Accordingly, the operation command recognition control unit 32 acquires an operation command candidate corresponding to the operation command definition data having a character string (String) matching the conversion character string candidate.

S30: The handwriting recognition control unit 26 transmits the handwriting recognition character string candidate and the language character string candidate to the prediction conversion control unit 30.

S31: The prediction conversion control unit 30 transmits the handwriting recognition character string candidate and the received language character string candidate to the prediction conversion dictionary unit 31. The prediction conversion dictionary unit 31 transmits the prediction character string candidate to the prediction conversion control unit 30.

S32: The prediction conversion control unit 30 transmits the received prediction character string candidate to the operation command recognition control unit 32.

S33: The operation command recognition control unit 32 transmits the received prediction character string candidate to the operation command defining unit 33. The operation command defining unit 33 transmits an operation command candidate to the operation command recognition control unit 32. Accordingly, the operation command recognition control unit 32 can acquire an operation command candidate corresponding to the operation command definition data having a character string (String) matching the prediction character string candidate.

S34: The handwriting recognition control unit 26 transmits the handwriting recognition character string candidate and the received language character string candidate to the operation command recognition control unit 32.

S35: The operation command recognition control unit 32 transmits the handwriting recognition character string candidate and the received language character string candidate to the operation command defining unit 33. The operation command defining unit 33 transmits an operation command candidate to the operation command recognition control unit 32. Accordingly, the operation command recognition control unit 32 can acquire the operation command candidate corresponding to the operation command definition data having the character string (String) matching the language character string candidate.

S36: The handwriting recognition control unit 26 transmits the handwriting recognition character string candidate and the language character string candidate received from the handwriting recognition dictionary unit 27 to the character string insertion control unit 41.

S37: The character string insertion control unit 41 transmits the handwriting recognition character string candidate and the language character string candidate to the insertion symbol defining unit 42. The insertion symbol defining unit 42 determines whether an insertion symbol is included in the handwriting recognition character string candidate or the language character string candidate, and when an insertion symbol is included, the insertion symbol defining unit 42 transmits the result of the insertion symbol determination in which the insertion symbol is present, to the character string insertion control unit 41. When a plurality of characters are handwritten, the insertion symbol defining unit 42 determines the order at which the insertion symbol is placed within the characters included in the handwriting recognition character string or the language character string candidate, and transmits the order to the character string insertion control unit 41. The insertion symbol need not be the initial character.

S38: The handwriting recognition control unit 26 transmits the addition of stroke data to the character string insertion control unit 41.

S38-2: Next, the handwriting recognition control unit 26 transmits the addition of stroke data to the operation command recognition control unit 32.

S39: The operation command recognition control unit 32 transmits an instruction to acquire position information of the validated data, to the handwriting input storage unit 25. The handwriting input storage unit 25 transmits the position information of the validated data to the operation command recognition control unit 32.

S40: The operation command recognition control unit 32 determines whether the position information of the stroke data received from the handwriting recognition control unit 26 in the stroke addition of step S38 and the position information of the validated data received from the handwriting input storage unit 25 are in a predetermined relationship based on the crossing line determination condition 406 and the surrounding line determination condition 407, in order to determine the selection data, and stores validated data that can be determined to be selected as the selection data. In this case, the selection data is identified, and, therefore, the operation command candidate of the I/O system is acquired from the operation command defining unit 33.

S41: When the insertion symbol determination result is that there is the insertion symbol, the character string insertion control unit 41 transmits an instruction to acquire the validated data to the handwriting input storage unit 25. A plurality of pieces of validated data are usually displayed, and, therefore, the handwriting input storage unit 25 identifies the validated data closest to the handwriting data. The handwriting input storage unit 25 transmits the validated data to the character string insertion control unit 41.

S42: The character string insertion control unit 41 determines whether the handwriting data received from the handwriting recognition control unit 26 at the stroke data addition of step S38 and the validated data received from the handwriting input storage unit 25 satisfy the insertion determination condition 408, in order to determine whether the handwriting recognition string candidate or the language character string candidate excluding the insertion symbol is to be inserted into the validated data. When the insertion determination condition 408 is determined to be satisfied, the insertion position, indicating the characters of the validated data between which the insertion is to be performed, is stored. Further, the identification information of the validated data that satisfies the insertion determination condition 408 is retained (to identify the validated data that is the insertion destination).

Further, the handwriting recognition control unit 26, the character string conversion control unit 28, the prediction conversion control unit 30, and the operation command recognition control unit 32 retain the data pertaining to the handwriting recognition character string candidate, the language character string candidate, the conversion character string candidate, the prediction character string candidate, the operation command candidate, and the selection data, so that the data can be acquired in steps S47 to S50 of the later stage, respectively. The character string insertion control unit 41 retains the insertion determination result, the insertion position, identification information of the validated data, and the character order of the insertion symbol, for step S51 at a later stage.

S18: The handwriting input display control unit 23 transmits the addition of stroke data to the handwriting recognition control unit 26 in step S17 and then immediately transmits an instruction to start the selectable candidate display timer to the candidate display timer control unit 24. The candidate display timer control unit 24 starts the timer.

Subsequently, steps S43 to S45 are executed when pen down occurs before a certain period of time elapses (before the timer expires (time out)).

S43: When the user brings the pen into contact with the handwriting input unit 21 before the timer expires (time out), the handwriting input unit 21 transmits pen down (the same event as in step S2) to the handwriting input display control unit 23.

S44: The handwriting input display control unit 23 transmits stroke start (the same as in step S3) to the handwriting input storage unit 25. The sequence after this step is the same as in step S3 and onwards.

S45: The handwriting input display control unit 23 transmits an instruction to stop the selectable candidate display timer to the candidate display timer control unit 24. The candidate display timer control unit 24 stops the timer. This is because pen down has been detected, and the timer is not needed anymore.

Steps S46 to S87 are executed when no pen down occurs before a certain period of time elapses (before the timer is expires (time out)). Accordingly, the operation guide 500 illustrated in FIG. 13 is displayed.

S46: The candidate display timer control unit 24 transmits a time out to the handwriting input display control unit 23 if the user does not bring the pen into contact with the handwriting input unit 21 after the selectable candidate display timer has started.

S47: The handwriting input display control unit 23 transmits an instruction for handwriting recognition/language character string candidate acquisition to the handwriting recognition control unit 26. The handwriting recognition control unit 26 transmits the currently retained handwriting recognition/language character string candidate to the handwriting input display control unit 23.

S48: The handwriting input display control unit 23 transmits an instruction to acquire the conversion character string candidate to the character string conversion control unit 28. The character string conversion control unit 28 transmits the currently retained conversion character string candidate to the handwriting input display control unit 23.

S49: The handwriting input display control unit 23 transmits an instruction to acquire a prediction character string candidate to the prediction conversion control unit 30. The prediction conversion control unit 30 transmits the currently retained prediction character string candidate to the handwriting input display control unit 23.

S50: The handwriting input display control unit 23 transmits an instruction to acquire an operation command candidate to the operation command recognition control unit 32. The operation command recognition control unit 32 transmits the currently retained operation command candidate and the selection data to the handwriting input display control unit 23.

S51: The handwriting input display control unit 23 transmits an instruction to acquire the insertion determination result to the character string insertion control unit 41. The handwriting input display control unit 23 acquires, from the character string insertion control unit 41, the insertion determination result, the insertion position when the insertion determination result is insertion present, the identification information of the validated data, and the order at which the insertion symbol is placed within the characters included in the handwriting recognition character string or the language character string candidate.

S52: When the insertion determination result is insertion present, the handwriting input display control unit 23 specifies the identification information of the validated data and transmits an instruction to acquire the validated data to the handwriting input storage unit 25. The handwriting input storage unit 25 transmits the validated data to the handwriting input display control unit 23. For this validated data, the distance from the validated data to the insertion symbol is determined as satisfying the insertion determination condition 408.

S54: The handwriting input display control unit 23 transmits an instruction to acquire the estimated writing direction to the handwriting input storage unit 25. The handwriting input storage unit 25 determines the estimated writing direction from the stroke data addition time, the horizontal length, and the vertical length of the handwriting data rectangular area, and transmits the estimated writing direction to the handwriting input display control unit 23.

S55: The handwriting input display control unit 23 creates the display data of the operation guide 500 as illustrated in FIG. 13, from a handwriting recognition character string candidate (in FIG. 13, for example, "shuyo" or "heshuyo"), a language character string candidate (in FIG. 13, for example, "main"), a conversion character string candidate (in FIG. 13, for example, "main problem"), a prediction character string candidate (in FIG. 13, for "tumor is found"), an operation command candidate (in FIG. 13, "to do ○○ as xx"), the probability of each selection, and the estimated writing direction, and transmits the operation guide 500 formed of the character string candidates and the operation command candidates to the display unit 22, to display the operation guide 500. Further, when the insertion determination result is insertion present, based on the insertion position and the order at which the insertion symbol is placed within the characters, the insertion character string candidate 570 in which one or more of the handwriting recognition character string candidate, the language character string candidate, the conversion character string candidate or the prediction character string candidate are inserted in the validated data, excluding the insertion symbol, is displayed in the selectable candidate 530.

S56: The handwriting input display control unit 23 transmits the rectangular area display data (rectangular frame) of the handwriting data and the selection data (the handwriting data rectangular area display 503 in FIG. 13) to the display unit 22.

S57: The handwriting input display control unit 23 transmits an instruction to the start the selectable candidate erase timer to the candidate display timer control unit 24 in order to erase the operation guide 500 after a certain time from the display of the operation guide 500. The candidate display timer control unit 24 starts the timer.

Steps S58 to S62 are executed when a user erases the selectable candidate display displayed on the display unit 22, when a change of handwriting data occurs (that is, when stroke data is added, deleted, moved, deformed, or divided with respect to the handwriting data), or when a candidate is not selected by the time out, after the start of the selectable candidate erase timer.

Further, steps S58 and S59 are executed when the candidate display is erased or a change in handwriting data occurs.

S58: The handwriting input unit 21 transmits a report of the selectable candidate display erasure or the occurrence of a change of the handwriting data to the handwriting input display control unit 23.

S59: The handwriting input display control unit 23 transmits an instruction to stop the selectable candidate erase timer. The candidate display timer control unit 24 stops the timer. This is because the handwriting data is operated within a certain period of time, and the timer is not needed anymore.

S61: The handwriting input display control unit 23 transmits an instruction to erase the operation guide 500 to the display unit 22 to erase the display.

S62: The handwriting input display control unit 23 transmits an instruction to erase the rectangular area display data of the handwriting data and the selection data, to the display unit 22, to erase the display. Therefore, when the display of the operation command candidate is erased under conditions other than the operation command candidate being selected, the display of the handwriting data is retained.

S60: On the other hand, when the selectable candidate display erasure or the change of the handwriting data does not occur after the start of the selectable candidate erase timer (when the user does not perform the pen operation), the candidate display timer control unit 24 transmits time out to the handwriting input display control unit 23.

Similarly, after the timeout of the selectable candidate erase timer, the handwriting input display control unit 23 executes steps S61 and S62. This is because the operation guide 500 and the rectangular area display data of the handwriting data and the selection data may be erased after a certain period of time elapses.

When the user selects a selectable candidate after the start of the selectable candidate erase timer, steps S63 to S87 are executed.

S63: When the user selects a selectable candidate after the start of the selectable candidate erase timer, the handwriting input unit 21 transmits the selection of a character string candidate or an operation command candidate to the handwriting input display control unit 23.

S64: The handwriting input display control unit 23 transmits an instruction to stop the selectable candidate erase timer to the candidate display timer control unit 24. The candidate display timer control unit 24 stops the timer.

S65: Next, the handwriting input display control unit 23 transmits an instruction to clear storage data to the handwriting recognition control unit 26.

S66: The handwriting recognition control unit 26 transmits an instruction to clear storage data to the character string conversion control unit 28.

S67: The handwriting recognition control unit 26 transmits an instruction to clear storage data to the prediction conversion control unit 30.

S68: The handwriting recognition control unit 26 transmits an instruction to clear storage data to the operation command recognition control unit 32.

S69: The handwriting recognition control unit 26 transmits an instruction to clear storage data to the character string insertion control unit 41.

The handwriting recognition control unit 26, the character string conversion control unit 28, the prediction conversion control unit 30, the operation command recognition control unit 32, and the character string insertion control unit 41 clear data pertaining to the character string candidates and the operation command commands that have been retained heretofore.

S70: Next, the handwriting input display control unit 23 transmits an instruction to erase the operation guide 500 to the display unit 22 to erase the display of the operation guide 500.

S71: The handwriting input display control unit 23 transmits an instruction to erase the rectangular area display data of the selection data to the display unit 22 to erase the handwriting data rectangular area display 503.

When the insertion character string candidate 570 is selected, steps S72 to S77 are executed.

S72: The handwriting input display control unit 23 transmits an instruction to erase the handwriting data display data and to erase the pen coordinate supplement display data transmitted in step S5, to the display unit 22, to erase the handwriting data 504 including the insertion symbol 576. The insertion character string candidate 570 has been selected, and, therefore, the handwriting data 504 including the insertion symbol is not needed anymore.

S73: The handwriting input display control unit 23 transmits deletion of handwriting data including the insertion symbol to the handwriting input storage unit 25. The deletion of the validated data is also transmitted to the handwriting input storage unit 25.

S74: The handwriting input display control unit 23 transmits the addition of the insertion data of the insertion character string candidate 570 to the handwriting input storage unit 25. For example, the insertion data may be "today's main agenda" when the validated data is "today's agenda" and the handwriting data is the insertion symbol and "shuyo" "shuyo" (the pronunciation of "main" written in Japanese syllabary characters).

S75: The handwriting input display control unit 23 outputs an instruction to acquire the insertion data font to the handwriting input storage unit 25. The insertion data font is font data for displaying the insertion character string candidate 570 displayed in the operation guide 500.

S76: When the insertion character string candidate 570 is selected, the validated data 573 is replaced by the insertion character string candidate 570. Therefore, the handwriting input display control unit 23 requests the display unit 22 to erase the validated data 573.

S77: The handwriting input display control unit 23 transmits the insertion data display data for displaying the insertion data (the insertion character string) at the same position as the erased validated data 573 using the insertion data font, to the display unit 22 to display the insertion data. The insertion character string is, for example, "today's main agenda". The position of the initial character of the insertion character string matches the position of the initial character of the erased validated data 573.

When the insertion character string candidate 570 is not selected (when the character string candidate 539 other than the insertion character string coordinate is selected), steps S78 to S82 are executed.

S78: The handwriting input display control unit 23 transmits an instruction to erase the handwriting data display data and to erase the pen coordinate supplement display data transmitted in step S5, except for the insertion symbol 576, to the display unit 22, to erase the handwriting data except the insertion symbol 576. It is possible to leave the insertion symbol intact because the order at which the insertion symbol is placed within the characters included in the handwriting data has been detected. The insertion character string candidate 570 is not selected, so insertion symbol 576 is displayed as handwriting data.

S79: The handwriting input display control unit 23 specifies the order at which the insertion symbol is placed within the characters, and transmits the deletion of the handwriting data, except for the insertion symbol 576, to the handwriting input storage unit 25. The validated data is not deleted.

S80: A character string candidate other than the insertion character string candidate 570 is selected, and, therefore, the handwriting input display control unit 23 transmits the addition of the character string data of the selected character string candidate to the handwriting input storage unit 25. For example, when "main" is selected, "main" is stored in the handwriting input storage unit 25.

S81: The handwriting input display control unit 23 transmits an instruction to acquire the character string data font of the selected character string candidate, to the handwriting input storage unit 25. The handwriting input storage unit 25 selects the defined font based on the estimated character size of the handwriting data and transmits the selected font to the handwriting input display control unit 23.

S82: Next, the handwriting input display control unit 23 transmits, to the display unit 22, the character string data display data (for example, "main") to be displayed at the same position as the handwriting data 504 while leaving the insertion symbol 576 intact, using the defined font received from the handwriting input storage unit 25, to display the character string data display data.

When an operation command candidate is selected, steps S83 through S86 are executed. Additionally, when there is selection data, steps S83 to S85 are executed.

S83: When the operation command candidate with respect to the selection data is selected (when the selection data exists), the handwriting input display control unit 23 transmits an instruction to erase the selection data display data to the display unit 22 to erase the display. This is to erase the original selection data.

S84: Next, the handwriting input display control unit 23 transmits an instruction to execute the operation command with respect to the selection data, to the handwriting input storage unit 25. The handwriting input storage unit 25 transmits display data (display data after editing or decorating) of the new selection data, to the handwriting input display control unit 23.

S85: Next, the handwriting input display control unit 23 transmits the selection data display data to the display unit 22 to again display the selection data after executing the operation command.

When there is no selection data (when the operation command of the I/O system is not selected), step S86 is executed.

S86: When the operation command of the I/O system is selected, the handwriting input display control unit 23 executes the operation command character string (Command) of the operation command definition data corresponding to the operation command selected by the user. When the user authenticating unit 34 successfully authenticates the user, the handwriting input display control unit 23 sets the information on the successfully authenticated user into %~% of the operation command, and executes the operation command character string.

S87: The handwriting input display control unit 23 transmits the start of the handwriting data to the handwriting input storage unit 25 for the next handwriting data. The handwriting input storage unit 25 secures a handwriting data area. Thereafter, the processes of steps S2 to S87 is repeated.

<Other Examples of Insertion Symbols>

Other examples of insertion symbols will be described with reference to FIGS. 24A to 24D. FIGS. 24A to 24D are diagrams illustrating an example of the use of an insertion symbol and an example of an insertion symbol.

Figure 24A:
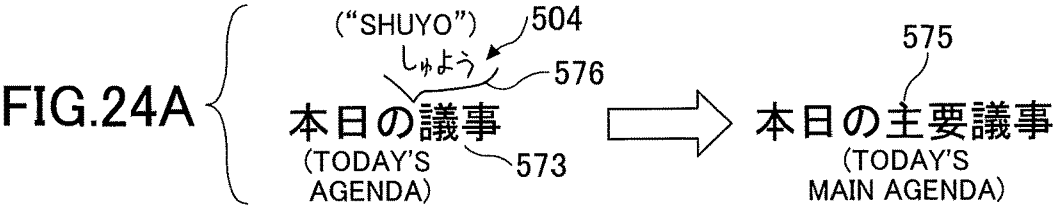
FIGS. 24A to 24D are diagrams illustrating an example of the use of an insertion symbol and an example of an insertion symbol according to the first embodiment of the present invention.

In FIG. 24A, an insertion symbol 576 was handwritten above the validated data 573. Thus, the insertion symbol 576 is a symbol protruding downward. In such a case also, the display apparatus 2 may recognize the insertion symbol 576 and insert a character string based on the handwriting data 504 into the validated data 573 to display the insertion character string 575.

Figure 24B:
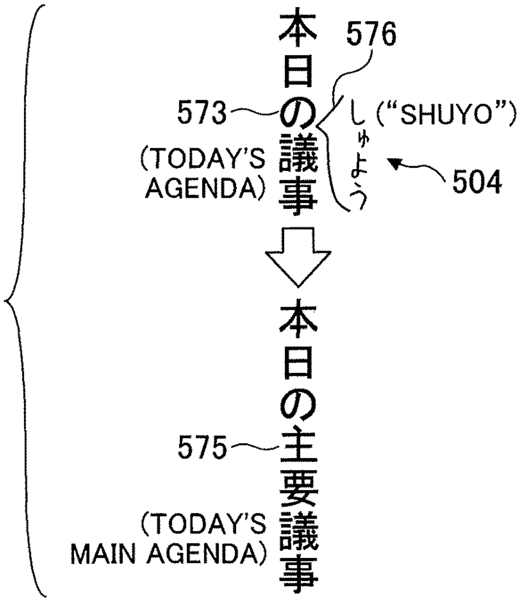
Figure 24C:
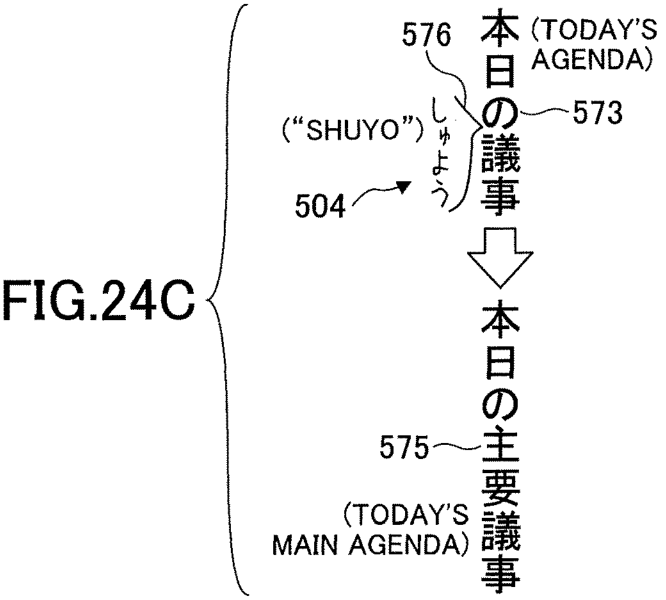

In FIG. 24B, the validated data 573 is written vertically. Thus, the insertion symbol 576 is a symbol protruding to the left. In such a case also, the display apparatus 2 may recognize the insertion symbol 576 and insert a character string based on the handwriting data into the validated data 573 to display the insertion character string 575. FIG. 24C illustrates an example in which the insertion symbol 576 is a symbol protruding to the right.

Figure 24D:
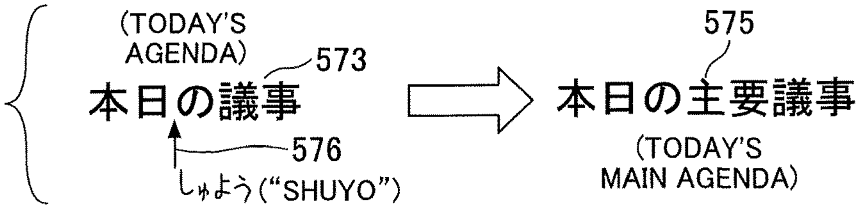

FIG. 24D illustrates examples where the insertion symbol 576 is an arrow "↑". The developer or the like can set the insertion symbol 576 to the display apparatus 2, and, therefore the display apparatus 2 can recognize the insertion symbol 576 and insert a character string based on handwriting data into the validated data 573 to display the insertion character string 575. Note that, when the insertion symbol 576 is an arrow, the symbol may be "←", "↓", or "→"

[Overview]

As described above, the display apparatus of the present embodiment determines whether the handwriting data 504 satisfies a predetermined condition with respect to the validated data 573, and, therefore, insertion of the character string can be performed without any special operation. Further, the handwriting recognition character string candidate 506 and the language character string candidate 571 are also displayed in a selectable manner together with the insertion character string candidate 570, and, therefore, when the user wishes to handwrite characters without inserting the characters, the handwriting recognition character string candidate 506 and the language character string candidate 571 may be selected, and when the user wishes to insert the characters, the insertion character string candidate 570 may be selected. It is also possible to input a handwritten character string with the insertion symbol left intact.

Second Embodiment

In the first embodiment, the insertion symbol 576 was required for inserting the character string into the validated data 573, but in the present embodiment, the display apparatus 2 that does not require the insertion symbol 576 will be described.

<Operation Overview of Display Apparatus>

Figure 25:
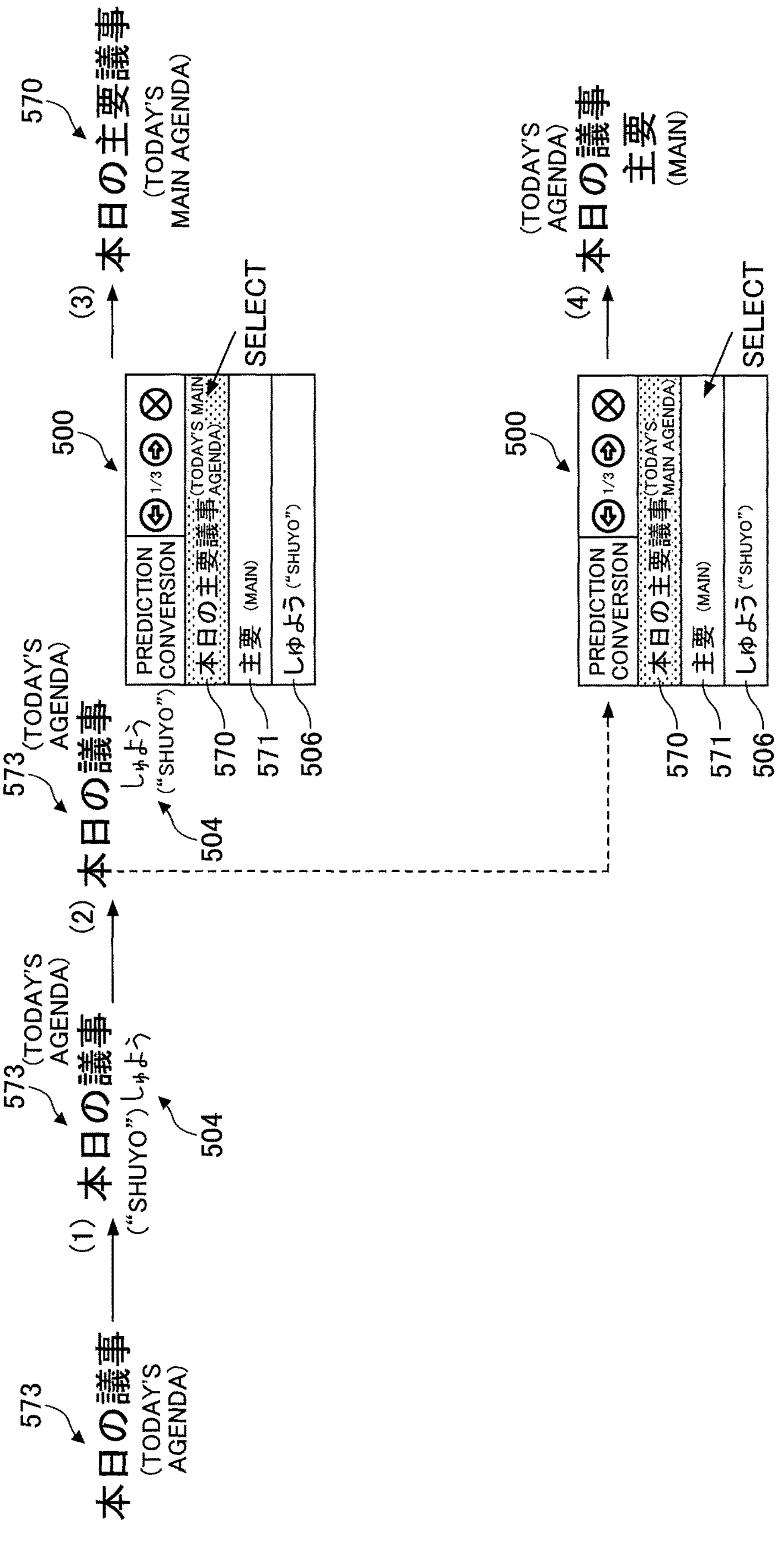
FIG. 25 is a diagram illustrating a display method of an insertion character string candidate performed by the display apparatus according to a second embodiment of the present invention.

FIG. 25 is a diagram illustrating a method of displaying the insertion character string candidate 570 performed by the display apparatus 2 according to the present embodiment. The figure illustrates a case where the character string "main" (the representation of "main" written in Chinese characters in the figure) is inserted into the validated data 573 "today's agenda" (the representation of "today's agenda" written in Chinese characters in the figure), so that "today's main agenda" (the representation of "today's main agenda" written in Chinese characters in the figure) is displayed.

(1) The validated data 573 "today's agenda" is already displayed. The user adds the handwriting data 504 "shuyo" (the pronunciation of "main" written in Japanese syllabary characters in the figure) to the location where "main" is to be inserted under the validated data 573. An insertion symbol is not necessary as illustrated.

(2) The display apparatus 2 determines to display the insertion character string candidate 570 to be included in the operation guide 500, when the distance between the validated data 573 and the handwriting data 504 satisfies the insertion determination condition 408. The display apparatus displays, as selectable candidates, the insertion character string candidate 570, which is "today's main agenda" (the representation of "today's main agenda" written in Chinse characters) generated by the insertion process; the handwriting recognition character string candidate 506, which is "shuyo" (the pronunciation of "main" written in Japanese syllabary characters) that is the recognition result of the handwriting data 504 excluding the insertion symbol; and the language character string candidate 571, which is "main" (the representation of "main" written in Chinse characters).

(3) When the user selects "today's main agenda", the validated data 573 is replaced by the insertion character string candidate 570 of "today's main agenda".

(4) When the user does not select "today's main agenda" and selects, for example, "main", the character string "main" is displayed under "today's agenda".

As described above, the display apparatus according to the present embodiment does not require an insertion symbol, and thus insertion of a character string or the like can be performed without requiring any special operation other than those of the first embodiment.

<Function of Apparatus>

Figure 26:
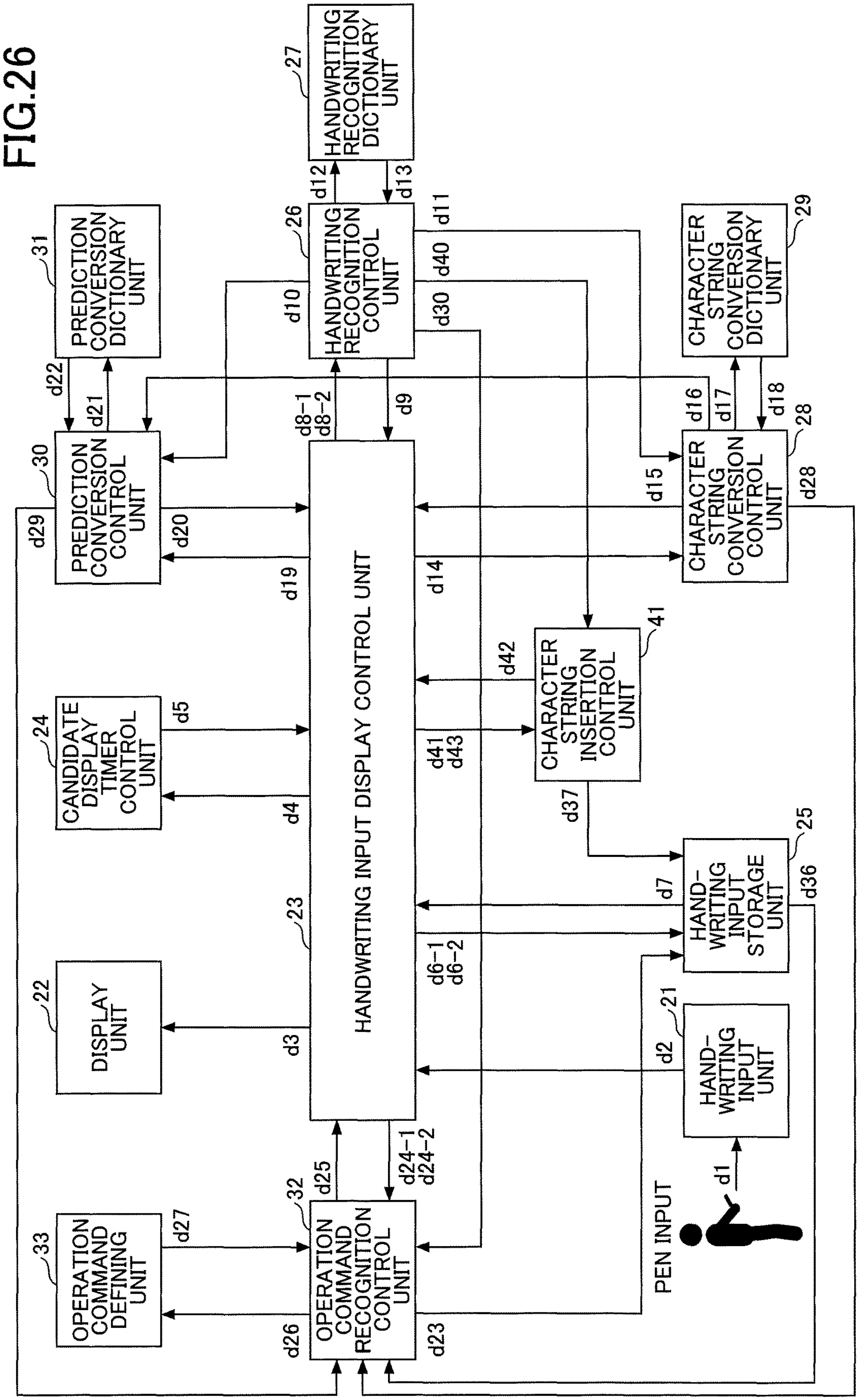
FIG. 26 is an example of a functional block diagram illustrating functions of the display apparatus (second embodiment) according to the second embodiment of the present invention.

FIG. 26 is an example of a functional block diagram illustrating functions of the display apparatus 2. In the present embodiment, the components denoted by the same reference numerals as those of FIG. 5 perform the same functions as those of FIG. 5, and therefore, only the main components of the present embodiment may be described.

As illustrated in FIG. 26, the insertion symbol defining unit 42 is not required in the display apparatus 2 according to the present embodiment because an insertion symbol is not required. When the distance between the validated data 573 and the handwriting data 504 satisfies the insertion determination condition 408, the character string insertion control unit 41 displays the insertion character string candidate 570 in the operation guide 500 without using an insertion symbol determination result.

<Insertion Position of Insertion Character String>

The insertion position of the insertion character string is determined by comparing, by the character string insertion control unit 41, the distance between the initial character of the handwriting data and the validated data with the insertion determination condition 408, instead of comparing the insertion symbol with the insertion determination condition 408 as in the first embodiment.

Figure 27A:
FIGS. 27A and 27B are diagrams illustrating the determination of whether to display an insertion character string candidate in which a character string based on handwriting data is inserted in validated data according to the second embodiment of the present invention.
Figure 27B:
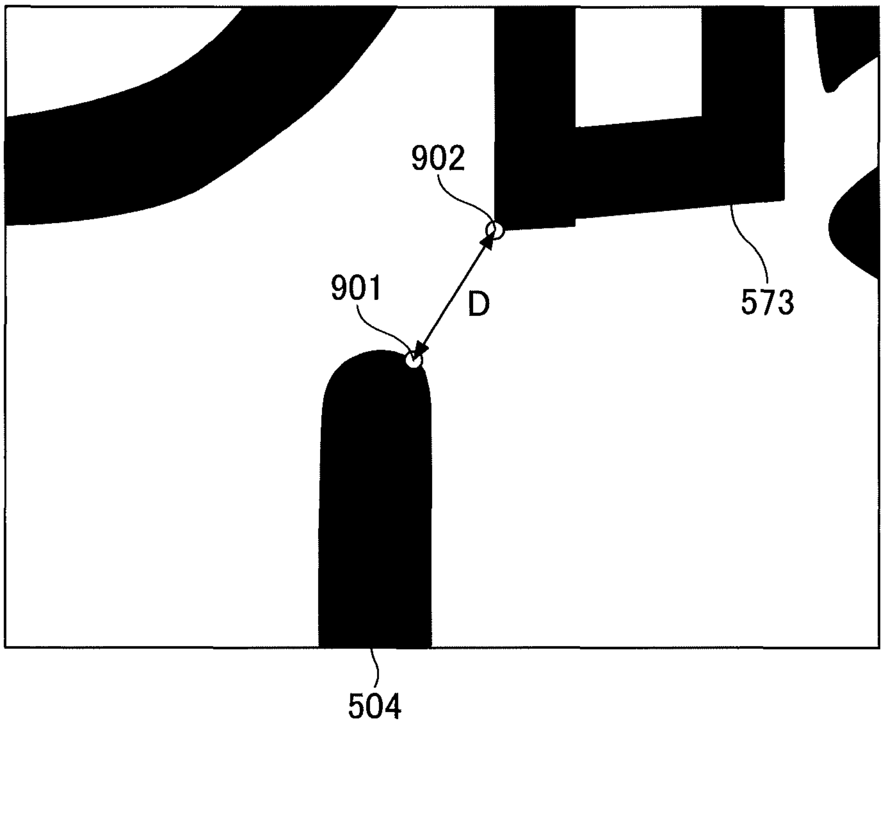
Figure 28:
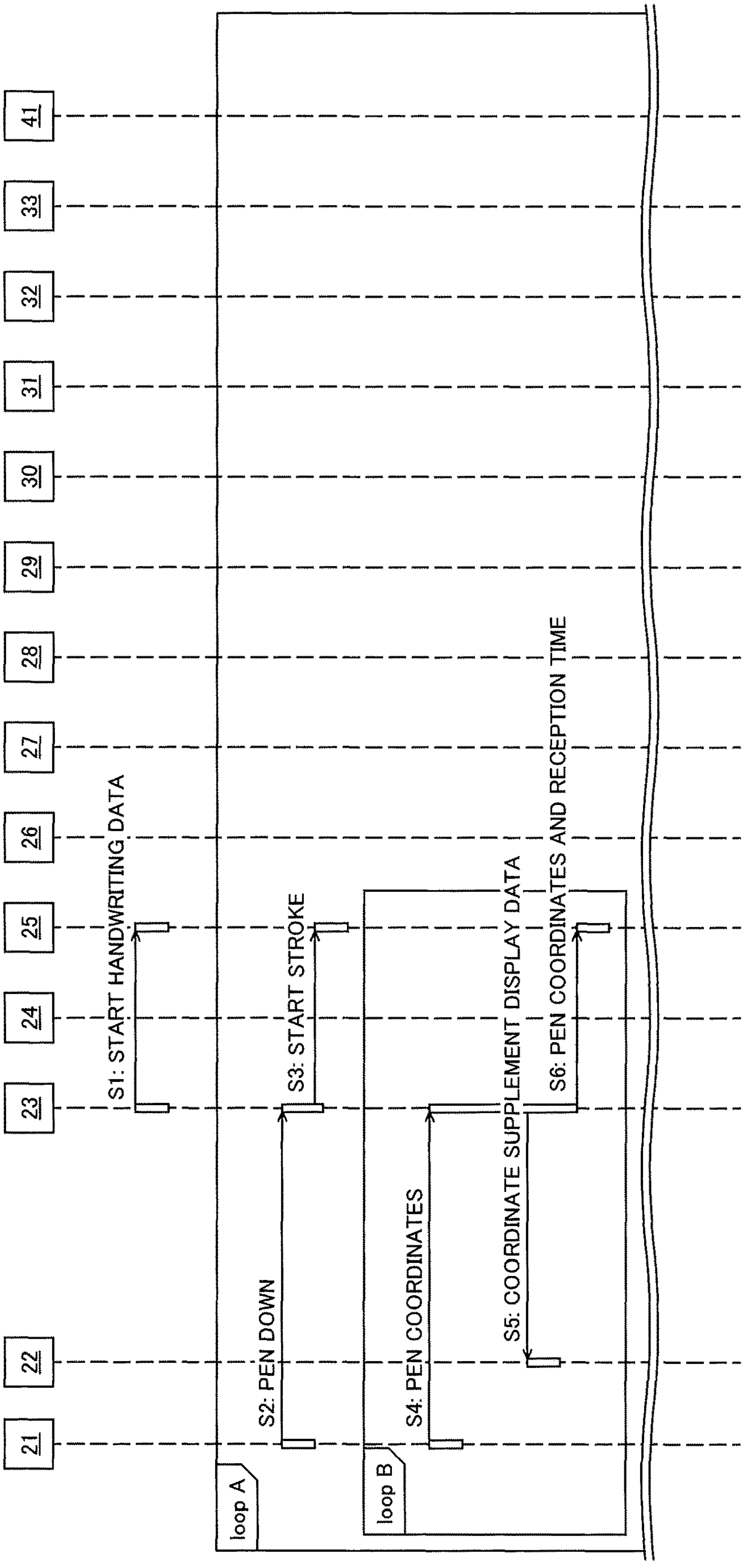
FIG. 28 is a sequence diagram illustrating a process of displaying a character string candidate and an operation command candidate by the display apparatus (part 1) according to the second embodiment of the present invention.
Figure 29:
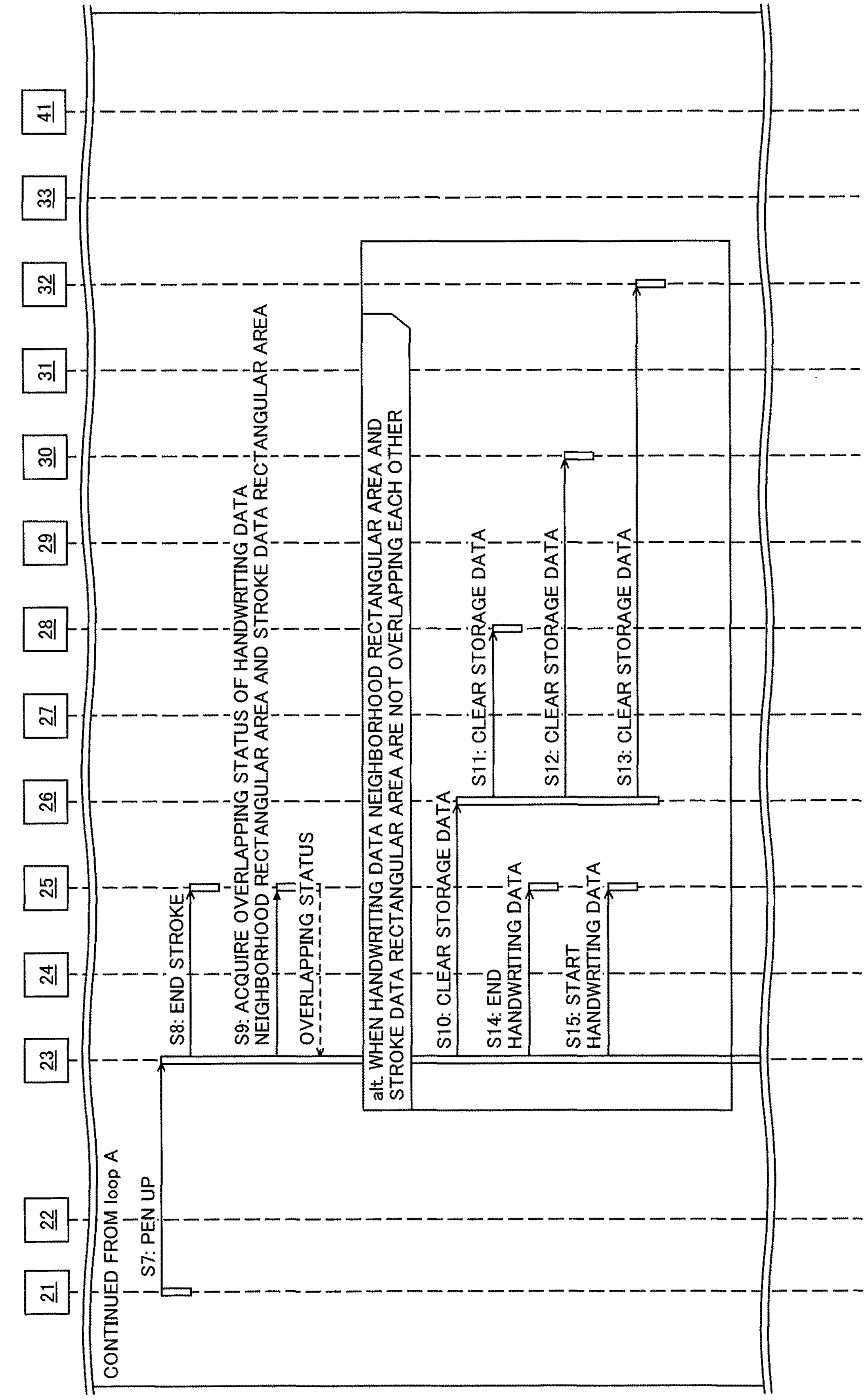
FIG. 29 is a sequence diagram illustrating a process of displaying a character string candidate and an operation command candidate by the display apparatus (part 2) according to the second embodiment of the present invention.
Figure 30:
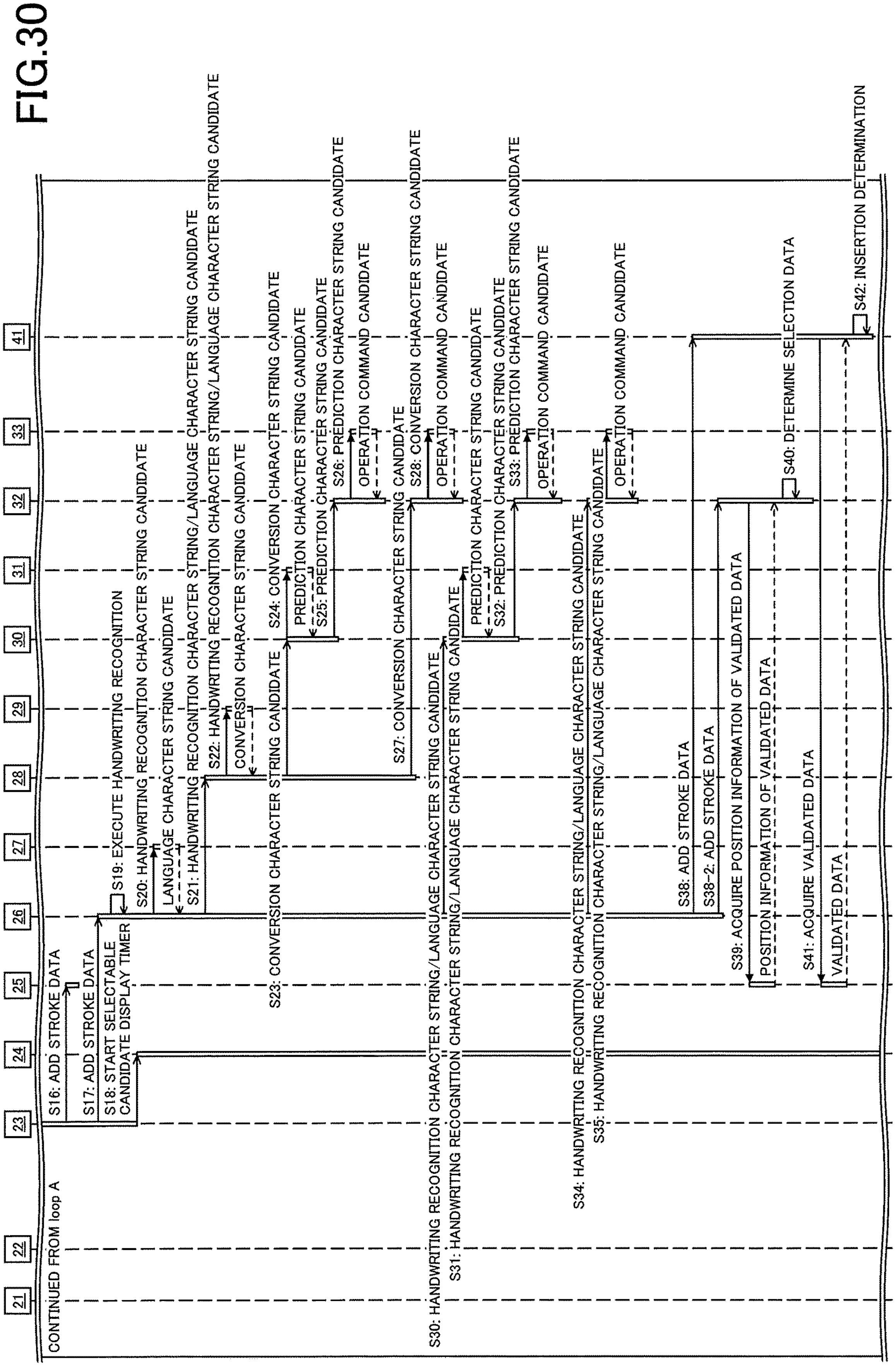
FIG. 30 is a sequence diagram illustrating a process of displaying a character string candidate and an operation command candidate by the display apparatus (part 3) according to the second embodiment of the present invention.
Figure 31:
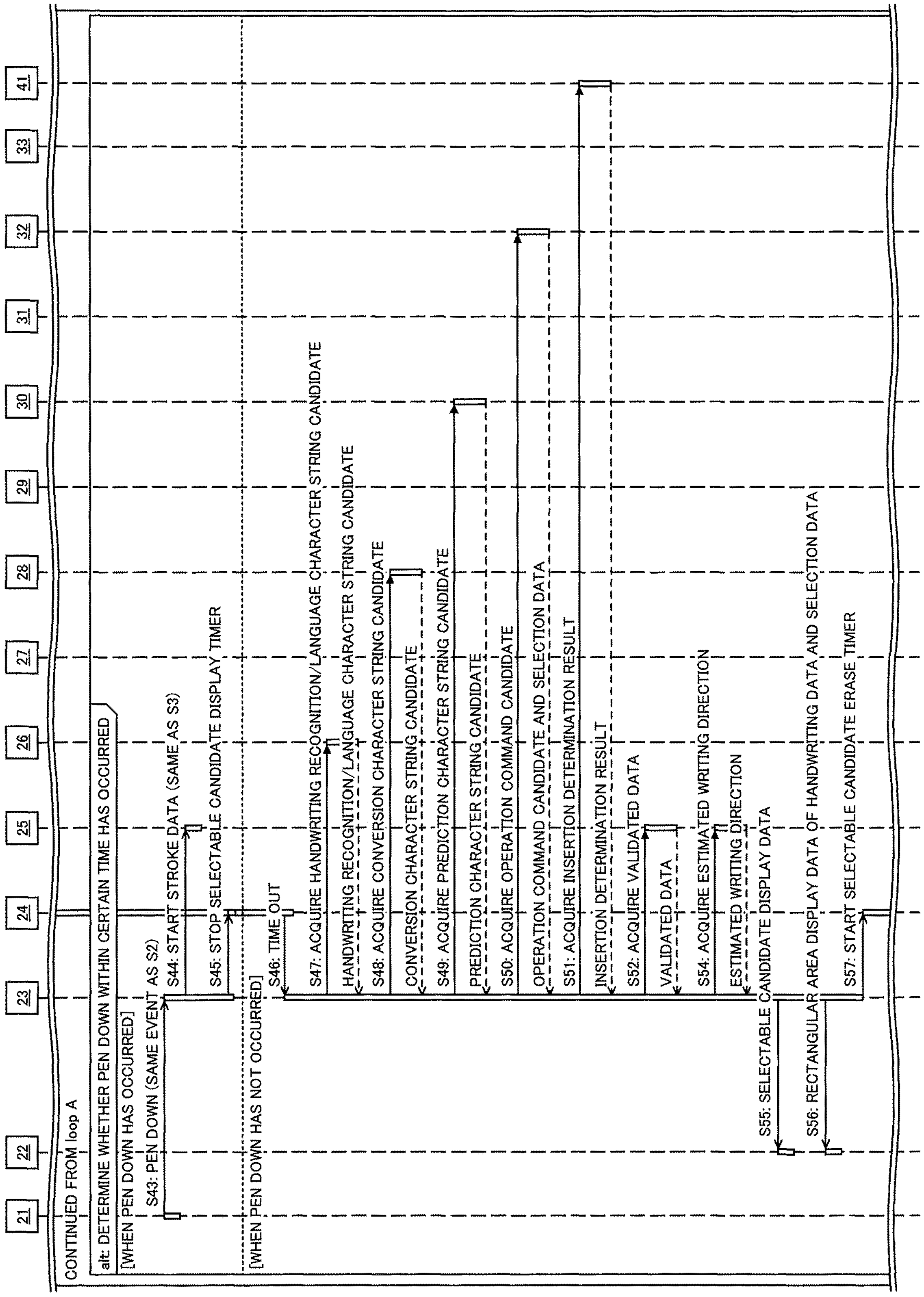
FIG. 31 is a sequence diagram illustrating a process of displaying a character string candidate and an operation command candidate by the display apparatus (part 4) according to the second embodiment of the present invention.
Figure 32:
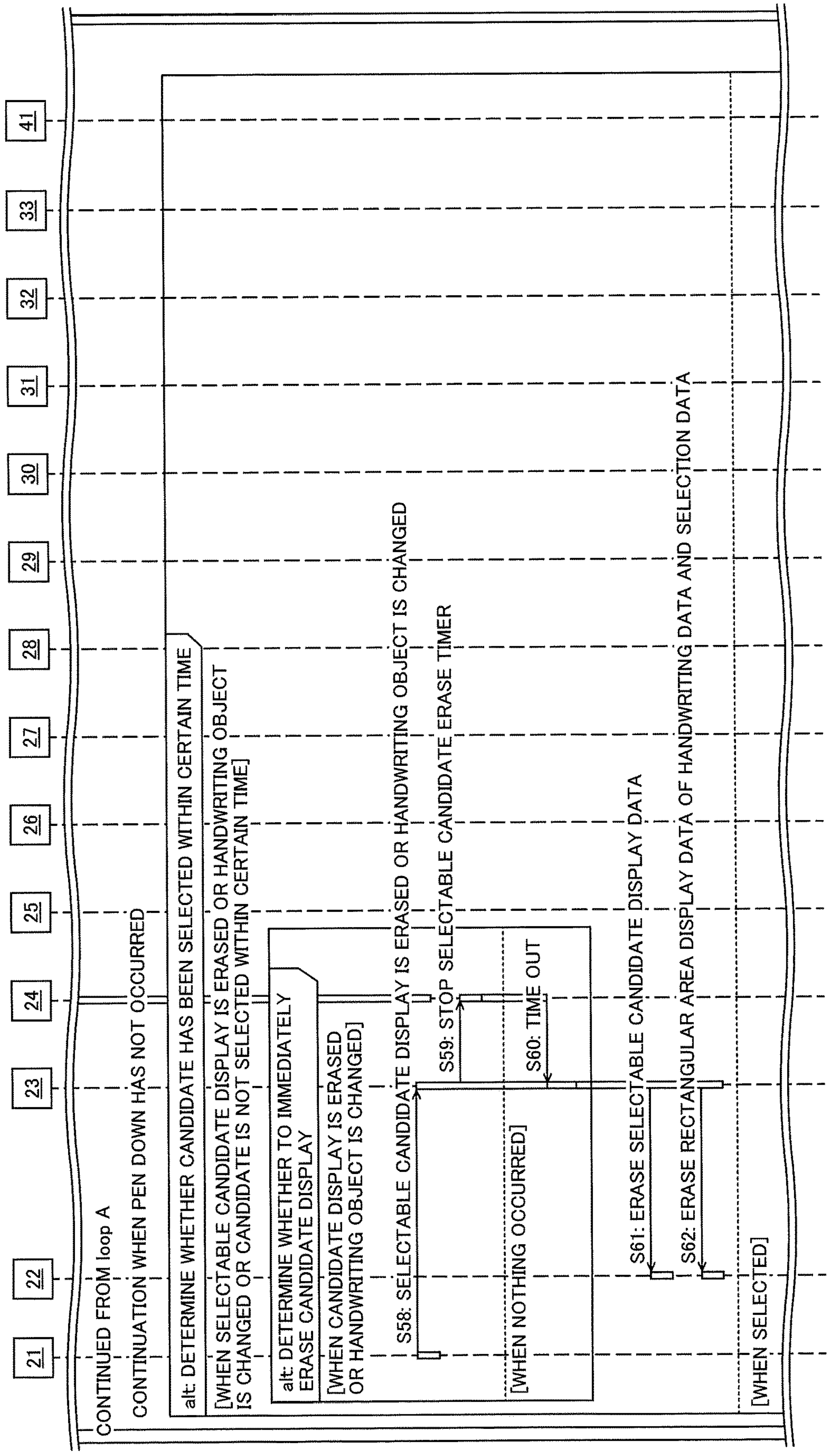
FIG. 32 is a sequence diagram illustrating a process of displaying a character string candidate and an operation command candidate by the display apparatus (part 5) according to the second embodiment of the present invention.
Figure 33:
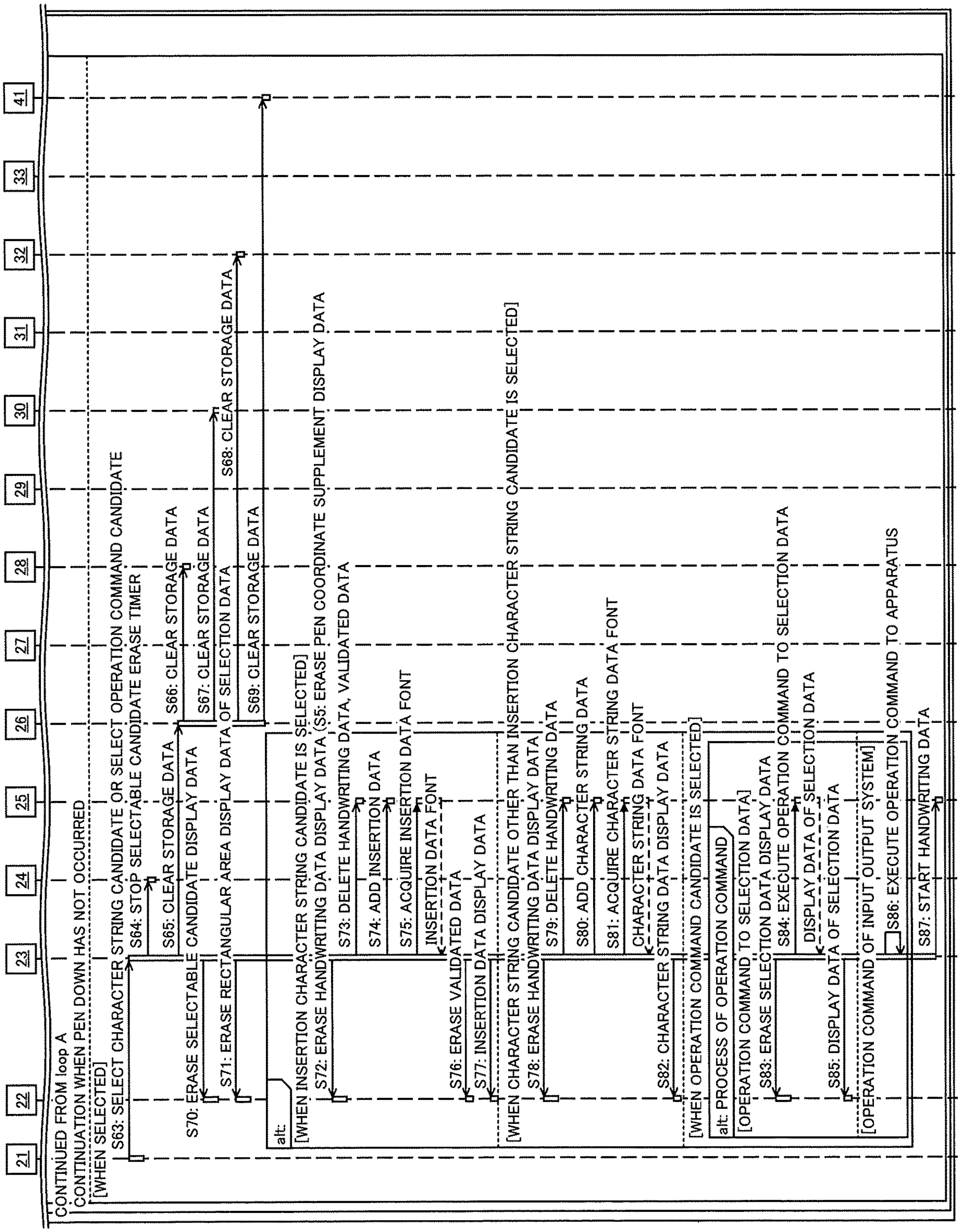
FIG. 33 is a sequence diagram illustrating a process of displaying a character string candidate and an operation command candidate by the display apparatus (part 6) according to the second embodiment of the present invention.

FIGS. 27A and 27B are diagrams illustrating the determination of whether to display the insertion character string candidate 570 in which a character string based on the handwriting data 504 is inserted in the validated data 573. FIG. 27A illustrates an example of the validated data 573 and the handwriting data 504, and FIG. 27B illustrates an enlarged view of the portion where the validated data 573 and the handwriting data 504 are closest to each other (i.e., the portion indicated by a dotted-line frame in FIG. 27A). As illustrated in FIG. 27B, when a distance D between a closest portion 902 of the validated data 573 and a closest portion 901 of the handwriting data 504 is less than or equal to or less than a threshold value defined by the insertion determination condition 408, the character string insertion control unit 41 determines to display the insertion character string candidate 570 in which a character string based on the handwriting data 504 is inserted in the validated data 573.

The position in which the handwriting data 504 is to be inserted is between the two characters that are closest to the portion 901 of the handwriting data 504 that is closest to the validated data 573. In FIG. 27A, the third character from the left and the fourth character from the left are the two characters that are closest to the initial character in the handwriting data 504, and, therefore, the character string insertion control unit 41 determines to insert a character string based on the handwriting data 504, between the third character from the left and the fourth character from the left in the validated data 573, to generate the insertion character string candidate 570.

<Operation Procedure>

FIGS. 28 to 33 are sequence diagrams illustrating a process in which the display apparatus 2 displays a character string candidate and an operation command candidate. In the description of FIGS. 28 to 33, differences from the first embodiment will be described.

As illustrated in the present embodiment, there are no steps S36 and S37. This is because the presence or absence of the insertion symbol is not determined. Steps S41 and S42 are executed regardless of an insertion symbol determination result.

S41: The character string insertion control unit 41 transmits an instruction to acquire the validated data to the handwriting input storage unit 25. The handwriting input storage unit 25 transmits the validated data to the character string insertion control unit 41.

S42: The character string insertion control unit 41 determines whether the handwriting data received from the handwriting recognition control unit 26 by the addition of stroke data at step S38 and the validated data received from the handwriting input storage unit 25, satisfy the insertion determination condition 408 in order to determine whether a character string based on the handwriting data is to be inserted into the validated data. When the insertion determination condition 408 is determined to be satisfied, the insertion position, indicating the characters of the validated data between which the insertion is to be performed, is stored. Further, the identification information of the validated data that satisfies the insertion determination condition 408 is retained.

Thereafter, the processes of steps S43 to S71 may be the same as those of the first embodiment. When the insertion character string candidate 570 is selected, the processes of steps S72 to S77 are the same as those of the first embodiment because an insertion symbol is not handwritten in the first place.

When the insertion character string candidate 570 is not selected (when the character string candidate 539 other than the insertion character string candidate is selected), steps S78 to S82 are executed.

S78: The handwriting input display control unit 23 erases the handwriting data by transmitting an instruction to erase the handwriting data display data and the pen coordinate supplement display data transmitted in step S5, to the display unit 22. An insertion symbol is not handwritten, and, therefore, it is not necessary for an operation of erasing the handwriting data while leaving insertion symbol intact.

S79: The handwriting input display control unit 23 transmits an instruction to delete the handwriting data to the handwriting input storage unit 25. An insertion symbol is not handwritten, and, therefore, it is not necessary for an operation of erasing the handwriting data while leaving insertion symbol intact.

Subsequently, the processes of steps S80 to S82 may be the same as that of the first embodiment.

[Overview]

As described above, the insertion symbol is not required, and, therefore, the display apparatus 2 according to the present embodiment can insert a character string or the like without requiring any special operation other than those of the first embodiment.

Example 1 of Another Display Apparatus Configuration

Although the display apparatus according to the present embodiment is described as having a large touch panel, the display apparatus is not limited to having a touch panel.

Figure 34:
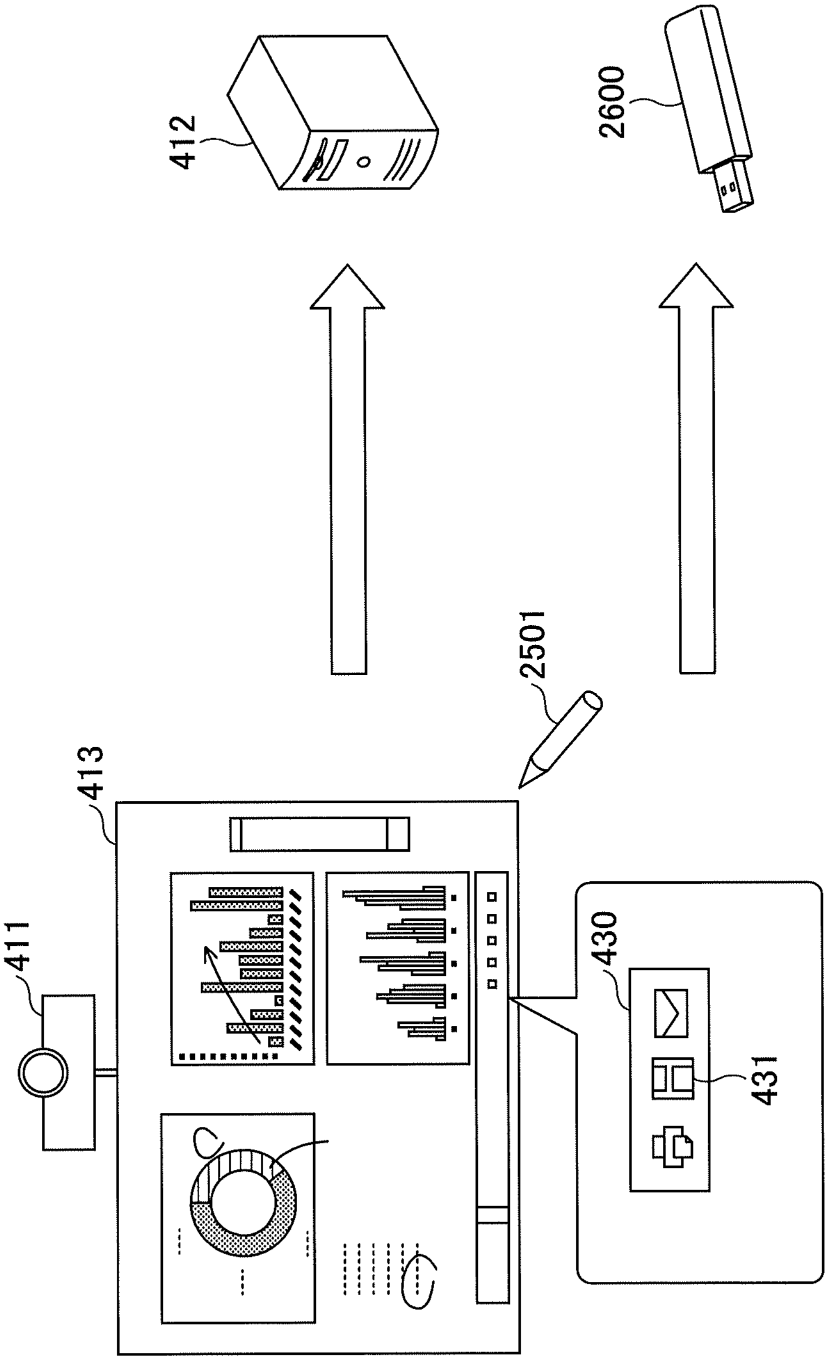
FIG. 34 is a diagram illustrating another configuration example of the display apparatus according to the second embodiment of the present invention.

FIG. 34 is a diagram illustrating another configuration example of the display apparatus. In FIG. 34, a projector 411 is located on top of a typical whiteboard 413. This projector 411 corresponds to the display apparatus. The typical whiteboard 413 is not a flat panel display integrated with a touch panel, but rather a whiteboard that in which a user writes information directly with a marker pen. The whiteboard may be a blackboard, and is to have a flat surface large enough to project images.

The projector 411 has an optical system with an ultra-short focal point so that images of approximately 10 cm with less distortion can be projected onto the whiteboard 413. The image may be transmitted from a PC that is connected in a wireless or wired manner or may be stored by the projector 411.

The user handwrites information on the whiteboard 413 using an exclusive-use electronic pen 2501. The electronic pen 2501 has a light emitting portion, for example, at the tip portion, that is turned on to emit light when the user presses the electronic pen 2501 against the whiteboard 413 for handwriting. The light wavelength is near-infrared or infrared, so the light is invisible to the user. The projector 411 includes a camera that captures the light emitting portion and analyzes the image to identify the direction of the electronic pen 2501. The electronic pen 2501 emits a sound wave together with light emission, and the projector 411 calculates a distance according to the time of arrival of the sound wave. By the direction and the distance, the location of the electronic pen 2501 can be identified. The stroke data is drawn (projected) at the position of the electronic pen 2501.

The projector 411 projects a menu 430, so when a user presses a button with the electronic pen 2501, the projector 411 identifies the position of the electronic pen 2501 and the pushed button by the ON signal of the switch. For example, when a store button 431 is pressed, the stroke data handwritten by the user is stored in the projector 411. The projector 411 stores handwriting information in a predetermined server 412 or a Universal Serial Bus (USB) memory 2600 or the like. The handwriting information is stored for each page. The handwriting information is stored by coordinates instead of image data, allowing the user to re-edit the image data. In the present embodiment, however, the menu 430 is not required to be displayed because an operation command can be called by handwriting input.

Example 2 of Another Display Apparatus Configuration

Figure 35:
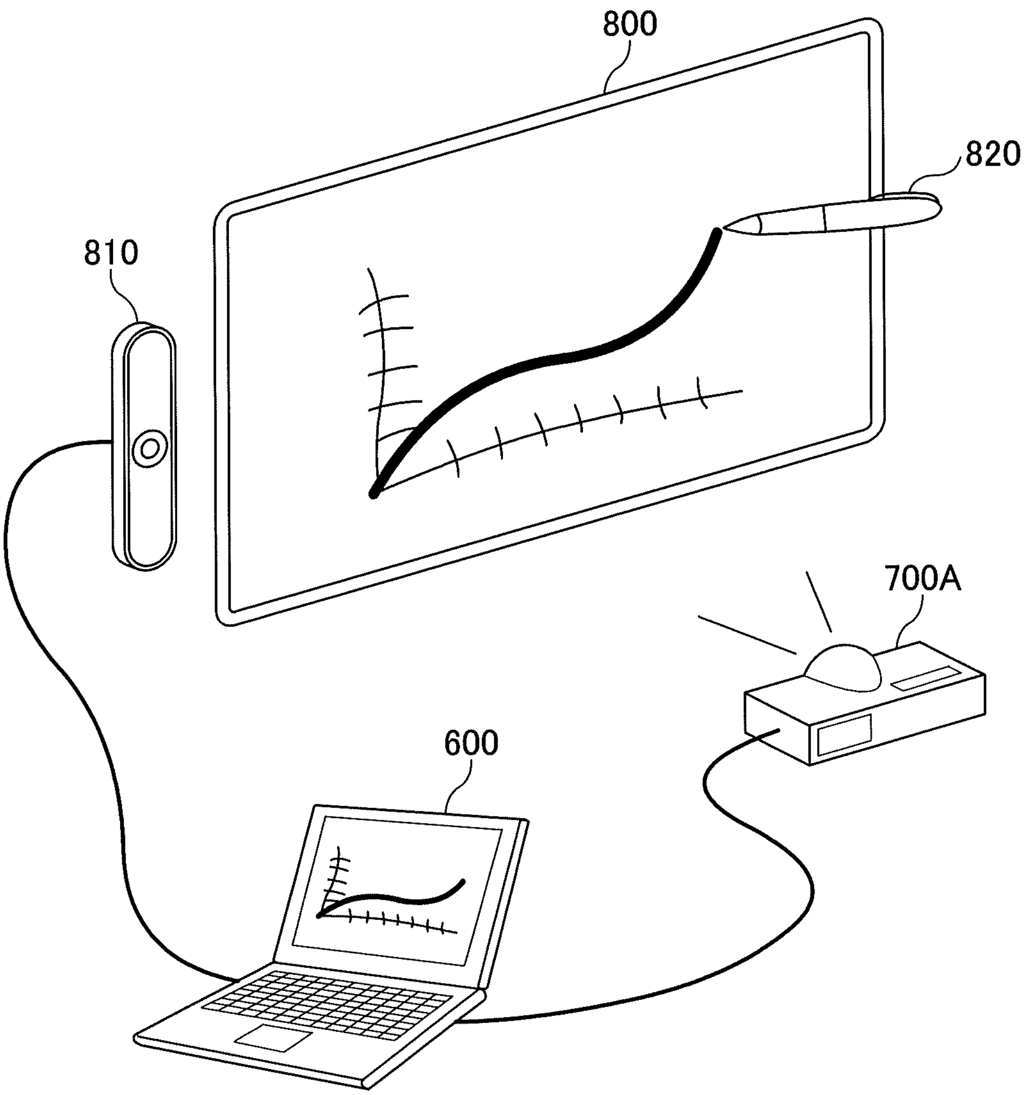
FIG. 35 is a diagram illustrating another configuration example of the display apparatus according to the second embodiment of the present invention.

FIG. 35 is a diagram illustrating another configuration example of the display apparatus. In the example of FIG. 35, the display apparatus includes a terminal device 600, an image projector device 700A, and a pen motion detecting device 810.

The terminal device 600 is connected in a wired manner to the image projector device 700A and the pen motion detecting device 810. The image projector device 700A causes the image data input by the terminal device 600 to be projected onto a screen 800.

The pen motion detecting device 810 is in communication with an electronic pen 820 and detects operations of the electronic pen 820 in the vicinity of the screen 800. Specifically, the pen motion detecting device 810 detects coordinate information indicating a point represented by the electronic pen 820 on the screen 800 and transmits the coordinate information to the terminal device 600.

The terminal device 600 generates the image data of the stroke data image input by the electronic pen 820 based on the coordinate information received from the pen motion detecting device 810, and causes the image projector device 700A to render the stroke data image on the screen 800.

The terminal device 600 generates superimposed image data representing a superimposed image composed of a background image projected by the image projector device 700A and a stroke data image input by the electronic pen 820.

Example 3 of Another Display Apparatus Configuration

Figure 36:
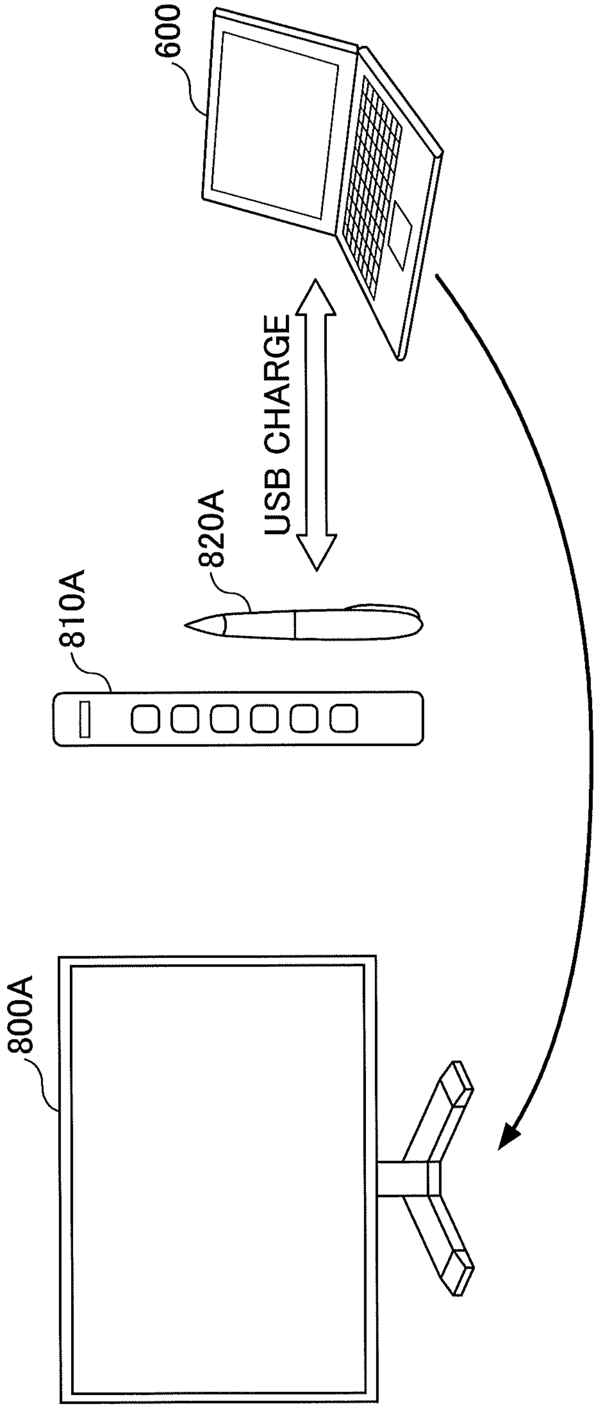
FIG. 36 is a diagram illustrating another configuration example of the display apparatus according to the second embodiment of the present invention.

FIG. 36 is a diagram illustrating an example of a configuration of the display apparatus. In the example of FIG. 36, the display apparatus includes the terminal device 600, a display 800A, and a pen motion detecting device 810A.

The pen motion detecting device 810A is disposed near the display 800A and detects coordinate information indicating a point indicated by an electronic pen 820A on the display 800A, and transmits the coordinate information to the terminal device 600. In the example of FIG. 36, the electronic pen 820A may be charged by the terminal device 600 via a USB connector.

The terminal device 600 generates image data of the stroke data image input by the electronic pen 820A and displays the image data on the display 800A based on the coordinate information received from the pen motion detecting device 810A.

Example 4 of Another Display Apparatus Configuration

Figure 37:
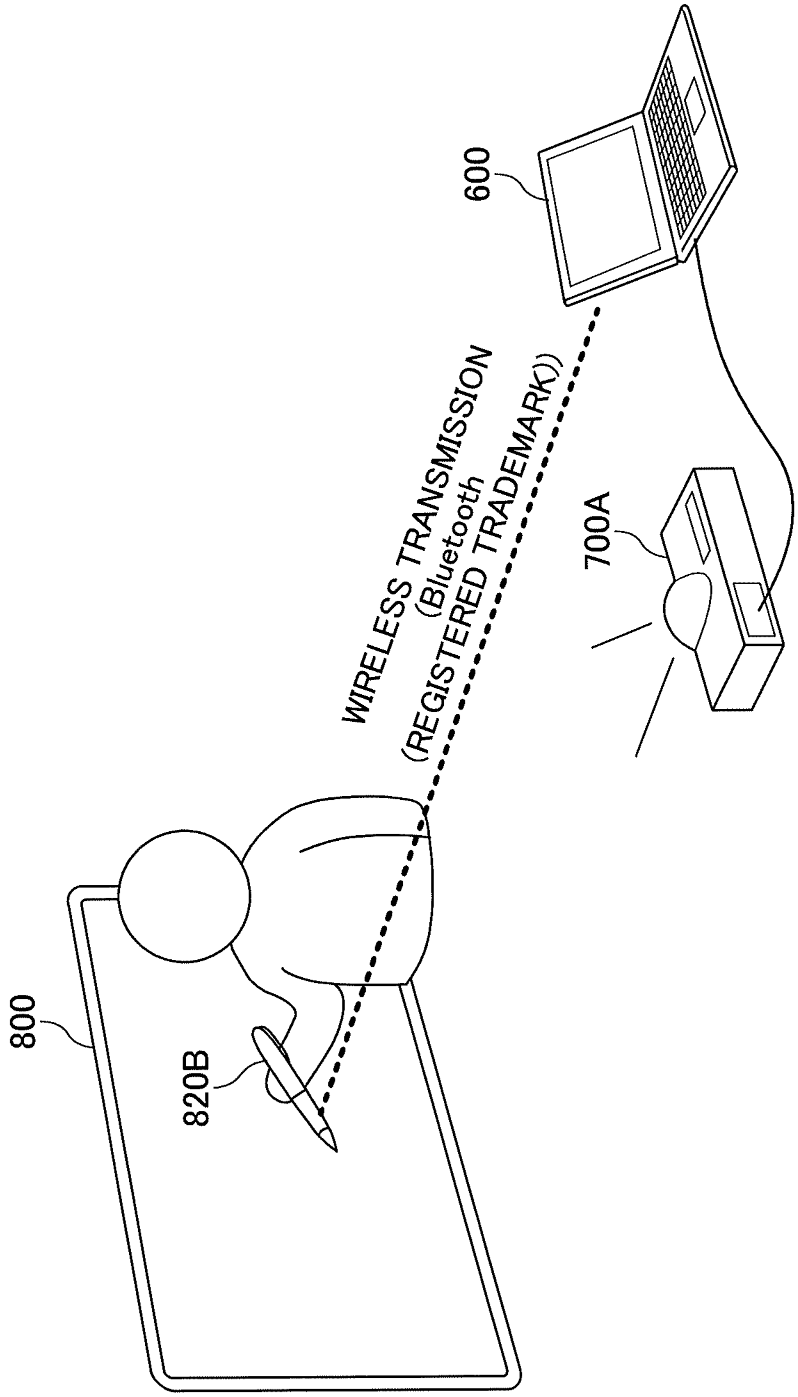
FIG. 37 is a diagram illustrating another configuration example of the display apparatus according to the second embodiment of the present invention.

FIG. 37 is a diagram illustrating an example of a configuration of the display apparatus. In the example of FIG. 37, the display apparatus includes the terminal device 600 and the image projector device 700A.

The terminal device 600 performs wireless communication (such as Bluetooth (registered trademark)) with an electronic pen 820B and receives coordinate information of a point indicated by the electronic pen 820B on the screen 800. The terminal device 600 generates the image data of the stroke data image input by the electronic pen 820B based on the received coordinate information and causes the image projector device 700A to project the stroke data image.

The terminal device 600 generates superimposed image data representing a superimposed image composed of a background image projected by the image projector device 700A and a stroke data image input by the electronic pen 820.

As described above, each of the above-described embodiments can be applied in various system configurations.

Third Embodiment

In the present embodiment, a system type handwriting input system in which an information processing system on the network performs processing such as handwriting recognition and returns the results of the processing to the display apparatus 2, will be described. In the present embodiment, a system configuration based on the configuration of the first embodiment will be described.

In the description of the present embodiment, the components denoted by the same reference numerals as those of the first embodiment or the contents of the drawings perform the same functions as those of the first embodiment, and, therefore, the description of the components described above may be omitted or only the differences may be described.

Figure 38:
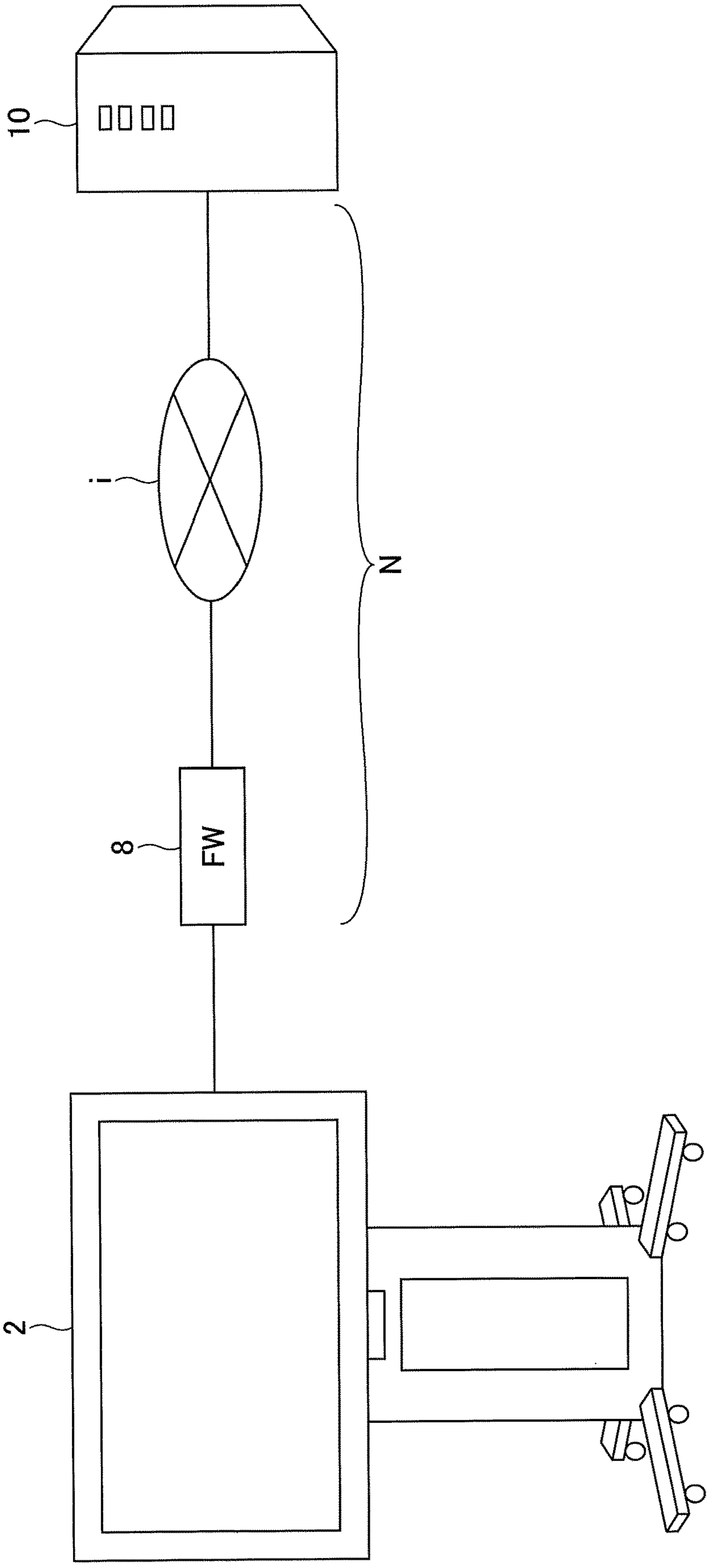
FIG. 38 is an example of a system configuration diagram of a handwriting input system according to a third embodiment of the present invention.

FIG. 38 is an example of a system configuration diagram of a handwriting input system 100. The handwriting input system 100 includes the display apparatus 2 and an information processing system 10 capable of communicating through a network N.

The display apparatus 2 is located in a facility such as the company and is connected to a Local Area Network (LAN) or Wi-Fi installed in the facility. The information processing system 10 is disposed at, for example, a data center. The display apparatus 2 is connected to the Internet i via a firewall 8, and the information processing system 10 is also connected to the Internet i via a high-speed LAN in the data center.

The display apparatus 2 may be connected to the Internet i using wireless communication such as a telephone line network. In this case, the wireless communication is 3rd Generation (3G), 4th Generation (4G), 5th Generation (5G), Long Term Evolution (LTE), Worldwide Interoperability for Microwave Access (WiMAX), etc.

The information processing system 10 includes one or more information processing apparatuses, and one or more information processing apparatuses provide services to the display apparatus 2 as a server. A server is a computer or software that functions to provide information and processing results in response to a client's request. As will be described later, the information processing system 10 receives the pen coordinates from the display apparatus 2 and transmits necessary information to the display apparatus 2 for displaying the operation guide 500 illustrated in FIG. 13.

The server-side systems may be referred to as a cloud system. A cloud system is a system that uses cloud computing. Cloud computing is a form of use in which resources on a network are used without considering specific hardware resources. Cloud systems are not necessarily disposed on the Internet. In FIG. 38, the information processing system 10 is located in the Internet, but may be located on a local network (in this case referred to as on-premise).

Further, in some embodiments, the information processing system 10 includes a plurality of computing devices such as server clusters. The plurality of computing devices are configured to communicate with each other via any type of communication link, including networks, a shared memory, and the like, and perform the processes disclosed herein.

The hardware configuration of the display apparatus 2 may be the same as that of the first embodiment, but in the present embodiment, a touch panel, a display, and a communication function may be provided. The display apparatus 2 may include a plurality of computing devices configured to communicate with each other.

In the present embodiment, a typical information processing apparatus, such as a personal computer (PC) or a tablet, can execute a web browser or an exclusive use application. A web browser or a an exclusive use application communicates with the information processing system 10. When the Web browser operates, the user enters or selects a Uniform Resource Locater (URL) of the information processing system 10 to connect the display apparatus to the information processing system 10. The display apparatus 2 executes a web application provided by the information processing system 10 in a web browser. A web application refers to software or a mechanism executed in the web browser, that operates according to the cooperation between programs in a programming language (e.g., JavaScript (registered trademark)) running on a web browser and programs running on a web server.

When the exclusive use application operates, the display apparatus 2 connects to the URL of the pre-registered information processing system 10. The exclusive use application has a program and a user interface, and, therefore, the program transmits and receives necessary information with the information processing system 10 to be displayed on the user interface.

The communication method may be a general-purpose communication protocol such as HyperText Transport Protocol (HTTP), Hypertext Transfer Protocol Secure (HTTPs), and WebSocket, or may be an exclusive use communication protocol.

<Example Hardware Configuration>

The hardware configuration of the display apparatus 2 may be the same as that of FIG. 4. In the present embodiment, a hardware configuration example of the information processing system 10 will be described.

Figure 39:
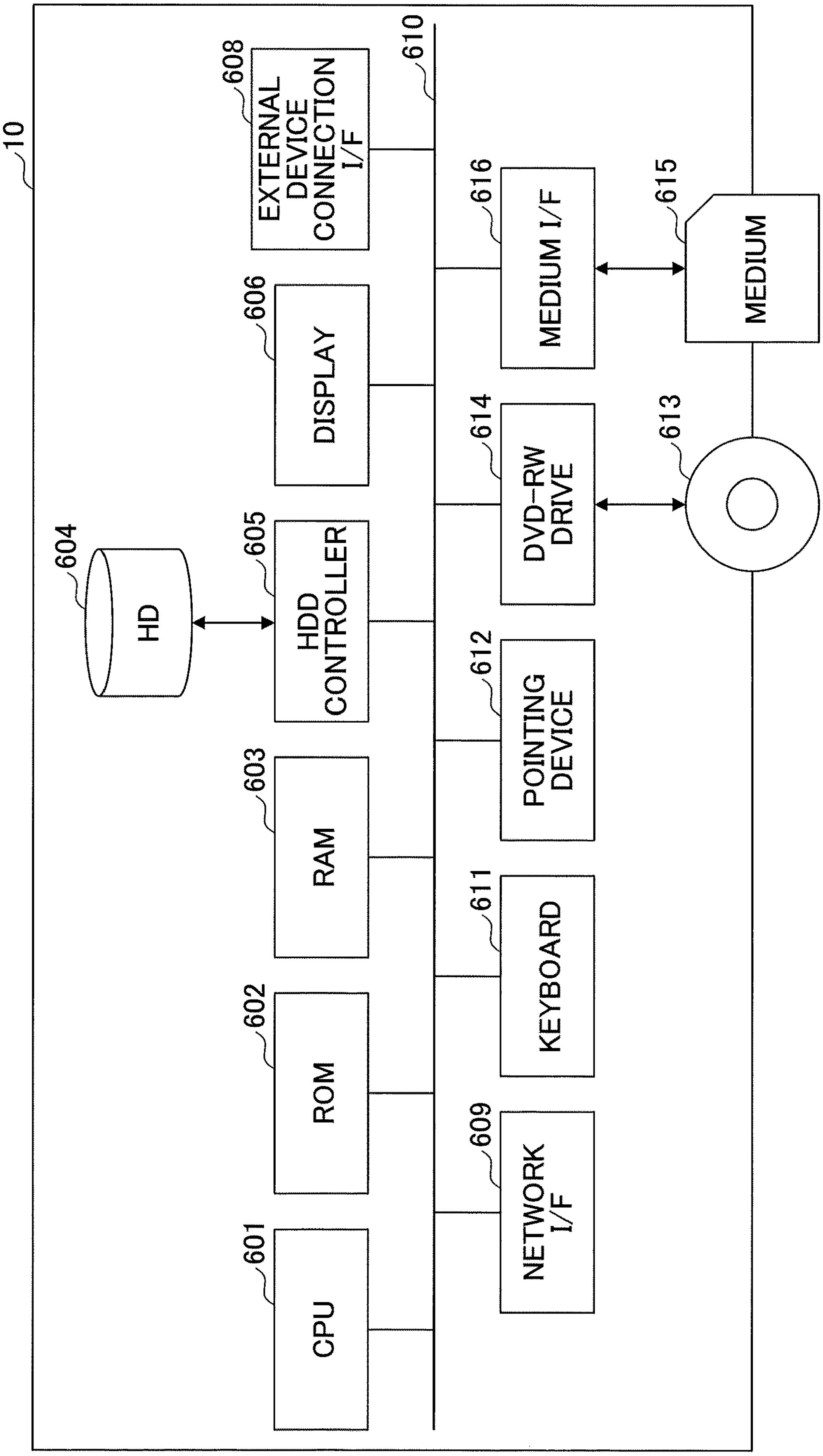
FIG. 39 is an example of a hardware configuration diagram of an information processing system according to the third embodiment of the present invention.

FIG. 39 is a diagram illustrating the hardware configuration of the information processing system 10. As illustrated in FIG. 39, the information processing system 10 is constructed by a computer and includes a central processing unit (CPU) 601, a read-only memory (ROM) 602, a random access memory (RAM) 603, a hard disk (HD) 604, a hard disk drive (HDD) controller 605, a display 606, an external device connection I/F 608, a network I/F 609, a bus line 610, a keyboard 611, a pointing device 612, a Digital Versatile Disk Rewritable (DVD-RW) drive 614, and a medium I/F 616 as illustrated in FIG. 39.

Among these, the CPU 601 controls the operation of the entire information processing system 10. The ROM 602 stores a program used to drive the CPU 601, such as an IPL. The RAM 603 is used as the work area of the CPU 601. The HD 604 stores various kinds of data such as programs. The HDD controller 605 controls the reading or writing of various kinds of data to the HD 604 in accordance with the control of the CPU 601. The display 606 displays various kinds of information such as cursors, menus, windows, characters, or images. The external device connection I/F 608 is an interface for connecting various external devices. In this case, the external device may be, for example, a USB memory or a printer. The network I/F 609 is an interface for performing data communication using a communication network. The bus line 610 is an address bus, data bus, or the like for electrically connecting components such as the CPU 601 illustrated in FIG. 39.

The keyboard 611 includes a plurality of keys for input of characters, numbers, various indications, and the like. The pointing device 612 is a type of input means for selecting and executing various instructions, selecting a processing target, moving a cursor, and the like. The DVD-RW drive 614 controls the reading or writing of various kinds of data to a DVD-RW 613 as an example of a removable recording medium. The recording medium is not limited to a DVD-RW, but may be a DVD recordable (DVD-R), etc. The medium I/F 616 controls the reading or writing (storage) of data to a recording medium 615, such as a flash memory.

<Function of Apparatus>

Figure 40:
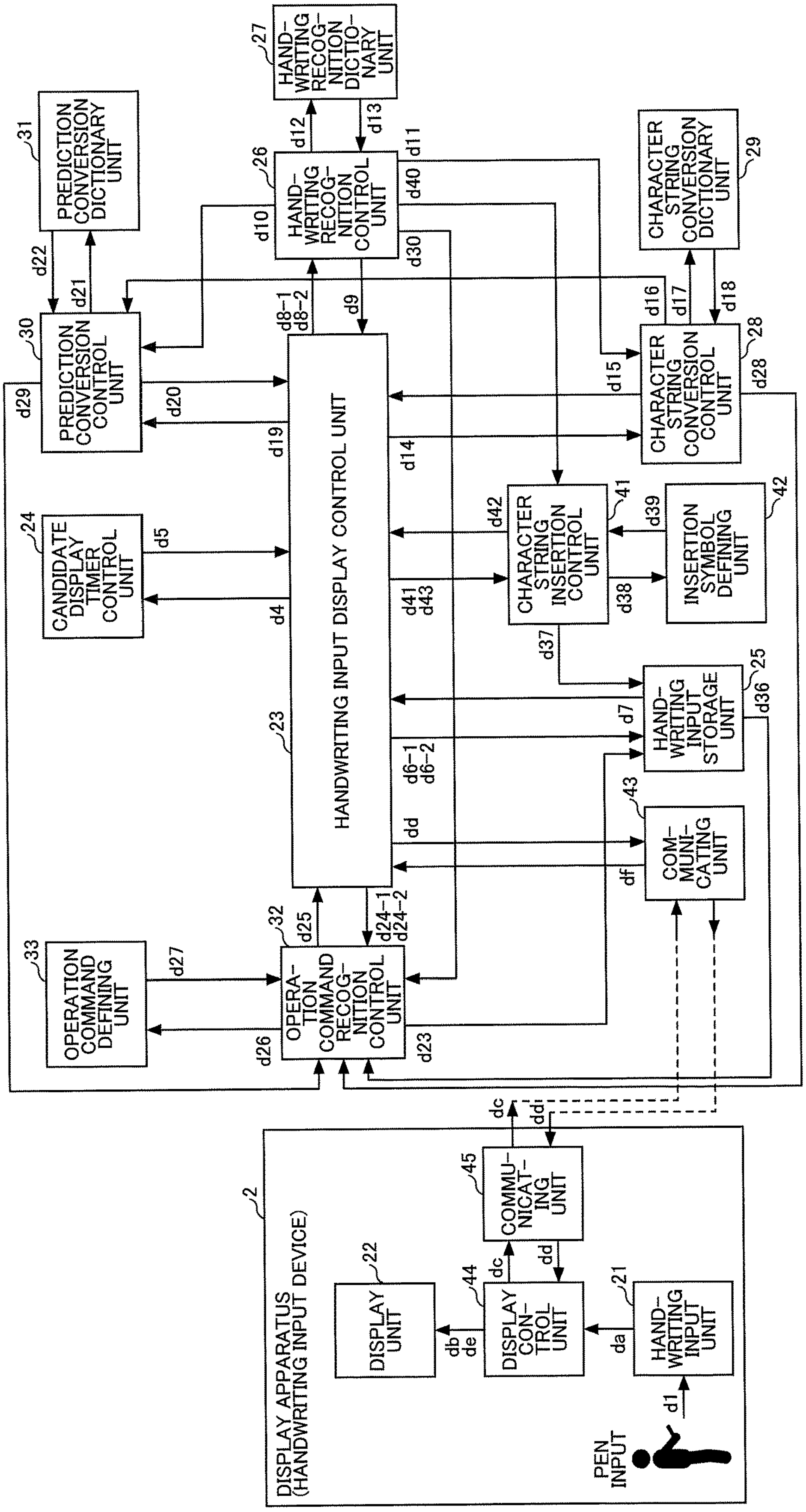
FIG. 40 is an example of a functional block diagram illustrating functions of the handwriting input system (third embodiment) according to the third embodiment of the present invention.
Figure 41:
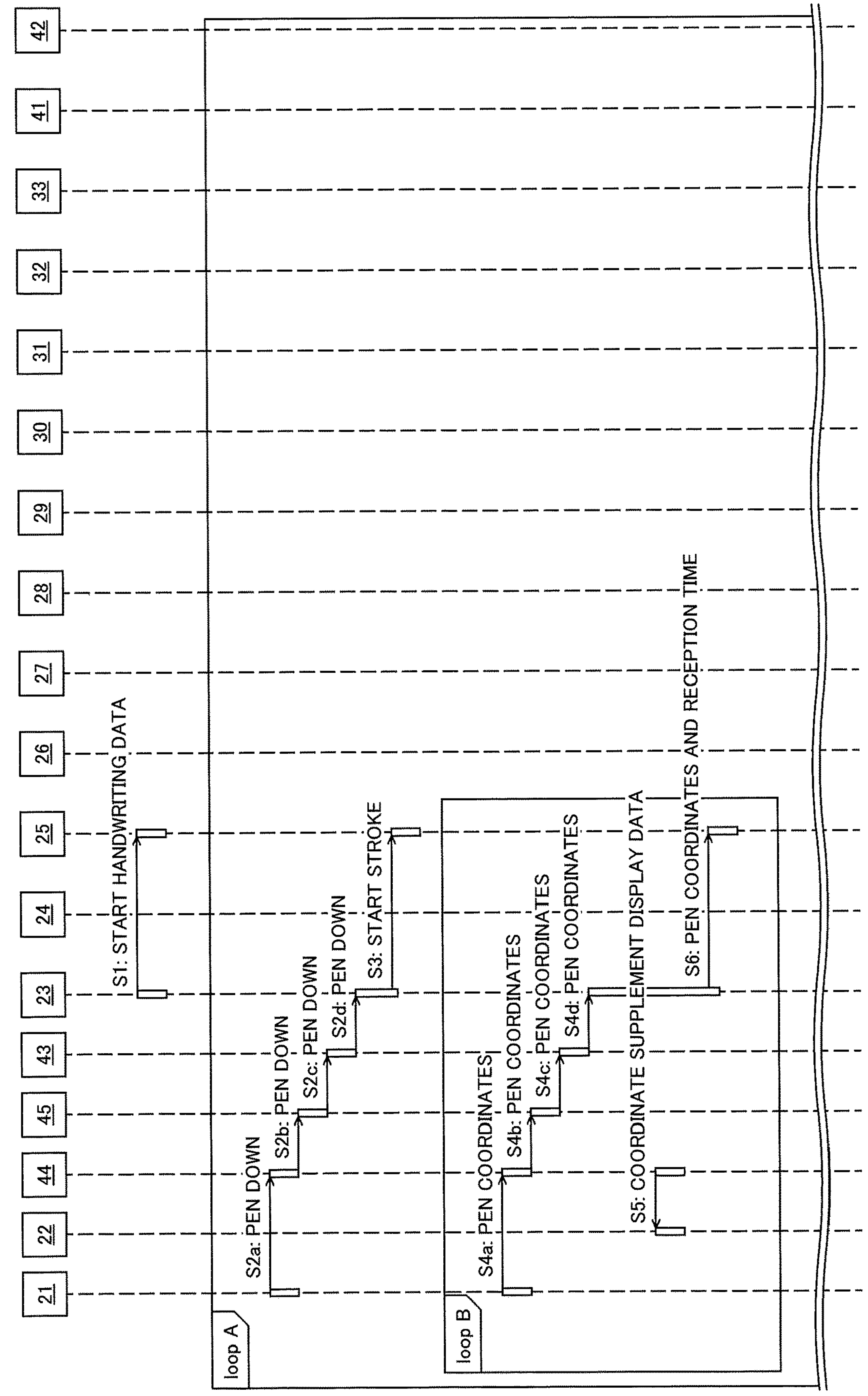
FIG. 41 is a sequence diagram illustrating a process in which the handwriting input system displays a character string candidate and an operation command candidate (part 1) according to the third embodiment of the present invention.
Figure 42:
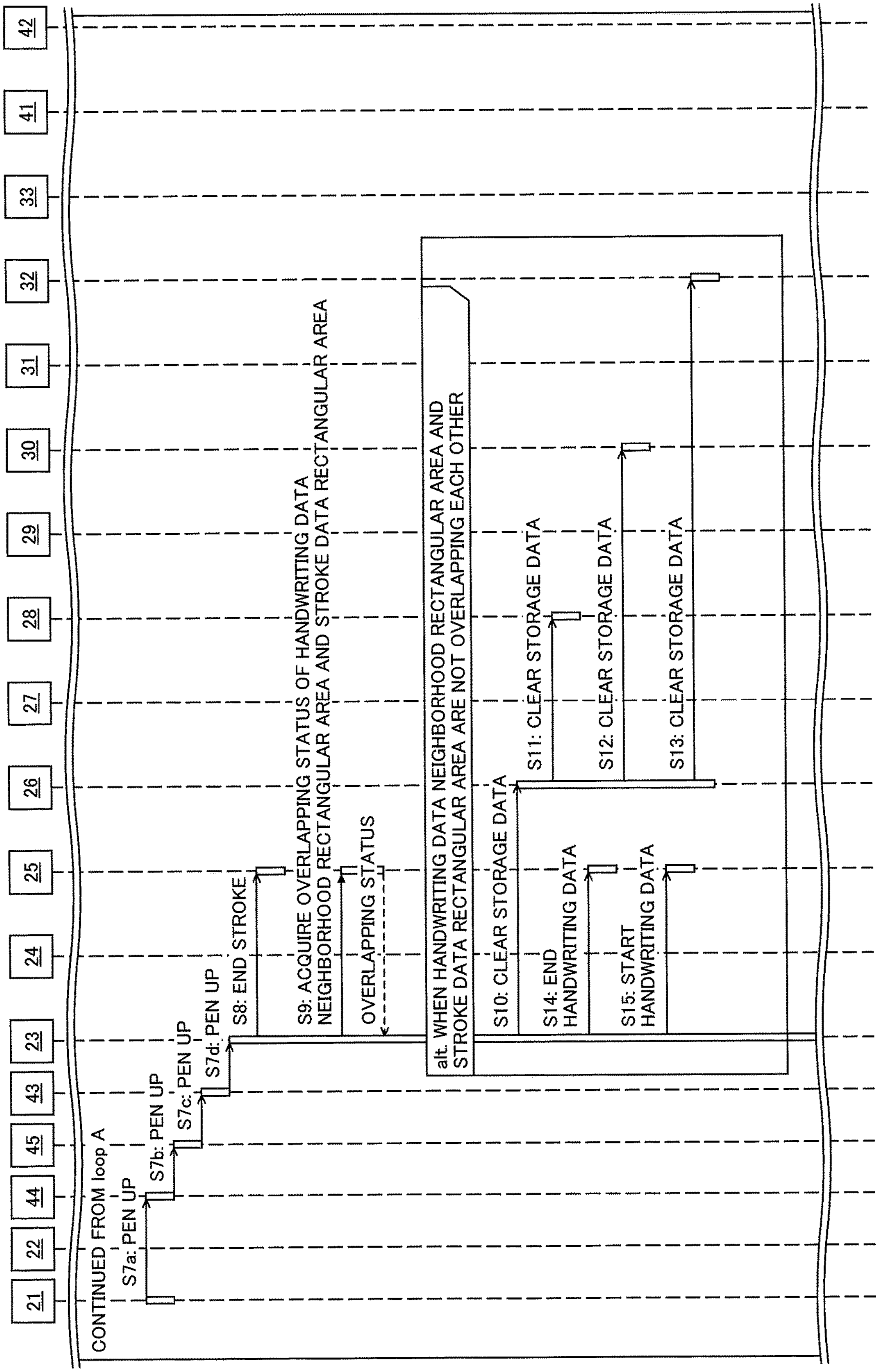
FIG. 42 is a sequence diagram illustrating a process in which the handwriting input system displays a character string candidate and an operation command candidate (part 2) according to the third embodiment of the present invention.
Figure 43:
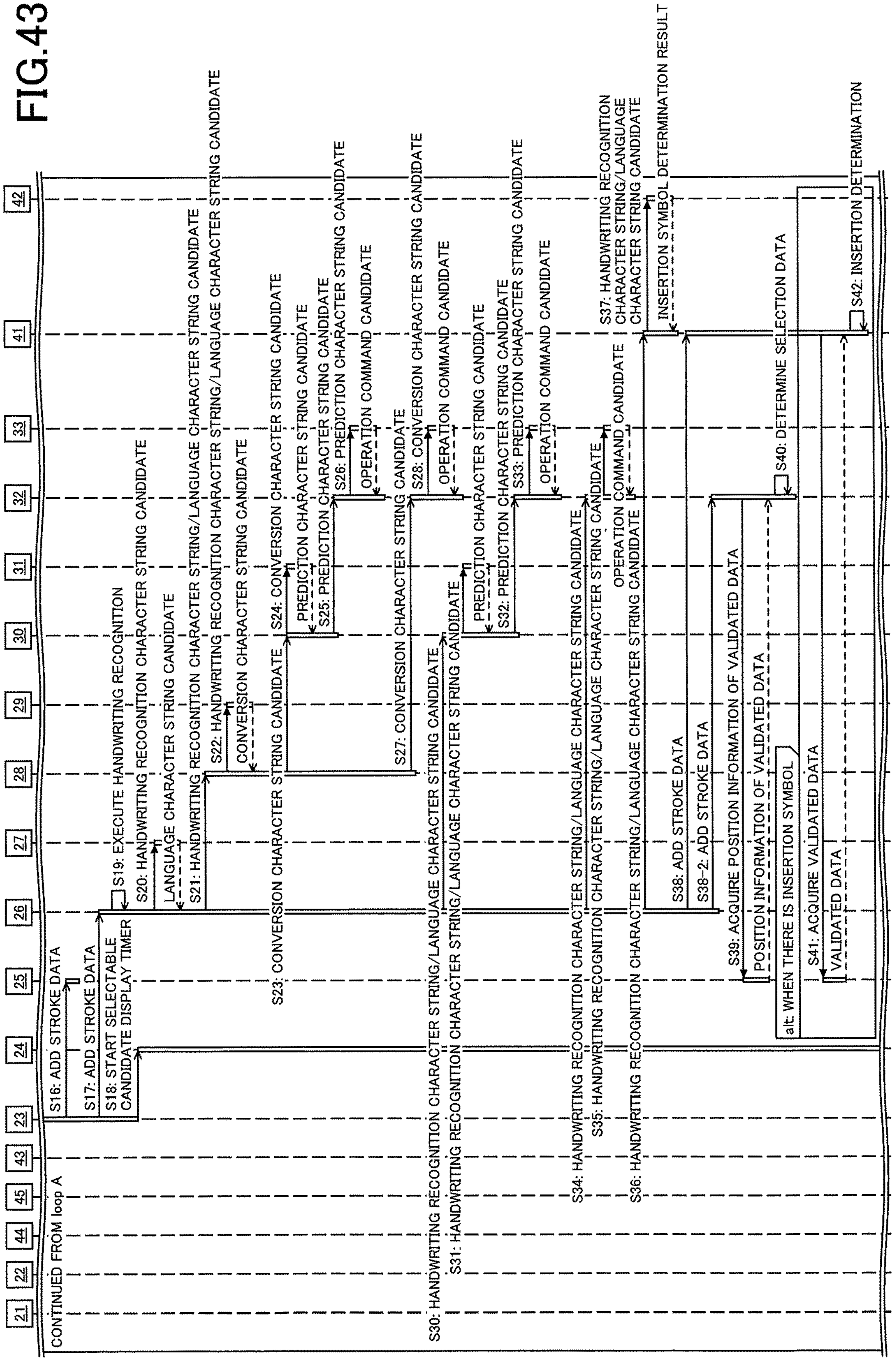
FIG. 43 is a sequence diagram illustrating a process in which the handwriting input system displays a character string candidate and an operation command candidate (part 3) according to the third embodiment of the present invention.
Figure 44:
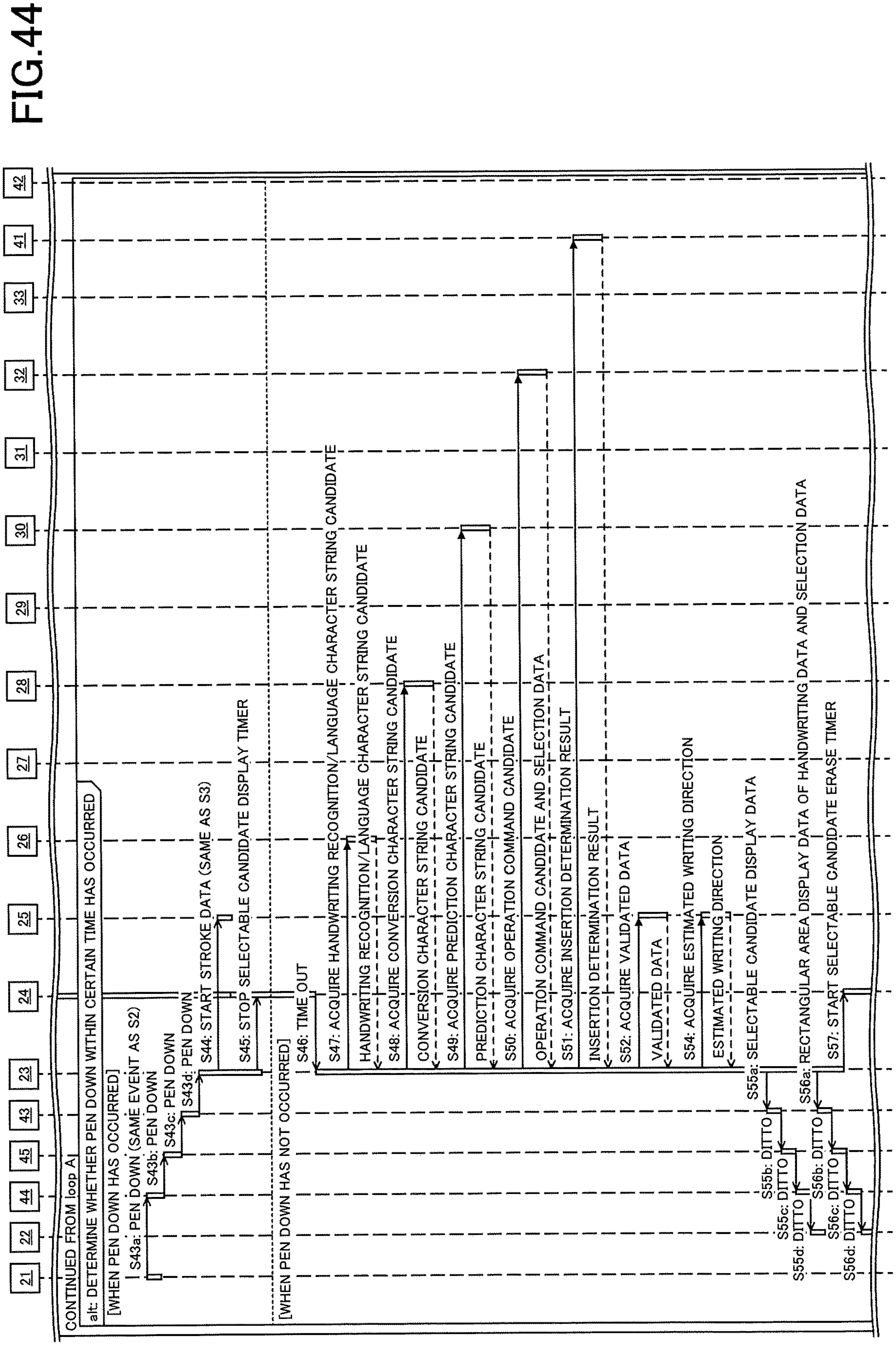
FIG. 44 is a sequence diagram illustrating a process in which the handwriting input system displays a character string candidate and an operation command candidate (part 4) according to the third embodiment of the present invention.
Figure 45:
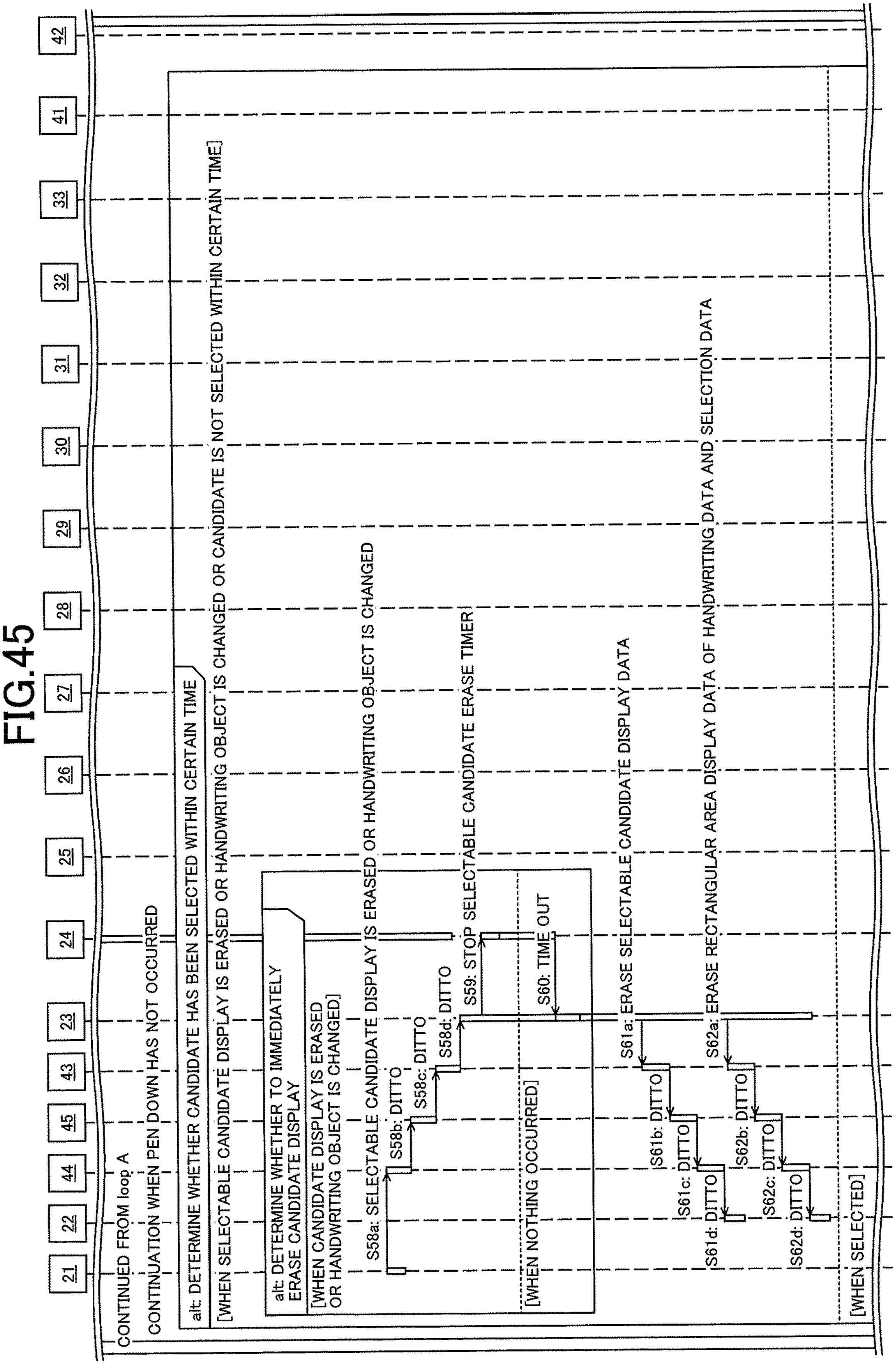
FIG. 45 is a sequence diagram illustrating a process in which the handwriting input system displays a character string candidate and an operation command candidate (part 5) according to the third embodiment of the present invention.
Figure 46:
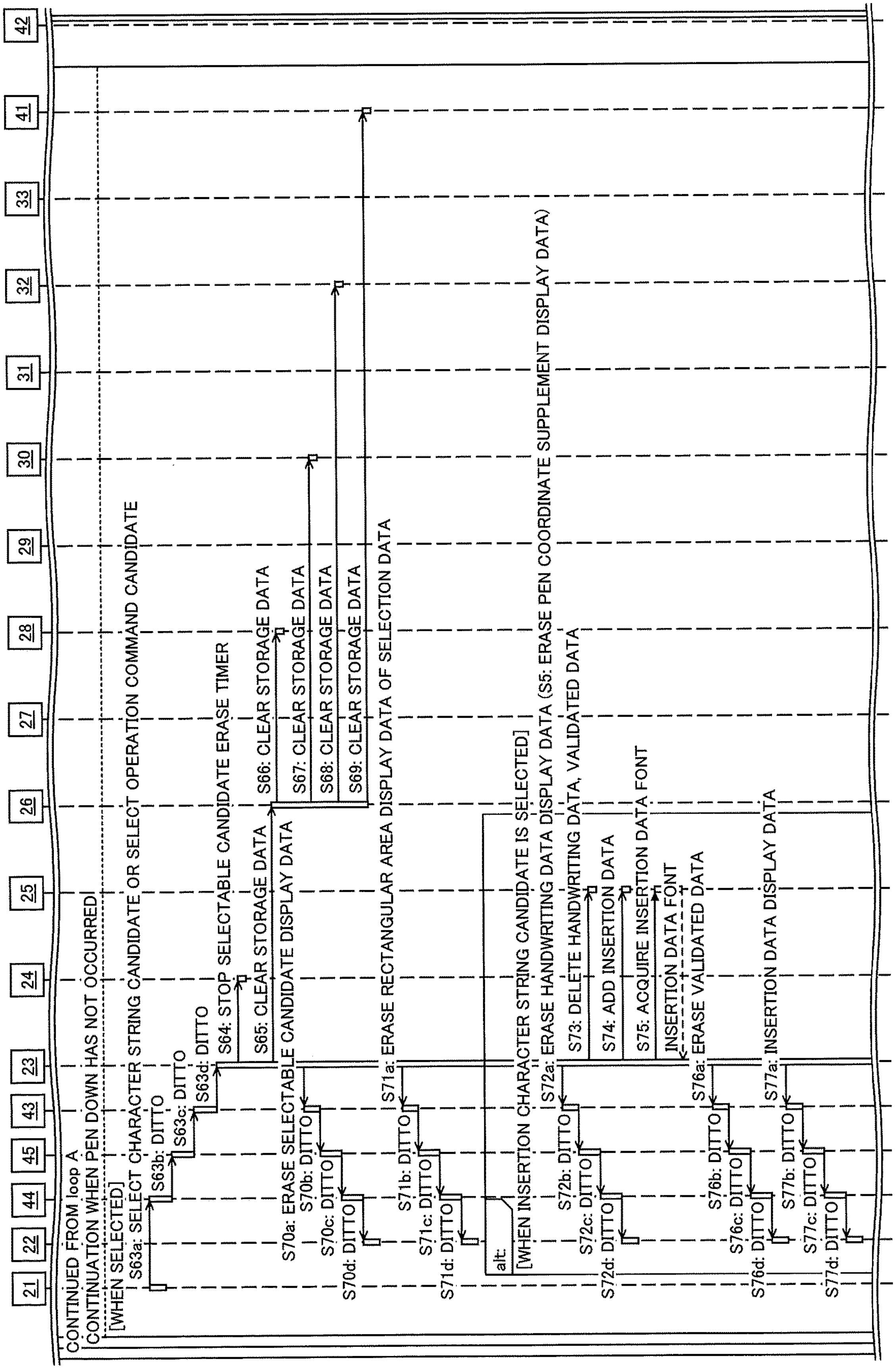
FIG. 46 is a sequence diagram illustrating a process in which the handwriting input system displays a character string candidate and an operation command candidate (part 6) according to the third embodiment of the present invention.
Figure 47:
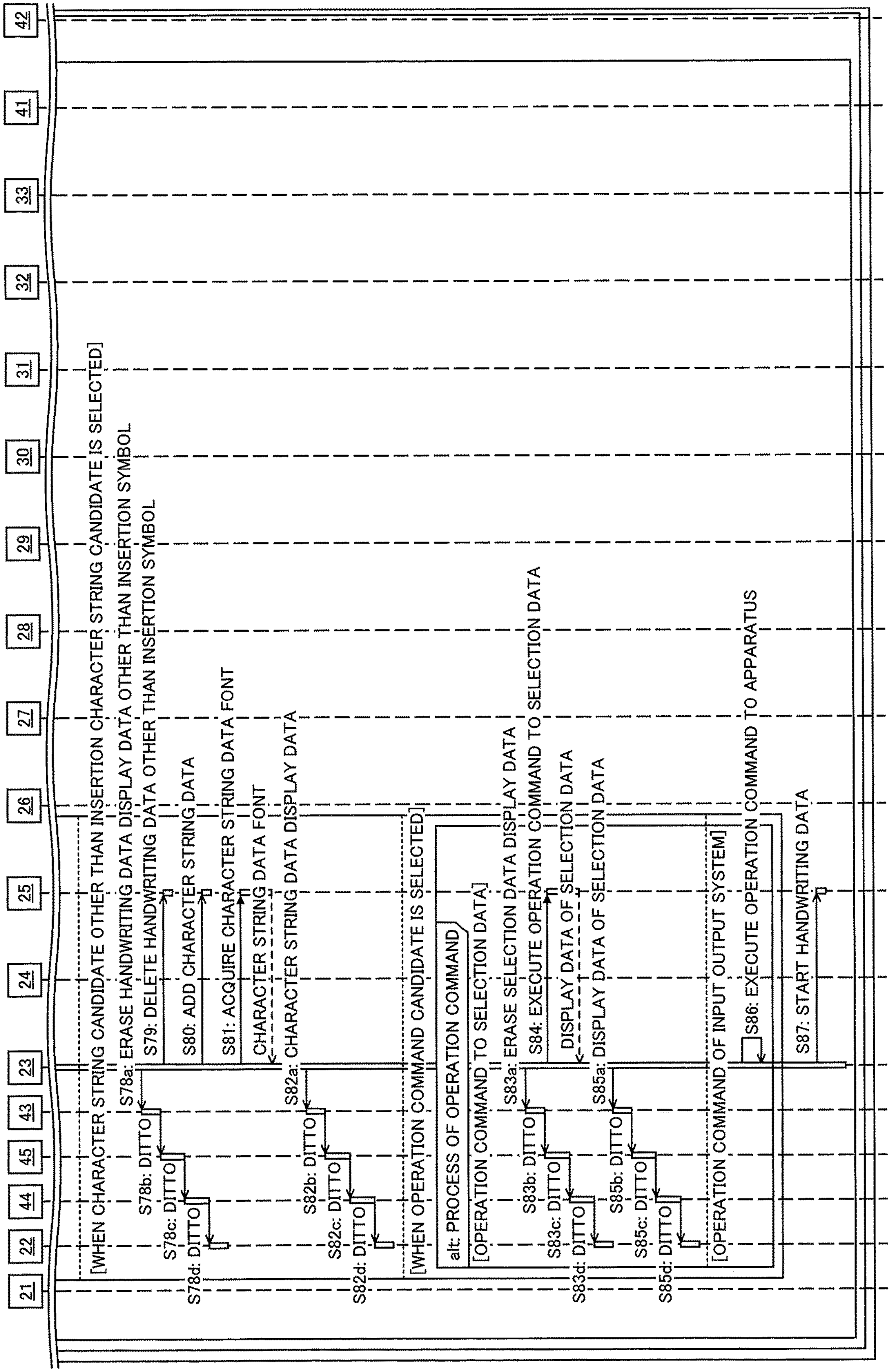
FIG. 47 is a sequence diagram illustrating a process in which the handwriting input system displays a character string candidate and an operation command candidate (part 7) according to the third embodiment of the present invention.

Next, functions of the handwriting input system 100 will be described with reference to FIG. 40. FIG. 40 is an example of a functional block diagram illustrating the functions of the handwriting input system 100. In the description of FIG. 40, the difference from FIG. 5 will be mainly explained. The function of the pen 2500 may be the same as that of the first embodiment.

In the present embodiment, the display apparatus 2 includes the display unit 22, a display control unit 44, the handwriting input unit 21, and a communicating unit 45. Each function of the display apparatus 2 is a function or means implemented as one of the components illustrated in FIG. 40 is operated by instructions from the CPU 201 according to a program loaded from the SSD 204 to the RAM 203.

The function of the handwriting input unit 21 according to the present embodiment may be the same as that of the first embodiment. The handwriting input unit 21 converts the user's pen input d1 into pen operation data (pen up, pen down, or pen-coordinate data) and transmits the converted data to the display control unit 44.

The display control unit 44 controls the display of the display apparatus 2. First, the display control unit 44 complements and calculates the coordinates between discrete values of the pen coordinate data, which are discrete values, and transmits the pen coordinate data from the pen down to the pen up as a single stroke db to the display unit 22.

The display control unit 44 transmits the pen operation data dc to the communicating unit 45 and acquires various kinds of display data dd from the communicating unit 45. The display data includes information for displaying the operation guide 500 of FIG. 13. The display control unit 44 transmits the display data de to the display unit 22.

The communicating unit 45 transmits the pen operation data dc to the information processing system 10, receives various kinds of display data dd from the information processing system 10, and transmits the received data to the display control unit 44. The communicating unit 45 transmits and receives data in, for example, the JSON format or the XML format.

The function of the display unit 22 may be the same as that of the first embodiment. The display unit 22 displays the stroke db and the display data de. The display unit 22 converts the stroke db or the display data de written in the video memory by the display control unit 44 into data corresponding to the characteristics of the display 220 and transmits the data to the display 220.

<<Functions of Information Processing System>>

The information processing system 10 includes a communicating unit 43, the handwriting input display control unit 23, the candidate display timer control unit 24, the handwriting input storage unit 25, the handwriting recognition control unit 26, the handwriting recognition dictionary unit 27, the character string conversion control unit 28, the character string conversion dictionary unit 29, the prediction conversion control unit 30, the prediction conversion dictionary unit 31, the operation command recognition control unit 32, the operation command defining unit 33, the character string insertion control unit 41, and the insertion symbol defining unit 42. Each function of the information processing system 10 is a function or means that is implemented as one of the components illustrated in FIG. 40 is operated by instructions from the CPU 601 according to a program loaded from the HD 604 to the RAM 603.

The communicating unit 43 receives pen operation data do from the display apparatus 2 and transmits pen operation data df to the handwriting input display control unit 23. The communicating unit 43 receives display data dd from the handwriting input display control unit 23 and transmits the data to the display apparatus 2. The communicating unit 43 transmits and receives data in a JSON format, an XML format, or the like.

The other functions are the same as those of the first embodiment. Even when the functions are different, such differences do not hinder the description of the present embodiment.

<Operation Procedure>

The operation of the handwriting input system 100 will be described with reference the above configuration and FIGS. 41 to 47. FIGS. 41 to 47 are sequence diagrams illustrating a process in which the display apparatus 2 displays a character string candidate and an operation command candidate. The process of FIG. 41 starts when the display apparatus 2 is activated (a web browser or an exclusive use application is activated) and communication with the information processing system 10 is established. Note that the overall flow of FIGS. 41 to 47 may be the same as that of FIGS. 18 to 23.

S1: When communication is established, the handwriting input display control unit 23 transmits the start of the handwriting data to the handwriting input storage unit 25 in order to secure a memory area of the display apparatus 2. The handwriting input storage unit 25 secures a handwriting data area (a memory area for storing handwriting data). The handwriting data area may be secured after the user brings a pen in contact with the handwriting input unit 21.

S2*a*: Next, the user brings the pen in contact with the handwriting input unit 21. The handwriting input unit 21 detects the pen down and transmits the pen down to the display control unit 44.

S2*b*: The display control unit 44 transmits the pen down to the communicating unit 45 in order to notify the information processing system 10 of the pen down.

S2*c*: The communicating unit 45 transmits the pen down to the information processing system 10.

S2*d*: The communicating unit 43 of the information processing system 10 receives the pen down and transmits the pen down to the handwriting input display control unit 23.

S3: The handwriting input display control unit 23 transmits stroke start to the handwriting input storage unit 25, and the handwriting input storage unit 25 secures a stroke data area.

S4*a*: When the user moves the pen in contact with the handwriting input unit 21, the handwriting input unit 21 transmits the pen coordinates to the handwriting input display control unit 23.

S4*b*: The display control unit 44 transmits the pen coordinates to the communicating unit 45 in order to notify the information processing system 10 of the pen coordinates.

S4*c*: The communicating unit 45 transmits the pen coordinates to the information processing system 10.

S4*d*: The communicating unit 43 of the information processing system 10 receives the pen coordinates and transmits the pen coordinates to the handwriting input display control unit 23.

S5: The display control unit 44 transmits the pen coordinate supplement display data (data interpolating discrete pen coordinates) to the display unit 22. The display unit 22 displays a line by interpolating the pen coordinates using the pen coordinate supplement display data. Step S6 is the same as that of the first embodiment.

S7*a*: When the user releases the pen from the handwriting input unit 21, the handwriting input unit 21 transmits the pen up to the display control unit 44.

S7*b*: The display control unit 44 transmits the pen up to the communicating unit 45 in order to notify the information processing system 10 of the pen up.

S7*c*: The communicating unit 45 transmits pen up to the information processing system 10.

S7*d*: The communicating unit 43 of the information processing system 10 receives the pen up and transmits the pen up to the handwriting input display control unit 23.

Subsequent steps S8 to S15 and steps S16 to S42 are the same as those in the first embodiment.

S43*a*: When the user brings the pen into contact with the handwriting input unit 21 before the timer expires (time out), the handwriting input unit 21 transmits pen down (the same event as in step S2) to the display control unit 44. The processes of steps S43*b* to S43*d* may be the same as those of steps S2*b* to S2*d*. Further, the processes of steps S44 to S54 are the same as those of the first embodiment.

S55*a*: The handwriting input display control unit 23 creates the selectable candidate display data including each character string candidate illustrated in FIG. 13, an operation command candidate, each selection probability, and the estimated writing direction, and transmits the selectable candidate display data formed of the character string candidate and the operation command candidate to the communicating unit 43.

S55*b*: The communicating unit 43 transmits the selectable candidate display data to the display apparatus 2.

S55*c*: The communicating unit 45 of the display apparatus 2 receives the selectable candidate display data and transmits the selectable candidate display data to the display control unit 44.

S55*d*: The display control unit 44 receives the selectable candidate display data and transmits the selectable candidate display data to the display unit 22 to be displayed.

S56*a*: The handwriting input display control unit 23 transmits the rectangular area display data (rectangular frame) of the handwriting data and the selection object (the handwriting data rectangular area display 503 in FIG. 13) to the communicating unit 43.

S56*b*: The communicating unit 43 transmits the rectangular area display data to the display apparatus 2.

S56*c*: The communicating unit 45 of the display apparatus 2 receives the rectangular area display data and transmits the rectangular area display data to the display control unit 44.

S56*d*: The display control unit 44 receives the rectangular area display data and transmits the rectangular area display data to the display unit 22 to be displayed. The process of step S57 is the same as that of the first embodiment.

S58*a*: When the user erases the selectable candidate or adds handwriting to the handwriting data, the handwriting input unit 21 transmits a report of the selectable candidate display erasure or the occurrence of a change of the handwriting data to the display control unit 44.

S58*b*: The display control unit 44 transmits the report of the selectable candidate display erasure or the occurrence of a change of the handwriting data to the communicating unit 45 for notifying the information processing system 10 of the selectable candidate display erasure or the occurrence of a change of the handwriting data.

S58*c*: The communicating unit 45 transmits the report of the selectable candidate display erasure or the occurrence of a change of the handwriting data to the information processing system 10.

S58*d*: The communicating unit 43 of the information processing system 10 receives the report of the selectable candidate display erasure or the occurrence of a change of the handwriting data, and transmits the report of the selectable candidate display erasure or the occurrence of a change of the handwriting data to the handwriting input display control unit 23. The processes of steps S59 and S60 are the same as those of the first embodiment.

S61*a*: The handwriting input display control unit 23 transmits an instruction to erase the selectable candidate display data to the communicating unit 43.

S61*b*: The communicating unit 43 transmits the instruction to erase the selectable candidate display data to the display apparatus 2.

S61*c*: The communicating unit 45 of the display apparatus 2 receives the instruction to erase the selectable candidate display data and transmits the instruction to erase the selectable candidate display data to the display control unit 44.

S61*d*: The display control unit 44 receives the instruction to erase the selectable candidate display data and transmits the instruction to erase the selectable candidate display data to the display unit 22 to erase the selectable candidate.

S62*a*: The handwriting input display control unit 23 transmits an instruction to erase the rectangular area display data of the handwriting data and the selection object, to the communicating unit 43.

S62*b*: The communicating unit 43 transmits the instruction to erase the rectangular area display data of the handwriting data and the selection object to the display apparatus 2.

S62*c*: The communicating unit 45 of the display apparatus 2 receives the instruction to erase the rectangular area display data of the handwriting data and the selection object and transmits the instruction to erase the rectangular area display data of the handwriting data and the selection object to the display control unit 44.

S62*d*: The display control unit 44 receives the instruction to erase the rectangular area display data of the handwriting data and the selection object and transmits the instruction to the display unit 22 so that the rectangular area display data of the handwriting data and the selection object are erased. Therefore, when the display of the operation command candidate is erased under conditions other than the operation command candidate being selected, the display of the handwriting data is retained.

When the user selects the selectable candidate after the start of the selectable candidate erase timer, steps S63 to S87 are executed.

S63*a*: When the user selects a selectable candidate after the start of the selectable candidate erase timer, the handwriting input unit 21 transmits the selection of a character string candidate or an operation command candidate to the display control unit 44.

S63*b*: The display control unit 44 transmits the selection of a character string candidate or an operation command candidate to the communicating unit 45 in order to notify the information processing system 10.

S63*c*: The communicating unit 45 transmits the selection of a character string candidate or an operation command candidate to the information processing system 10.

S63*d*: The communicating unit 43 of the information processing system 10 receives the selection of a character string candidate or an operation command candidate and transmits the selection to the handwriting input display control unit 23. The processes of steps S64 to S69 is the same as those of the first embodiment.

S70*a*: Next, the handwriting input display control unit 23 transmits an instruction to erase the selectable candidate display data to the communicating unit 43.

S70*b*: The communicating unit 43 transmits the instruction to erase the selectable candidate display data to the display apparatus 2.

S70*c*: The communicating unit 45 of the display apparatus 2 receives the instruction to erase the selectable candidate display data and transmits the instruction to the display control unit 44.

S70*d*: The display control unit 44 receives the instruction to erase the selectable candidate display data, and causes the display unit 22 to erase the selectable candidate.

S71*a*: The handwriting input display control unit 23 transmits an instruction to erase the rectangular area display data of the handwriting data and the selection object to the communicating unit 43.

S71*b*: The communicating unit 43 transmits the instruction to erase the rectangular area display data to the display apparatus 2.

S71*c*: The communicating unit 45 of the display apparatus 2 receives the instruction to erase the rectangular area display data and transmits the instruction to the display control unit 44.

S71*d*: The display control unit 44 receives the instruction to erase the rectangular area display data and causes the display unit 22 to erase the rectangular area.

When the insertion character string candidate 570 is selected, steps S72 to S77 are executed.

S72*a*: The handwriting input display control unit 23 transmits an instruction to erase the handwriting data display data and to erase the pen coordinate supplement display data transmitted in step S5, to the communicating unit 43.

S72*b*: The communicating unit 43 transmits the instruction to erase pen coordinate supplement display data to the display apparatus 2.

S72*c*: The communicating unit 45 of the display apparatus 2 receives the instruction to erase pen coordinate supplement display data and transmits the instruction to the display control unit 44.

S72*d*: The display control unit 44 receives the instruction to erase pen coordinate supplement display data, and causes the display unit 22 to erase the handwriting data. The processes of steps S73 to S75 are the same as those of the first embodiment.

S76*a*: When the insertion character string candidate 570 is selected, the validated data 573 is replaced by the insertion character string candidate 570. Therefore, the handwriting input display control unit 23 transmits an instruction to erase the validated data 573 to the communicating unit 43.

S76*b*: The communicating unit 43 transmits the instruction to erase the validated data 573 to the display apparatus 2.

S76*c*: The communicating unit 45 of the display apparatus 2 receives the instruction to erase the validated data 573 and transmits the instruction to the display control unit 44.

S76*d*: The display control unit 44 receives the instruction to erase the validated data 573, and causes the display unit 22 to erase the validated data.

S77*a*: The handwriting input display control unit 23 transmits the insertion data display data for displaying the insertion data (the insertion character string) at the same position as the erased validated data 573 using the insertion data font, to the communicating unit 43.

S77*b*: The communicating unit 43 transmits the insertion data display data to the display apparatus 2.

S77*c*: The communicating unit 45 of the display apparatus 2 receives the insertion data display data and transmits the insertion data display data to the display control unit 44.

S77*d*: The display control unit 44 receives the insertion data display data, and causes the display unit 22 to display the insertion data.

When the insertion character string candidate 570 is not selected (when the character string candidate 539 other than the insertion character string is selected), steps S78 to S82 are executed.

S78*a*: The handwriting input display control unit 23 transmits an instruction to erase the handwriting data display data and to erase the pen coordinate supplement display data transmitted in step S5, except for the insertion symbol 576, to the communicating unit 43.

S78*b*: The communicating unit 43 transmits the instruction to erase the pen coordinate supplement display data to the display apparatus 2.

S78*c*: The communicating unit 45 of the display apparatus 2 receives the instruction to erase the pen coordinate supplement display data and transmits the instruction to the display control unit 44.

S78*d*: The display control unit 44 receives the instruction to erase the pen coordinate supplement display data, and causes the display unit 22 to erase the handwriting data. The processes of steps S79 through S81 are the same as those of first embodiment.

S82*a*: Next, the handwriting input display control unit 23 transmits, to the communicating unit 43, the character string data display data (for example, "main") to be displayed at the same position as the handwriting data 504 while leaving the insertion symbol 576 intact, using the defined font received from the handwriting input storage unit 25.

S82*b*: The communicating unit 43 transmits the character string data display data to the display apparatus 2.

S82*c*: The communicating unit 45 of the display apparatus 2 receives the character string data display data and transmits the data to the display control unit 44.

S82*d*: The display control unit 44 receives the character string data display data and causes the display unit 22 to display the character string data. The processes of steps S79 to S81 are the same as those of the first embodiment.

When an operation command candidate is selected, steps S83 to S86 are executed. Further, when selection data is present, steps S83 to S85 are executed.

S83*a*: When the operation command candidate with respect to the selection data is selected (when the selection data exists), the handwriting input display control unit 23 transmits an instruction to erase the selection data display data to the communicating unit 43.

S83*b*: The communicating unit 43 transmits the instruction to erase the selection data display data to the display apparatus 2.

S83*c*: The communicating unit 45 of the display apparatus 2 receives the instruction to erase the selection data display data and transmits the instruction to the display control unit 44.

S83*d*: The display control unit 44 receives the instruction to erase the selection data display data and causes the display unit 22 to erase the selection data. The process of step S84 is the same as that of the first embodiment.

S85*a*: Next, the handwriting input display control unit 23 transmits the selection data display data to the communicating unit 43.

S85*b*: The communicating unit 43 transmits the selection data display data to the display apparatus 2.

S85*c*: The communicating unit 45 of the display apparatus 2 receives the selection data display data and transmits the selection data display data to the display control unit 44.

S85*d*: The display control unit 44 receives the selection data display data and causes the display unit 22 to display the selection data. The processes of steps S86 and S87 are the same as those of the first embodiment.

As described above, by the system configuration in which the display apparatus 2 and the information processing system 10 communicate, the same effects as in the first embodiment can be achieved. Note that the process flow of FIGS. 41 to 47 is an example, and processes that are performed when the display apparatus 2 and the information processing system 10 communicate with each other may be included or omitted. A part of the processes performed by the information processing system 10 may be performed by the display apparatus 2. For example, the display apparatus 2 may perform the processes pertaining to deletion.

Fourth Embodiment

In the present embodiment, a description is given of a system type handwriting input system in which an information processing system in the network performs processes such as handwriting recognition and returns the results of the processing to the display apparatus 2. In the present embodiment, a system configuration based on the configuration of the second embodiment will be described.

In the description of the present embodiment, the components denoted by the same reference numerals as those of the second embodiment or the contents of the drawings perform the same functions as those of the second embodiment, and, therefore, the description of the components described above may be omitted or only the differences may be described. The system configuration diagram may be the same as that of FIG. 38, and the hardware configuration diagram of the information processing system 10 may be the same as that of FIG. 39.

<Function of Apparatus>

Figure 48:
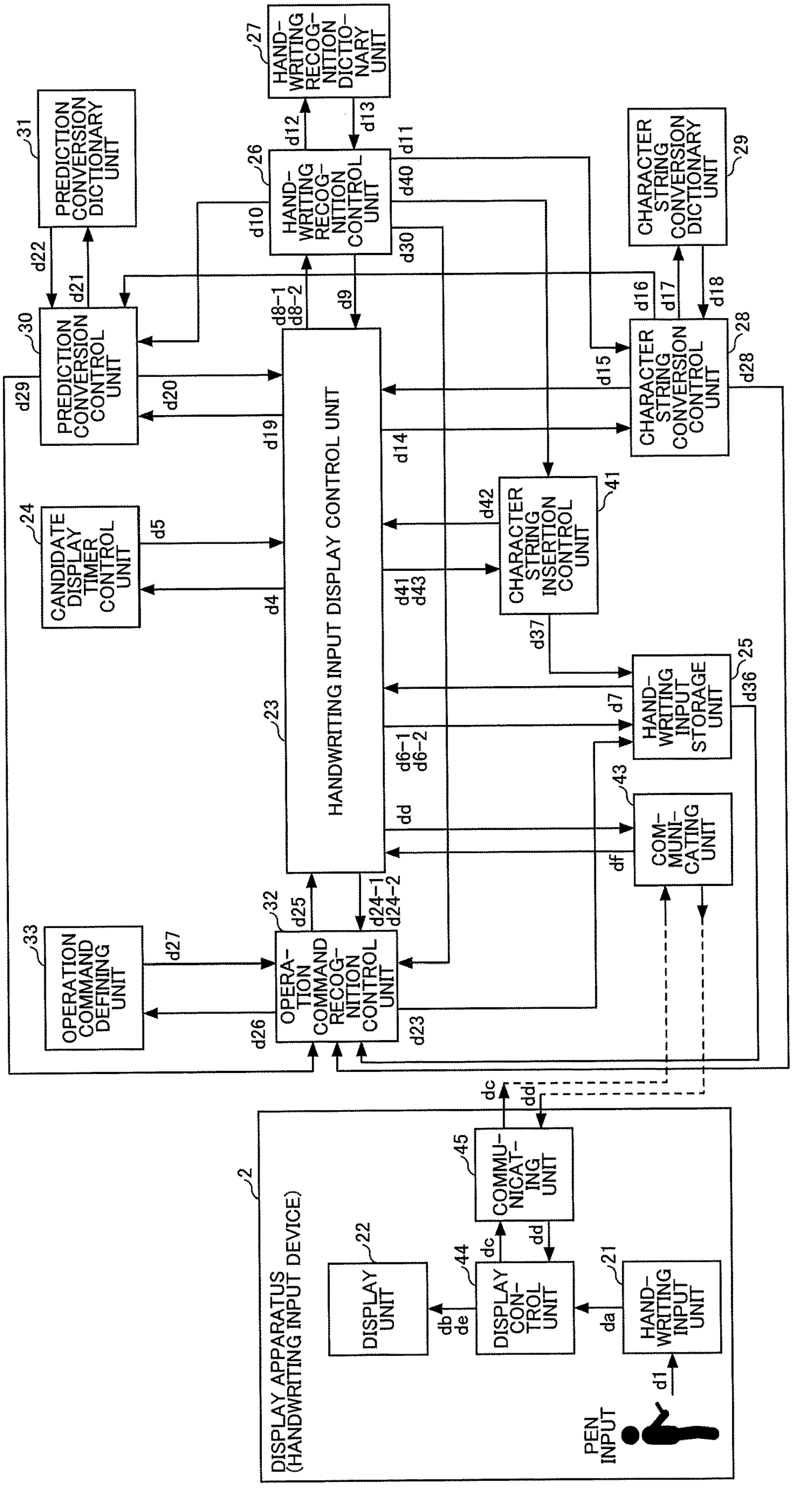
FIG. 48 is an example of a functional block diagram illustrating functions of a handwriting input system (fourth embodiment) according to a fourth embodiment of the present invention.
Figure 49:
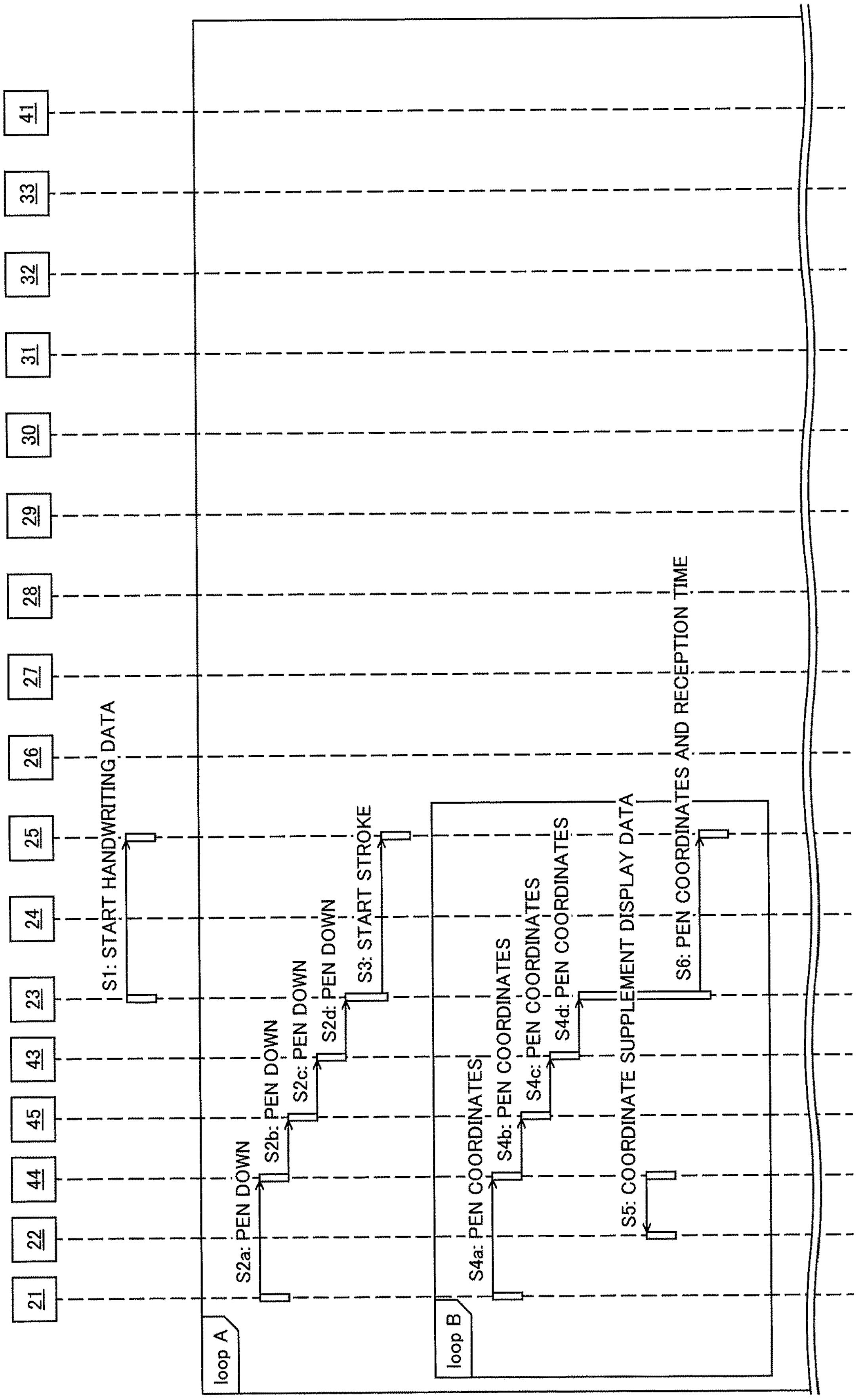
FIG. 49 is a sequence diagram illustrating a process in which the handwriting input system displays a character string candidate and an operation command candidate (part 1) according to the fourth embodiment of the present invention.
Figure 50:
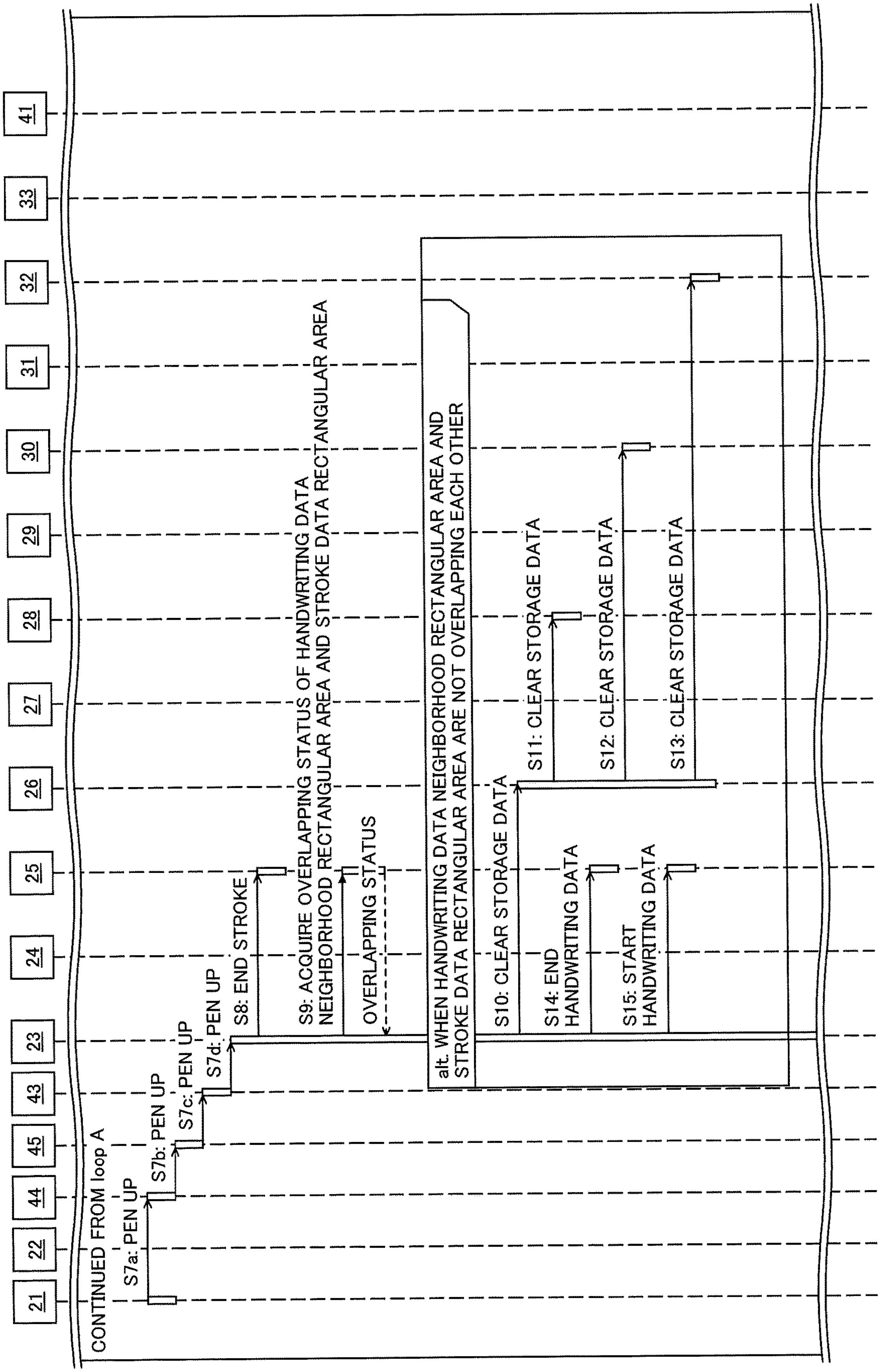
FIG. 50 is a sequence diagram illustrating a process in which the handwriting input system displays a character string candidate and an operation command candidate (part 2) according to the fourth embodiment of the present invention.
Figure 51:
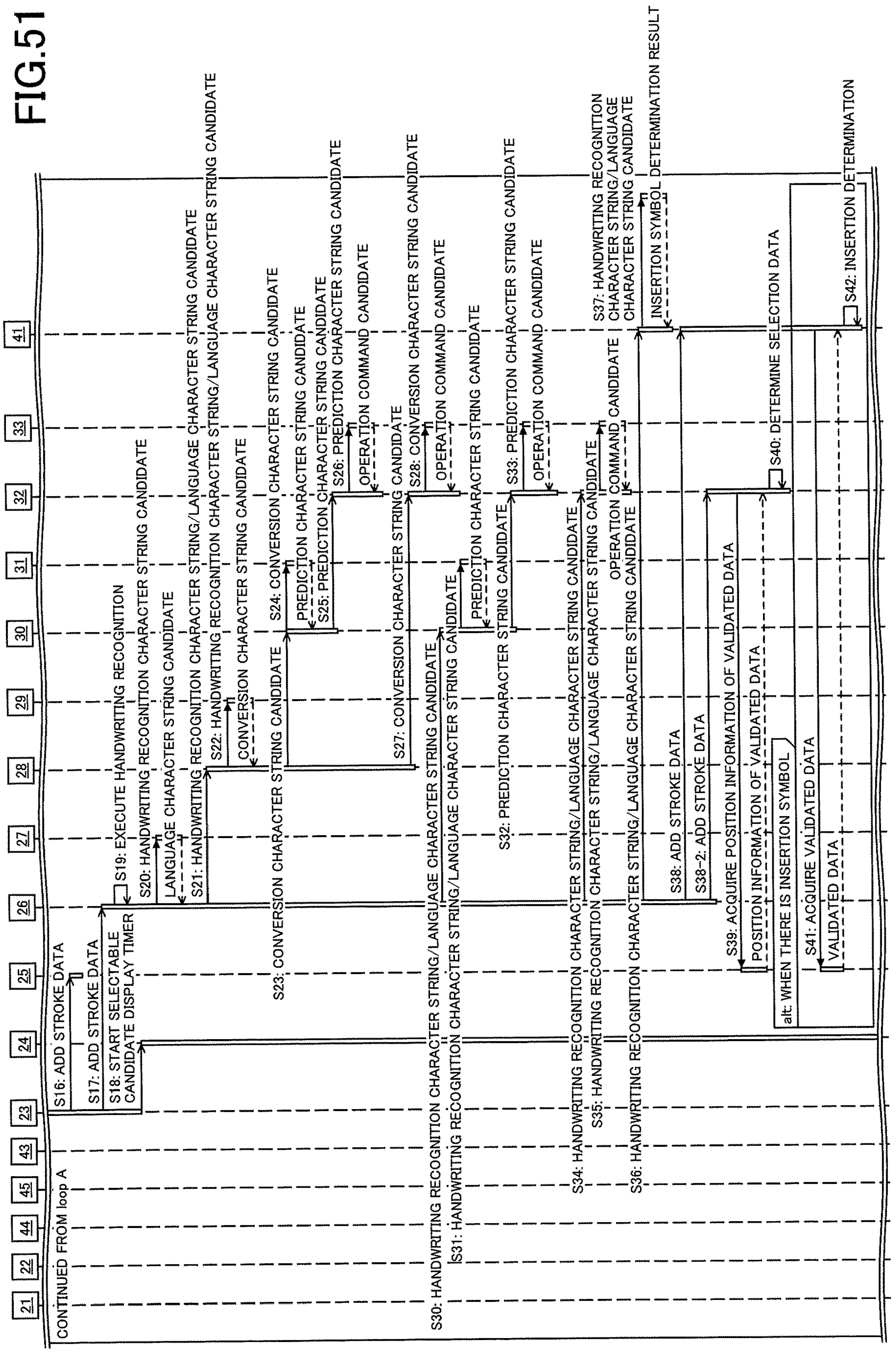
FIG. 51 is a sequence diagram illustrating a process in which the handwriting input system displays a character string candidate and an operation command candidate (part 3) according to the fourth embodiment of the present invention.
Figure 52:
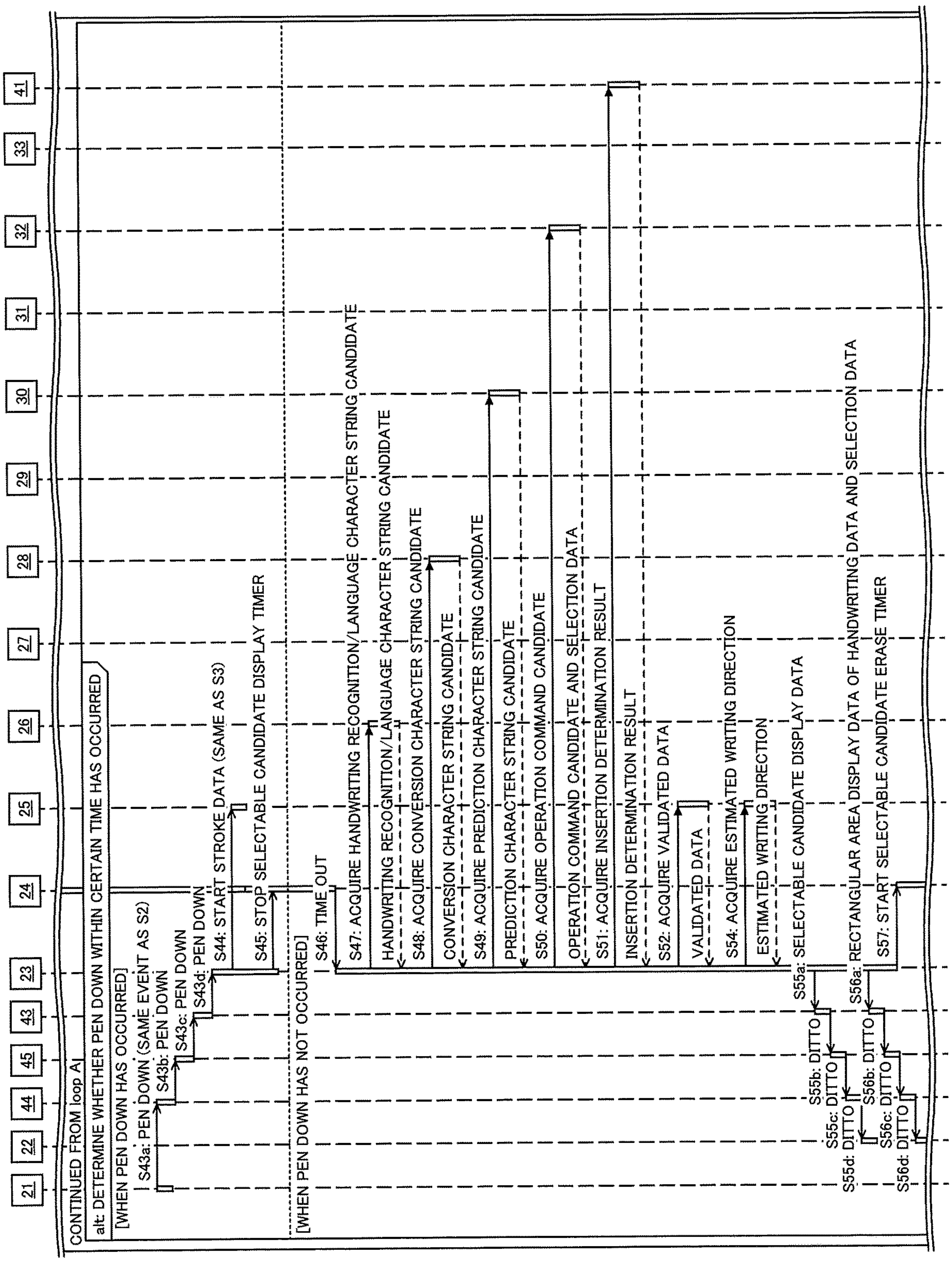
FIG. 52 is a sequence diagram illustrating a process in which the handwriting input system displays a character string candidate and an operation command candidate (part 4) according to the fourth embodiment of the present invention.
Figure 53:
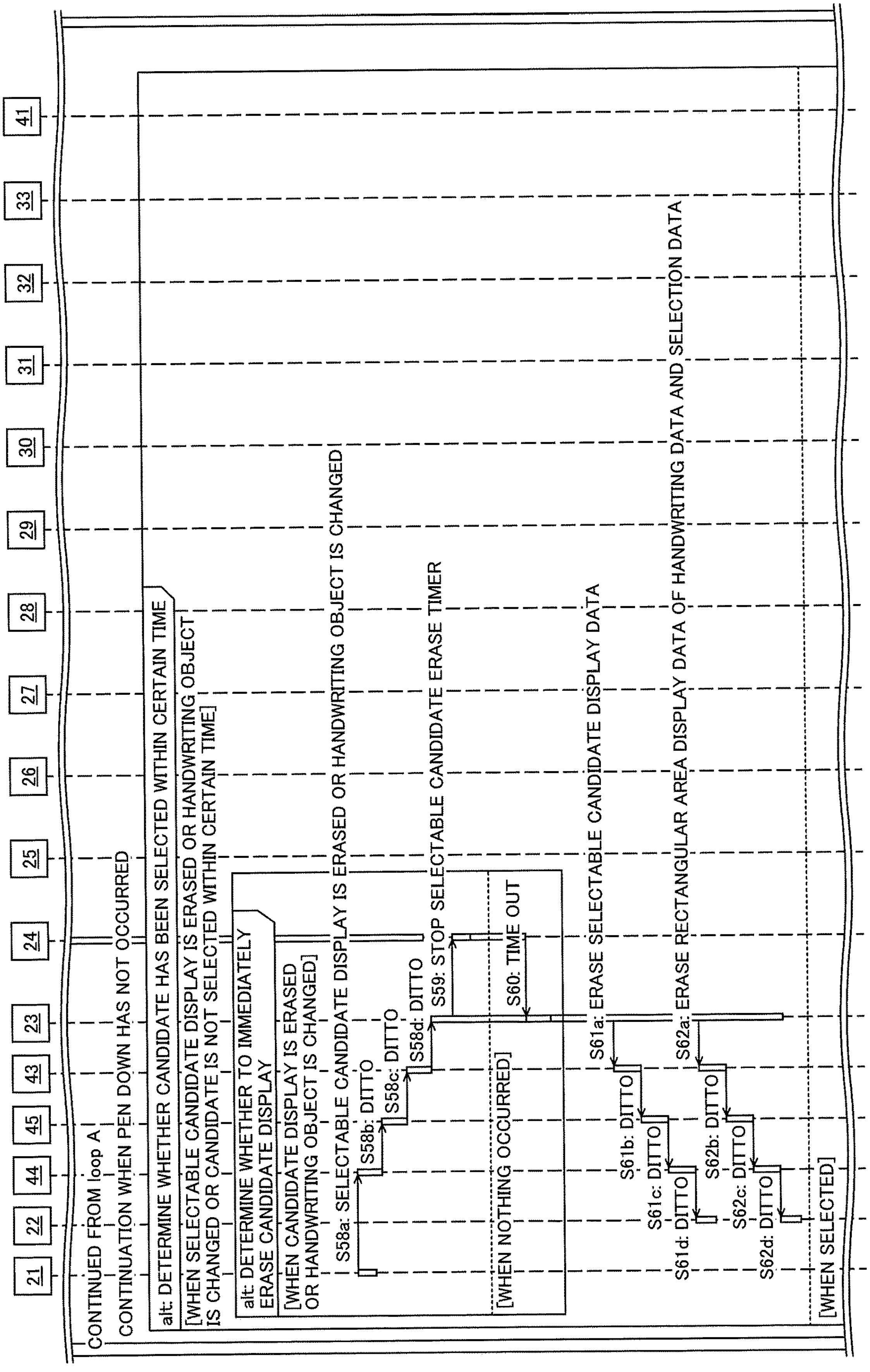
FIG. 53 is a sequence diagram illustrating a process in which the handwriting input system displays a character string candidate and an operation command candidate (part 5) according to the fourth embodiment of the present invention.
Figure 54:
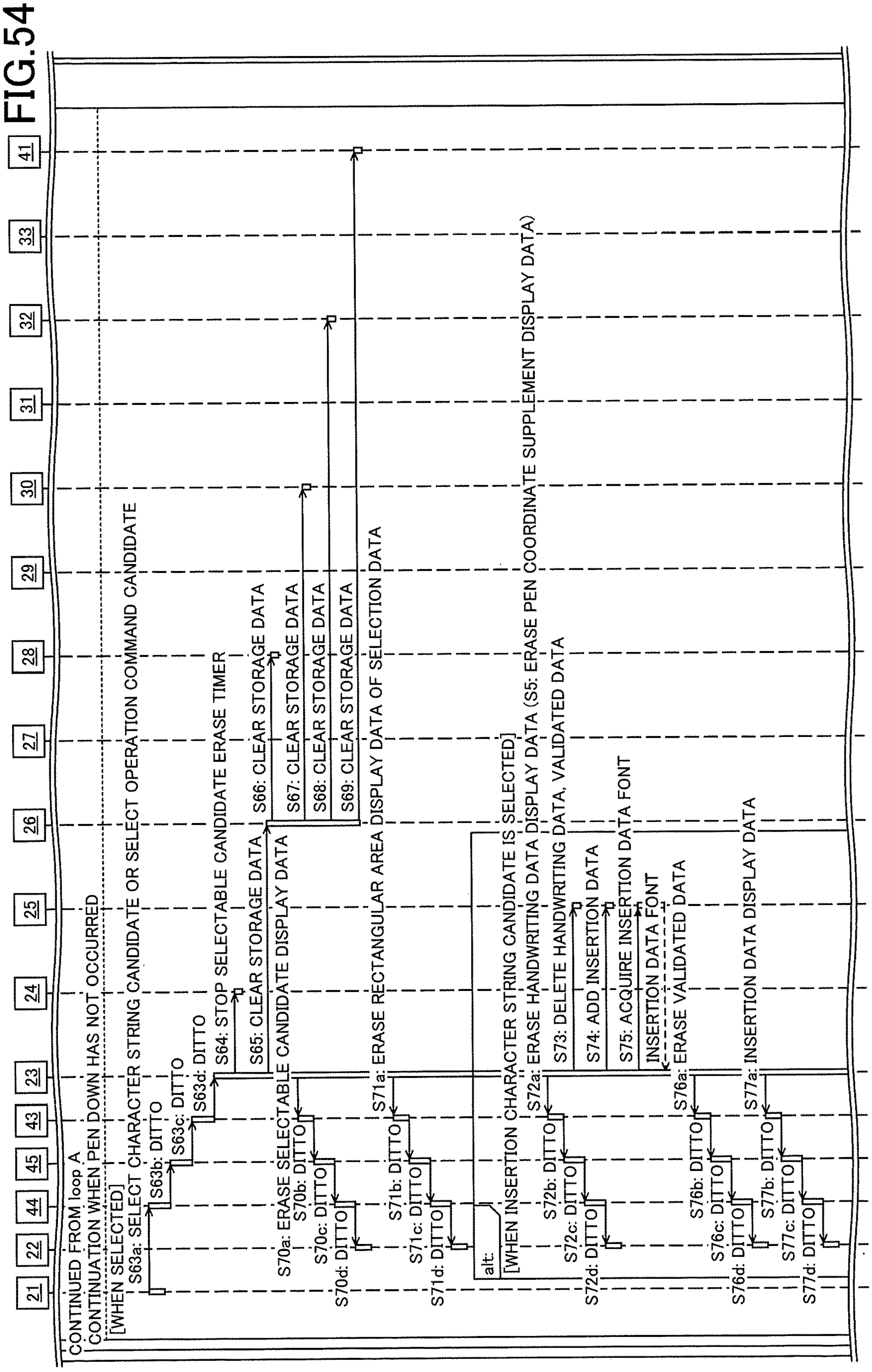
FIG. 54 is a sequence diagram illustrating a process in which the handwriting input system displays a character string candidate and an operation command candidate (part 6) according to the fourth embodiment of the present invention.
Figure 55:
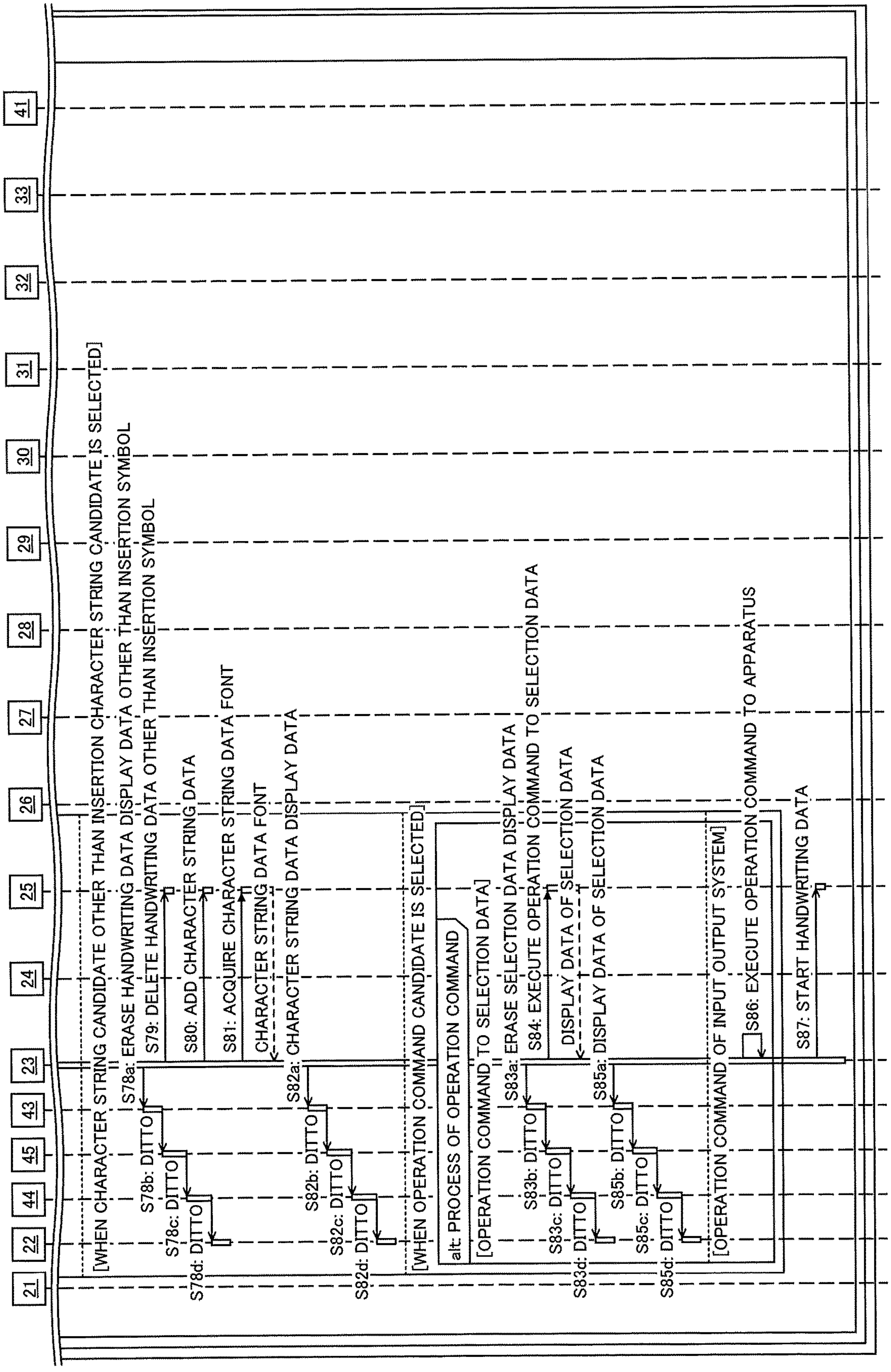
FIG. 55 is a sequence diagram illustrating a process in which the handwriting input system displays a character string candidate and an operation command candidate (part 7) according to the fourth embodiment of the present invention.

Next, functions of the handwriting input system 100 will be described with reference to FIG. 48. FIG. 48 is an example of a functional block diagram illustrating the functions of the handwriting input system 100. In the description of FIG. 48, the differences from FIG. 40 will be mainly explained.

As illustrated in FIG. 48, the handwriting input system 100 may be the same as that of FIG. 40 except that the information processing system 10 does not include the insertion symbol defining unit 42.

<Operation Procedure>

The operation of the handwriting input system 100 will be described with reference the above configuration and FIGS. FIGS. 49 to 55. FIGS. 49 to 55 are sequence diagrams illustrating a process in which the display apparatus 2 displays a character string candidate and an operation command candidate. The overall flow of FIGS. 49 to 55 may be the same as that of FIGS. 41 to 47, and the main differences will be described.

As illustrated in FIGS. 49 to 55, the processes on the side of the display apparatus 2 are the same as in FIGS. 41 to 47 of the third embodiment. The processes on the side of the information processing system are the same as in FIGS. 28 to 33 of the second embodiment.

[Overview]

As described above, the display apparatus 2 according to the present embodiment eliminates the need for an insertion symbol even in a client-server system, and insertion of a character string or the like can be performed without requiring any special operation other than those of the first and third embodiments.

<Other Applications>

While the preferred embodiment of the present invention has been described with reference to examples, various modifications and substitutions may be made thereto without departing from the spirit and scope of the present invention.

For example, the validated data 573 is stored as a character code, and the handwriting data is stored as coordinate point data, in the display apparatus 2. This data may be stored in various kinds of storage media or stored in a storage device on the network, and may be subsequently downloaded from the display apparatus 2 and reused. The display apparatus 2 for reuse may be any display apparatus or a general information processing apparatus. Accordingly, the user can reproduce the handwriting contents with a different display apparatus 2 to continue a conference or the like.

For example, although an electronic blackboard has been described in the present embodiment as an example, an information processing apparatus having a touch panel can be suitably applied. Electronic blackboards are also referred to as whiteboards, electronic whiteboards, electronic information boards, interactive whiteboards, digital whiteboards, and the like. The information processing apparatus having a touch panel mounted therein may be, for example, an output device such as a Projector (PJ), a digital signage, an Head Up Display (HUD) device, an industrial machine, an imaging device, a sound collector, a medical device, a network home appliance, a personal computer, a mobile phone, a smartphone, a tablet terminal, a game machine, a Personal Digital Assistant (PDA), a digital camera, a wearable PC, a desktop PC, and the like.

In the present embodiment, the coordinates at which the tip of the pen is in contact are detected by the touch panel, but the coordinates of the tip of the pen may be detected by ultrasound. The pen emits ultrasonic waves together with the light emission, and the display apparatus 2 calculates the distance according to the time of arrival of the ultrasonic waves. The position of the pen can be determined by the direction and distance to the pen. The projector renders (projects) the trajectory of the pen as stroke data.

In the present embodiment, when there is selection data, operation command candidates of the edit group and the decorate group are displayed, and when there is no selection data, operation command candidates of the I/O system are displayed. However, operation command candidates of the edit group and the decorate group and operation command candidates of the I/O system may be displayed at the same time.

Furthermore, the configuration example of FIG. 5, etc., indicated in the above embodiment is divided according to the main functions to facilitate the understanding of processes by the display apparatus 2. The present invention is not limited by how the process units are divided or the names of the process units. The processes of the display apparatus 2 may be further divided into many process units according to the process contents. Furthermore, the process units may be divided such that a single process unit further includes many processes.

Further, the user's handwriting sign data may not be held by the display apparatus 2. The data be retained by an information processing apparatus on cloud or in house.

Further, in the present embodiment, even if the threshold value is exemplified as the comparison target, the threshold value is not limited to the exemplified value. For this reason, in the present embodiment, regarding all threshold values, the description of less than the threshold value and less than or equal to the threshold value may have the same meaning, and the description of greater than or equal to the threshold value and greater than the threshold value have the same meaning. For example, when the threshold value is 11, the description of less than the threshold value may have the same meaning as less than or equal to the threshold value when the threshold value is 10. Further, when the threshold value is 10, the description of greater than the threshold value may have the same meaning as greater than or equal to the threshold value when the threshold value is 11.

The functions of each of the embodiments described above may be implemented by one or more processing circuits. As used herein, a "processing circuit" includes a processor programmed to execute each function by software such as a processor implemented in an electronic circuit; or devices such as an Application Specific Integrated Circuit (ASIC) a digital signal processor (DSP), a field programmable gate array (FPGA), and a conventional circuit module, designed to execute each function as described above.

The handwriting recognition control unit 26 is an example of a handwriting recognition controller. The handwriting input display control unit 23 is an example of a display controller. The character string insertion control unit 41 is an example of a character string insertion controller. The display unit 22 is an example of a display. The pen 2500 is an example of an inputter.

Numerous additional modifications and variations are possible in light of the above teachings. It is therefore to be understood that, within the scope of the appended claims, the disclosure of this patent specification may be practiced otherwise than as specifically described herein.

As can be appreciated by those skilled in the computer arts, this invention may be implemented as convenient using a conventional general-purpose digital computer programmed according to the teachings of the present specification. Appropriate software coding can readily be prepared by skilled programmers based on the teachings of the present disclosure, as will be apparent to those skilled in the software arts. The present invention may also be implemented by the preparation of application-specific integrated circuits or by interconnecting an appropriate network of conventional component circuits, as will be readily apparent to those skilled in the relevant art.

Each of the functions of the described embodiments may be implemented by one or more processing circuits. A processing circuit includes a programmed processor. A processing circuit also includes devices such as an application specific integrated circuit (ASIC) and conventional circuit components arranged to perform the recited functions. the processing circuitry is implemented as at least a portion of a microprocessor. The processing circuitry may be implemented using one or more circuits, one or more microprocessors, microcontrollers, application specific integrated circuits, dedicated hardware, digital signal processors, microcomputers, central processing units, field programmable gate arrays, programmable logic devices, state machines, super computers, or any combination thereof. Also, the processing circuitry may include one or more software modules executable within one or more processing circuits. The processing circuitry may further include memory configured to store instructions and/or code that causes the processing circuitry to execute functions.

If embodied in software, each block may represent a module, segment, or portion of code that comprises program instructions to implement the specified logical function(s). The program instructions may be embodied in the form of source code that comprises human-readable statements written in a programming language or machine code that comprises numerical instructions recognizable by a suitable execution system such as a processor 101 in a computer system or other system. The machine code may be converted from the source code, etc. If embodied in hardware, each block may represent a circuit or a number of interconnected circuits to implement the specified logical function(s).

According to one embodiment of the present invention, a display apparatus that allows insertion of characters or the like without displaying a character string input frame, can be provided.

The display apparatus, the recording medium, and the display method are not limited to the specific embodiments described in the detailed description, and variations and modifications may be made without departing from the spirit and scope of the present invention.

What is claimed is:

1. A display apparatus for displaying handwriting data, the display apparatus comprising:

a processor; and a memory storing programs causing the processor to:

recognize handwriting data that is handwriting based on a position of an inputter in contact with a display;

display, on the display, validated data obtained by converting the recognized handwriting data; and insert, a character string candidate among characters forming the validated data upon determining that the handwriting data that is handwritten around the validated data satisfies a predetermined condition with respect to the validated data, the character string candidate being obtained by converting the handwriting data, which is handwritten around the validated data; and upon determining that the predetermined condition is satisfied, displaying, in a selectable manner, (i) the character string candidate obtained by converting the handwriting data handwritten around the validated data, and (ii) an insertion character string candidate in which the character string candidate, which is obtained by the converting, has been inserted among the characters forming the validated data.

2. The display apparatus according to claim 1, the programs causing the processor to:

upon determining that a selection of the insertion character string candidate is accepted by the inputter, erase the validated data and the handwriting data, and display the insertion character string candidate at a position where the validated data had been displayed.

3. The display apparatus according to claim 1, the programs causing the processor to:

upon determining that a selection of the character string candidate is accepted by the inputter, not erase the validated data but erase the handwriting data, and display the character string candidate at a position where the handwriting data had been displayed.

4. The display apparatus according to claim 1, wherein the predetermined condition includes a condition that a distance between the validated data and the handwriting data that is handwritten around the validated data, is less than or equal to or less than a predetermined threshold value, and the programs causing the processor to:

upon determining that the predetermined condition is satisfied, generate the insertion character string candidate by inserting the character string candidate, which is obtained by converting the handwriting data handwritten around the validated data in between two characters forming the validated data that are closest to an initial character in the handwriting data, among the characters forming the validated data.

5. The display apparatus according to claim 4, wherein the predetermined condition includes another condition that an insertion symbol defined in advance is included in the handwriting data that is handwritten around the validated data, and the programs causing the processor to:

upon determining that the predetermined condition is satisfied, generate the insertion character string candidate by inserting the character string candidate, which is obtained by converting the handwriting data handwritten around the validated data, excluding the insertion symbol, in between two characters forming the validated data that are closest to the insertion symbol, among the characters forming the validated data.

6. The display apparatus according to claim 5, the programs causing the processor to:

display the character string candidate obtained by converting the handwriting data, which is handwritten around the validated data, and the insertion character string candidate in which the character string candidate, which is obtained by the converting, has been inserted among the characters forming the validated data, and upon determining that a selection of the insertion character string candidate is accepted by the inputter, erase the validated data and the handwriting data including the insertion symbol, and display the insertion character string candidate at a position where the validated data had been displayed.

7. The display apparatus according to claim 6, the programs causing the processor to:

upon determining that a selection of the character string candidate is accepted by the inputter, not erase the validated data and does not erase the insertion symbol but erase the handwriting data that does not include the insertion symbol, and displays the character string candidate at a position where the handwriting data had been displayed.

8. A non-transitory computer-readable recording medium storing a program that causes a computer to execute a process performed in the display apparatus for displaying handwriting data, the process comprising:

controlling recognition of the handwriting data that is handwriting based on a position of an inputter in contact with a display;

displaying, on the display, validated data obtained by converting the handwriting data; and inserting a character string candidate among characters forming the validated data upon determining that the handwriting data that is handwritten around the validated data satisfies a predetermined condition with respect to the validated data, the character string candidate being obtained by converting the handwriting data, which is handwritten around the validated data; and upon determining that the predetermined condition is satisfied, displaying, in a selectable manner, (i) the character string candidate obtained by converting the handwriting data handwritten around the validated data, and (ii) an insertion character string candidate in which the character string candidate, which is obtained by the converting, has been inserted among the characters forming the validated data.

9. A display method performed by the display apparatus for displaying handwriting data, the display method comprising:

controlling recognition of the handwriting data that is handwriting based on a position of an inputter in contact with a display;

displaying, on the display, validated data obtained by converting the handwriting data; and inserting a character string, candidate among characters forming the validated data upon determining that the handwriting data that is handwritten around the validated data satisfies a predetermined condition with respect to the validated data, the character string candidate being obtained by converting the handwriting data, which is handwritten around the validated data; and upon determining that the predetermined condition is satisfied, displaying, in a selectable manner, (i) the character string candidate obtained by converting the handwriting data handwritten around the validated data, and (ii) an insertion character string candidate in which the character string candidate, which is obtained by the converting, has been inserted among the characters forming the validated data.

* * * * *